United States Patent
Fukuzono et al.

(10) Patent No.: US 9,872,295 B2
(45) Date of Patent: Jan. 16, 2018

(54) WIRELESS COMMUNICATION APPARATUS AND WIRELESS COMMUNICATION METHOD

(71) Applicant: NIPPON TELEGRAPH AND TELEPHONE CORPORATION, Tokyo (JP)

(72) Inventors: Hayato Fukuzono, Yokosuka (JP); Tomoki Murakami, Yokosuka (JP); Riichi Kudo, Yokosuka (JP); Shoko Shinohara, Yokosuka (JP); Yasushi Takatori, Yokosuka (JP); Masato Mizoguchi, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 0 days.

(21) Appl. No.: 14/892,491

(22) PCT Filed: May 23, 2014

(86) PCT No.: PCT/JP2014/063701
§ 371 (c)(1),
(2) Date: Nov. 19, 2015

(87) PCT Pub. No.: WO2014/189129
PCT Pub. Date: Nov. 27, 2014

(65) Prior Publication Data
US 2016/0119909 A1    Apr. 28, 2016

(30) Foreign Application Priority Data

May 24, 2013  (JP) .................. 2013-110267
Oct. 21, 2013  (JP) .................. 2013-218537
(Continued)

(51) Int. Cl.
*H04W 72/04* (2009.01)
*H04W 16/28* (2009.01)
(Continued)

(52) U.S. Cl.
CPC ........ *H04W 72/046* (2013.01); *H04B 7/0617* (2013.01); *H04B 17/11* (2015.01);
(Continued)

(58) Field of Classification Search
CPC ........... H04W 72/046; H04W 72/0453; H04W 16/28; H04B 17/11; H04B 17/318; H04B 7/0617; H04L 5/0098
See application file for complete search history.

(56) References Cited

U.S. PATENT DOCUMENTS 7,174,170 B2 *   2/2007   Steer ..................... H04W 16/10
                                                   455/422.1
2002/0155818 A1* 10/2002   Boros ................... H01Q 1/246
                                                   455/67.14
(Continued)

FOREIGN PATENT DOCUMENTS

CN         1838657 A     9/2006
CN       101120520 A     2/2008
(Continued)

OTHER PUBLICATIONS

Office Action for parallel application JP-2016-016661, dated Dec. 6, 2016, with English translation.
(Continued)

*Primary Examiner* — Min Jung
(74) *Attorney, Agent, or Firm* — Harness, Dickey & Pierce, P.L.C.

(57) ABSTRACT

A wireless communication apparatus includes a designation unit which generates format designation information for designating a format of transmission and reception for
(Continued)

another wireless communication apparatus, a first transmission unit which wirelessly transmits the format designation information to the other wireless communication apparatus, an acquisition unit which acquires a packet, a propagation channel estimation unit which estimates uplink propagation channel information indicating a propagation channel from the other wireless communication apparatus to the wireless communication apparatus based on the packet, a calibration coefficient calculation unit which calculates a calibration coefficient based on downlink propagation channel information indicating a propagation channel from the wireless communication apparatus to the other wireless communication apparatus and the uplink propagation channel information, a transmission weight value calculation unit which calculates a transmission weight value based on the calibration coefficient and the uplink propagation channel information, and a second transmission unit which wirelessly transmits a predetermined signal to the other wireless communication apparatus based on the transmission weight value.

30 Claims, 39 Drawing Sheets

(30) Foreign Application Priority Data

| | | |
|---|---|---|
| Apr. 9, 2014 | (JP) | 2014-080530 |
| Apr. 23, 2014 | (JP) | 2014-089589 |
| May 7, 2014 | (JP) | 2014-096090 |

(51) Int. Cl.
*H04B 17/11* (2015.01)
*H04B 17/318* (2015.01)
*H04B 7/06* (2006.01)
*H04L 5/00* (2006.01)

(52) U.S. Cl.
CPC ......... *H04B 17/318* (2015.01); *H04L 5/0098* (2013.01); *H04W 16/28* (2013.01); *H04W 72/0453* (2013.01)

(56) References Cited

U.S. PATENT DOCUMENTS

| | | | |
|---|---|---|---|
| 2004/0081121 A1* | 4/2004 | Xu | H04B 1/7097 370/329 |
| 2007/0183545 A1* | 8/2007 | Yuda | H04B 7/0619 375/347 |
| 2010/0020857 A1 | 1/2010 | Takano et al. | |
| 2012/0051287 A1 | 3/2012 | Merlin et al. | |
| 2012/0127899 A1 | 5/2012 | Ketchum et al. | |
| 2013/0109448 A1* | 5/2013 | Garrett | H04B 7/0617 455/575.7 |
| 2013/0203457 A1* | 8/2013 | Zhang | H04B 15/005 455/522 |

FOREIGN PATENT DOCUMENTS

| | | |
|---|---|---|
| JP | 2006-504336 A | 2/2006 |
| JP | 2007-517440 A | 6/2007 |
| JP | 2007-523570 A | 8/2007 |
| JP | 2010-028599 A | 2/2010 |
| JP | 2012-525084 A | 10/2012 |
| WO | 2004/039022 A2 | 5/2004 |
| WO | WO-2005/064871 A1 | 7/2005 |
| WO | WO-2005/081483 A1 | 9/2005 |
| WO | WO-2010/124232 A2 | 10/2010 |
| WO | WO-2011/007803 A1 | 1/2011 |

OTHER PUBLICATIONS

Ericsson, ST-Ericsson, Remaining details on SRS transmission, 3GPP TSG-RAN WG1#64 R1-110641, Feb. 25, 2011.
LG Electronics, Remaining Issues on Dynamic Aperiodic Sounding for LTE-A, 3GPP TSG-RAN WG1#63b R1-110401, Jan. 21, 2011, pp. 1-4.
Notice of Reasons for Rejection, Japanese Patent Application No. 2015-518300, dated Dec. 1, 2015.
Samsung: "Antenna calibrations for TDD CoMP", 3GPP Draft; R1-101177 TDD Comp, 3rd Generation Partnership Project (3GPP), Mobile Competence Centre; 650, Route Des Lucioles; F-06921 Sophia-Antipolis Cedex; France, vol. RAN WG1, no. San Francisco, USA; Feb. 22, 2010, Feb. 16, 2010.
Partial Search Report for EP 14801450.9, EPO, Munich, dated Nov. 3, 2016.
Office Action for parallel application CN-201480026484.5, dated Jul. 5, 2017, with partial English translation of search report.
Masahiro Morikura and Shuji Kubota, "Revised Third Edition 802.11 high-speed wireless LAN textbook," impress R&D, Apr. 11, 2008, pp. 206-280.
Q. H. Spencer, A. L. Swindlehurst, and M. Haardt, "Zero-Forcing Methods for Downlink Spatial Multiplexing in Multiuser MIMO Channels", IEEE Trans. Sig. Processing, vol. 52, No. 2, Feb. 2004, pp. 461-471.
Wireless LAN Medium Access Control (MAC) and Physical Layer (PHY) Specifications, IEEE Std. 802.11-2012.
Wireless LAN Medium Access Control (MAC) and Physical Layer (PHY) Specifications, IEEE Std. 802.11ac, 2013.
H. Fukuzono, T. Murakami, R. Kudo, Y. Takatori, and M. Mizoguchi, "Weighted-combining calibration for implicit feedback beamforming on downlink multiuser MIMO systems," in Proc. IEEE PIMRC13, Sep. 2013, pp. 846-850.
Qualcomm Europe, Calibration Procedures for TDD Beamforming, 3GPP R1-080494, Jan. 18, 2008.
Tomoki Murakami et al., "Study for Implicit Beamforming in Massive MU-MIMO systems—Part 1", 2013 IEICE, p. 625, B-5-215.
International Search Report for PCT/JP2014/063701, ISA/JP, dated Aug. 12, 2014.

* cited by examiner

FIG. 39

| SUBCARRIER NUMBER | -128 | ... | -123 | -122 | ... | -97 | -96 | -95 | ... | -70 | -69 |
|---|---|---|---|---|---|---|---|---|---|---|---|
| ARRANGEMENT OF 20 MHz × 4 | | | | | | | | | | | |
| ARRANGEMENT OF 80 MHz | | | | | | | | | | | |

| SUBCARRIER NUMBER | -69 | ... | -59 | -58 | ... | -33 | -32 | -31 | ... | -6 | -5 |
|---|---|---|---|---|---|---|---|---|---|---|---|
| ARRANGEMENT OF 20 MHz × 4 | | | | | | | | | | | |
| ARRANGEMENT OF 80 MHz | | | | | | | | | | | |

| SUBCARRIER NUMBER | -5 | ... | -2 | -1 | 0 | 1 | 2 | ... | 5 | 6 | ... | 31 |
|---|---|---|---|---|---|---|---|---|---|---|---|---|
| ARRANGEMENT OF 20 MHz × 4 | | | | | | | | | | | | |
| ARRANGEMENT OF 80 MHz | | | | | | | | | | | | |

| SUBCARRIER NUMBER | 31 | 32 | 33 | ... | 58 | 59 | 60 | 70 | 95 | 96 |
|---|---|---|---|---|---|---|---|---|---|---|
| ARRANGEMENT OF 20 MHz × 4 | | | | | | | | | | |
| ARRANGEMENT OF 80 MHz | | | | | | | | | | |

| SUBCARRIER NUMBER | 96 | 97 | ... | 122 | 123 | ... | 128 |
|---|---|---|---|---|---|---|---|
| ARRANGEMENT OF 20 MHz × 4 | | | | | | | |
| ARRANGEMENT OF 80 MHz | | | | | | | |

SUBCARRIER IN WHICH THERE IS KNOWN SIGNAL

SUBCARRIER IN WHICH THERE IS NO KNOWN SIGNAL

WIRELESS COMMUNICATION APPARATUS AND WIRELESS COMMUNICATION METHOD

TECHNICAL FIELD

The present invention relates to a wireless communication apparatus and a wireless communication method.

Priority is claimed on Japanese Patent Application No. 2013-110267, filed May 24, 2013, Japanese Patent Application No. 2013-218537, filed Oct. 21, 2013, Japanese Patent Application No. 2014-080530, filed Apr. 9, 2014, Japanese Patent Application No. 2014-089589, filed Apr. 23, 2014, and Japanese Patent Application No. 2014-096090, filed May 7, 2014, the contents of which are incorporated herein by reference.

BACKGROUND ART

As a wireless communication system using a 5 gigahertz [GHz] band, a wireless communication system of the IEEE 802.11a standard is known. In this wireless communication system, a throughput of a maximum of 54 megabits per second [Mbps] is realized using an orthogonal frequency division multiplexing (OFDM) modulation scheme, which is one of technologies for stabilizing characteristics in a multipath fading environment (for example, see Non-Patent Document 1).

However, the throughput here refers to a throughput on a physical layer. Because transmission efficiency in a medium access control (MAC) layer is actually about 50 to 70%, an upper-limit value of the actual throughput is about 30 [Mbps].

In addition, in IEEE 802.11n, single user-multiple input multiple output (SU-MIMO) technology capable of achieving spatial multiplexing using the same frequency channels at the same time through a plurality of antennas is known. In addition, it is possible to realize a transmission speed of a maximum of 600 Mbps through technology simultaneously using two 20 [megahertz (MHz)] frequency channels, which have been heretofore used individually, as a frequency channel of 40 [MHz] as technology aimed at realization of high-speed communication (for example, see Non-Patent Document 1).

In addition, frame aggregation technology for aggregating a plurality of frames and transmitting the aggregated frames is known. In addition, technology for improving the efficiency of data transmission by reducing an overhead of a control signal using a block acknowledge (block ACK) signal is known. In IEEE 802.11n, the realization of high-speed communication through these technologies is aimed at and it is possible to realize a transmission speed of a maximum of 600 [Mbps](see Non-Patent Document 1).

In addition, in the SU-MIMO, there is a method in which a data transmission station performs beamforming using propagation channel information (communication path information (CSI: Channel State Information) acquired in advance to improve characteristics. In addition, the IEEE 802.11ac standard currently being standardized is aimed at the realization of higher-speed wireless communication than in IEEE 802.11n through communication technology simultaneously using four 20 [MHz] frequency channels as a frequency channel of 80 [MHz]. In addition, the IEEE 802.11ac standard is aimed at the realization of higher-speed wireless communication than in IEEE 802.11n through multiuser MIMO (MU-MIMO) technology for performing communication with a plurality of wireless stations at the same time using the same frequency channels.

Hereinafter, the direction from the data transmission station (base station apparatus) to a data reception station (terminal station apparatus) is referred to as a "downlink". In addition, the direction from the data reception station to the data transmission station is referred to as an "uplink".

In the MU-MIMO, it is possible to calculate transmission weight values (transmission weights) capable of suppressing interference between data reception stations using downlink propagation channel information acquired in advance and realize high-speed communication by performing transmission using the transmission weight values (see Non-Patent Document 2). Here, the downlink represents a link from a data transmission station to a data reception station and the uplink represents a link from the data reception station to the data transmission station. As a method in which the data transmission station acquires the downlink propagation channel information, there is a method (terminal station estimation method) in which the data reception station estimates propagation channel information of the downlink and notifies the data transmission station of the estimated propagation channel information of the downlink. In addition, as another method for acquiring the propagation channel information of the downlink, there is a method (base station estimation method) in which the data reception station transmits a signal to the data transmission station and the data transmission station estimates the propagation channel information of the downlink based on the signal received from the data reception station.

The terminal station estimation method includes a step of transmitting a known signal for estimating propagation channel information from a data transmission station to a desired data reception station; a step of estimating, by the data reception station, the propagation channel information of a downlink from the difference between a received signal and the known signal; and a step of notifying, by the data reception station, the data transmission station of the propagation channel information of the downlink.

Hereinafter, a signal which is known and is used for estimating the propagation channel information is referred to as a "known signal".

On the other hand, the base station estimation method includes a step of transmitting a known signal for estimating propagation channel information from a data reception station to a data transmission station; a step of estimating, by the data transmission station, the propagation channel information of an uplink from the difference between a received signal and the known signal; and a step of calibrating, by the data transmission station, the propagation channel information of the uplink to estimate propagation channel information of a downlink.

The base station estimation method is an efficient estimation method because the notification of the downlink propagation channel information is unnecessary.

The former acquisition method (terminal station estimation method) is referred to as explicit feedback (EFB) beamforming (see Clause 20.3.12.3 in Non-Patent Document 3). The explicit feedback beamforming is adopted in the IEEE 802.11ac standard (see Non-Patent Document 4).

However, in this propagation channel information estimation method, the data reception station provides the notification of the propagation channel information. Therefore, there is a problem in that an additional communication time for providing the notification is necessary and effective throughput is degraded.

In addition the propagation channel information changes with the movement of the data transmission station and the data reception station and a change in a surrounding environment. Therefore, when the communication time is greater than or equal to a predetermined time, there is a problem in that it is difficult to form transmission weight values capable of suppressing interference between data reception stations because the time at which the estimated propagation channel information is used is different from the time at which data is actually transmitted via the propagation channel, and consequently MU-MIMO transmission is difficult.

In order to solve these problems, in a time division communication system using the same frequency band in a downlink data transmission (data transmission from the data transmission station to the data reception station) and an uplink data transmission (data transmission from the data reception station to the data transmission station), transmission weight values of the downlink data transmission are calculated based on propagation channel information of the uplink data transmission. The time division communication system improves effective throughput by omitting the notification of propagation channel information using implicit feedback beamforming (IFB) technology (see Clause. 20.3.12.2 in Non-Patent Document 3) in which the calculated transmission weight values are used in the downlink data transmission.

PRIOR ART DOCUMENTS

Non-Patent Documents

Non-Patent Document 1: Masahiro Morikura, Shuji Kubota (supervision), "Third Revised Version 802.11 High Speed Wireless LAN Textbook", Impress R&D, pp. 206-280, Apr. 11, 2008.

Non-Patent Document 2: Q. H. Spencer, A. L. Swindlehurst, and M. Haardt, "Zero-Forcing Methods for Downlink Spatial Multiplexing in Multiuser MIMO Channels", IEEE Trans. Sig. Processing, vol. 52, no. 2, February 2004, pp. 461-471.

Non-Patent Document 3: Wireless LAN Medium Access Control (MAC) and Physical Layer (PHY) Specifications, IEEE Std. 802.11-2012.

Non-Patent Document 4: Wireless LAN Medium Access Control (MAC) and Physical Layer (PHY) Specifications, IEEE Std. 802.11ac, 2013.

Non-Patent Document 5: H. Fukuzono, T. Murakami, R. Kudo. Y. Takatori, and M. Mizoguchi, "Weighted-combining calibration for implicit feedback beamforming on downlink multiuser MIMO systems", in Proc. IEEE PIMRC13, September, 2013, pp. 846-850.

SUMMARY OF INVENTION

Problems to be Solved by the Invention

However, in the implicit feedback beamforming technology, the difference between uplink propagation channel information indicating propagation channel information of the uplink data transmission and downlink propagation channel information indicating propagation channel information of the downlink data transmission needs to be calibrated at high precision. When the precision of calibration is low, there is a problem in that throughput is degraded and communication quality is significantly degraded.

As described above, in MU-MIMO, an estimation method of either the terminal station estimation method or the base station estimation method is used for acquiring the propagation channel information of the downlink. In the terminal station estimation method, the downlink propagation channel information is estimated from a signal from the data transmission station, and thus a known signal to be generated by the data transmission station can be generated by the data transmission station itself. Therefore, it is possible to acquire propagation channel information of the downlink corresponding to all subcarriers by transmitting a known signal corresponding to all the subcarriers necessary for MU-MIMO.

However, in the base station estimation method, the data reception station transmits a known signal, and thus the known signal is not necessarily generated for subcarriers corresponding to all transmission weight values necessary at the time of transmission in MU-MIMO. For example, in a wireless LAN system, a control signal such as a response confirmation signal may be transmitted in a form having compatibility with a subcarrier arrangement (20 MHz) of the conventional standard by arranging four 20 MHz bands for the purpose of backward compatibility.

FIG. 39 is a diagram illustrating an example of a subcarrier arrangement when a band of 80 MHz is used and an example of a subcarrier arrangement when bands of 20 MHz×4 are used. Rows of each table include a "subcarrier number", an "arrangement of 20 MHz×4", and an "arrangement of 80 MHz" and the presence/absence of a known signal in each subcarrier are shown for the case of the "arrangement of 20 MHz×4" and the case of the "arrangement of 80 MHz". In FIG. 39, there is a known signal in a filled subcarrier and there is no known signal in a whitened subcarrier.

As illustrated in FIG. 39, an arrangement of subcarriers in which known signals are generated and an arrangement of subcarriers in which no known signal is generated are different between the case in which the band of 80 MHz is used and the case in which the bands of 20 MHz×4 are used. That is, when the data reception station transmits using the bands of 20 MHz×4, there is a problem in that there is a case in which the data transmission station cannot obtain propagation channel information necessary at the time of transmission based on MU-MIMO.

Uplink propagation channel information indicating propagation channel information of the uplink data transmission differs from downlink propagation channel information indicating propagation channel information of the downlink data transmission depending on circuit characteristics of the data transmission station and the data reception station. Thus, in the implicit feedback beamforming technology, a calibration process of multiplying the uplink propagation channel information by a calibration coefficient is necessary as described above. It is known that the calibration coefficient needs to be a value in proportion to a ratio of circuit characteristics of antennas on a transmission end to circuit characteristics of antennas on a reception end in the data transmission station (see Non-Patent Document 5).

The calibration coefficient does not depend upon data reception stations with which the data transmission station communicates. In addition, a procedure of obtaining the calibration coefficient may not be executed again as long as the circuit characteristics of each antenna of the data transmission station do not change. In addition, transmit beamforming by the data transmission station significantly depends upon an estimation error of propagation channel information (channel state information (CSIT: CSI at the transmitter) on the transmission end.

When the implicit feedback beamforming is used, two estimation errors including an estimation error of the uplink propagation channel information and an estimation error of the calibration coefficient are included in the propagation channel information of the data transmission station. When the estimation error of the calibration coefficient is large, there is a problem in that the quality of communication is significantly degraded.

In addition, when the implicit feedback (IFB) beamforming is applied to an MU-MIMO transmission system of the IEEE 802.11ac standard or the like, there are a first problem and a second problem as follows.

The first problem: Estimation of uplink propagation channel information based on a confirmation signal (BA: Block Acknowledgement) of previous communication.

The estimation of the uplink propagation channel information indicating the propagation channel information of the uplink data transmission can be performed through a training preamble of the confirmation signal of the previous communication. However, there are many cases in which a control frame such as the confirmation signal is copied and transmitted for each 20 [MHz] for the purpose of decreasing a sampling frequency to reduce signal processing power consumption when MU-MIMO transmission is performed using a plurality of frequency channels of 20 [MHz] such as 40 [MHz] or 80 [MHz]. That is, there are many cases in which the control frame such as the confirmation signal is transmitted in a "non-HT duplicate" mode.

In this case, because there is no training signal in a guard band portion, it is impossible for the data transmission station to acquire necessary uplink propagation channel information. In addition, when the data reception station includes a plurality of antennas, the control frame such as the confirmation signal (BA) is generally transmitted using single antenna transmission (SISO: Single-Input Single-Output or SIMO: Single-Input Multiple-Output) in which stable transmission quality is obtained because it is not necessary to shorten spatial multiplexing transmission as compared with a data frame.

The uplink propagation channel information is necessary for all antennas to be used in MU-MIMO in the data reception stations. In addition, with respect to the characteristics of MU-MIMO transmission based on the implicit feedback (IFB), there is a possibility that a sufficient signal-to-noise ratio (SNR) cannot be obtained because the SNR of estimation of the uplink propagation channel information decreases when it is impossible to perform transmission while increasing transmit power of the data reception stations (terminal station apparatuses) as compared with that of the data transmission station (base station apparatus). As a method for improving the estimation precision of propagation channel information, there is a method for combining results estimated using a plurality of training symbols (see Clause. 18.3.3 in Non-Patent Document 3).

The second problem: Calculation of a calibration coefficient based on the explicit feedback (EFB) beamforming.

A ratio of circuit characteristics of the antennas on the transmission end to circuit characteristics of the antennas on the reception side in the data transmission station is obtained by dividing a response of downlink propagation channel information by a response of uplink propagation channel information based on reciprocity of propagation channels (communication paths). The data transmission station can calculate the calibration coefficient if the response of the downlink propagation channel information and the response of the uplink propagation channel information can be obtained.

In the explicit feedback (EFB), the uplink propagation channel information is obtained from a training preamble portion of a propagation channel information feedback (CSI-FB: Channel State Information-Feedback) frame. In addition, in the explicit feedback (EFB), the downlink propagation channel information is obtained from a data portion of the propagation channel information feedback (CSI-FB) frame.

Thus, it is only necessary for the data transmission station to use an explicit feedback sequence in the calculation of the calibration coefficient. In this case, a problem (1) and a problem (2) are present. The problem (1) occurs in the case in which the data reception station uses different antennas in transmission and reception. In this case, because it is impossible to exploit reciprocity of propagation channels, it is impossible for the data transmission station to calculate the calibration coefficient.

The problem (2) occurs in the case in which the data reception station transmits and receives data using a plurality of antennas. In this case, the data reception station may transmit an implicit feedback (IFB) frame using a single antenna so that packet loss does not occur.

In the MU-MIMO technology, the base station estimation method may be used to realize high throughput. As described above, circuit characteristics of transmission of the data reception station and reception of the data transmission station related to the uplink propagation are different from circuit characteristics of transmission of the data transmission station and reception of the data reception station related to the downlink propagation. Thus, in the base station estimation method, the uplink propagation channel information differs from the downlink propagation channel information and the calibration process of multiplying the uplink propagation channel information by the calibration coefficient is necessary. However, an estimation error of the calibration coefficient increases depending on a temporal change in circuit characteristics and/or estimation errors of the uplink propagation channel information and the downlink propagation channel information. When the estimation error of the calibration coefficient increases, there is a problem in that the quality of communication is significantly degraded.

The present invention has been made in view of the above-described points and an object thereof is to provide a wireless communication apparatus and a wireless communication method having high quality of communication based on MIMO transmission.

Also, an object of the present invention is to provide a wireless communication apparatus and a wireless communication method capable of acquiring transmission weight values necessary in MU-MIMO (spatial multiplexing transmission using the same frequency band at the same time) for a plurality of data reception stations even when propagation channel information cannot be obtained from signals transmitted from a plurality of data reception stations to a data transmission station (wireless communication apparatus).

Also, an object of the present invention is to provide a wireless communication apparatus and a wireless communication method with which implicit feedback beamforming is applicable to an MIMO transmission system.

Means for Solving the Problems

An aspect of the present invention is a wireless communication apparatus including: a designation unit which generates format designation information for designating a format of transmission and reception for another wireless communication apparatus; a first transmission unit which wirelessly transmits the format designation information to the other wireless communication apparatus; an acquisition unit which acquires a packet; a propagation channel estimation unit which estimates uplink propagation channel information indicating a propagation channel from the other wireless communication apparatus to the wireless communication apparatus based on the packet; a calibration coefficient calculation unit which calculates a calibration coefficient based on downlink propagation channel information indicating a propagation channel from the wireless communication apparatus to the other wireless communication apparatus and the uplink propagation channel information; a transmission weight value calculation unit which calculates a transmission weight value based on the calibration coefficient and the uplink propagation channel information; and a second transmission unit which wirelessly transmits a predetermined signal to the other wireless communication apparatus based on the transmission weight value.

Preferably, the designation unit performs designation so that a known signal for dealing with estimation of the uplink propagation channel information corresponding to a necessary band is transmitted.

Preferably, the designation unit performs designation so that a known signal for dealing with estimation of the uplink propagation channel information corresponding to a plurality of antennas is transmitted using the same antenna as that at a time of reception.

Preferably, when the other wireless communication apparatus receives a signal via a plurality of antennas, the designation unit designates a format with which the uplink propagation channel information corresponding to the plurality of antennas is capable of being estimated as a format of a training preamble of a frame of the packet for providing a notification of the downlink propagation channel information.

Preferably, the designation unit designates a transmission operation so that the other wireless communication apparatus transmits the downlink channel information estimated by the other wireless communication apparatus without decomposing the downlink channel information.

Preferably, the designation unit designates an antenna to be used in transmission and reception so that the antenna to be commonly used in the transmission and the reception is selected when the calibration coefficient is calculated.

Preferably, when the other wireless communication apparatus receives a signal via a plurality of antennas, the designation unit designates a transmission operation so that a packet including the downlink propagation channel information is transmitted for each antenna.

An aspect of the present invention is a wireless communication method in a wireless communication apparatus, the method including: a step of generating format designation information for designating a format of transmission and reception for another wireless communication apparatus; a step of wirelessly transmitting the format designation information to the other wireless communication apparatus; a step of acquiring a packet; a step of estimating uplink propagation channel information indicating a propagation channel from the other wireless communication apparatus to the wireless communication apparatus based on the packet; a step of calculating a calibration coefficient based on downlink propagation channel information indicating a propagation channel from the wireless communication apparatus to the other wireless communication apparatus and the uplink propagation channel information; a step of calculating a transmission weight value based on the calibration coefficient and the uplink propagation channel information; and a step of wirelessly transmitting a predetermined signal to the other wireless communication apparatus based on the transmission weight value.

An aspect of the present invention is a wireless communication apparatus including: a propagation channel estimation unit which estimates first uplink propagation channel information indicating a propagation channel from another wireless communication apparatus to the wireless communication apparatus based on downlink propagation channel information indicating a propagation channel from the wireless communication apparatus to the other wireless communication apparatus and a predetermined signal received from the other wireless communication apparatus; a correction value calculation unit which calculates a correction value by calculating temporary correction values based on the downlink propagation channel information and the first uplink propagation channel information and multiplying the temporary correction values by weights based on channel gains to combine the temporary correction values; a transmission weight value calculation unit which calculates a transmission weight value based on the correction value and the first uplink propagation channel information or second uplink propagation channel information; and a transmission unit which wirelessly transmits a predetermined signal to the other wireless communication apparatus through a beam formed based on the transmission weight value and the second uplink propagation channel information.

Preferably, the correction value calculation unit calculates a plurality of temporary correction values for each antenna of a plurality of other wireless communication apparatuses.

Preferably, the propagation channel estimation unit estimates a plurality of pieces of first uplink propagation channel information based on a plurality of predetermined signals, and the correction value calculation unit calculates a plurality of temporary correction values based on a plurality of pieces of downlink propagation channel information and the plurality of pieces of first uplink propagation channel information.

Preferably, the transmission unit transmits at least one of the first uplink propagation channel information, the second uplink propagation channel information, and the downlink propagation channel information to an outside of the wireless communication apparatus.

An aspect of the present invention is a wireless communication method in a wireless communication apparatus, the method including: a step of estimating first uplink propagation channel information indicating a propagation channel from another wireless communication apparatus to the wireless communication apparatus based on downlink propagation channel information indicating a propagation channel from the wireless communication apparatus to the other wireless communication apparatus and a predetermined signal received from the other wireless communication apparatus; a step of calculating a correction value by calculating temporary correction values based on the downlink propagation channel information and the first uplink propagation channel information and multiplying the temporary correction values by weights based on channel gains to combine the temporary correction values; a step of calculating a transmission weight value based on the correction value and the first uplink propagation channel information or second uplink propagation channel information; and a step of wirelessly transmitting a predetermined signal to the other wireless communication apparatus through a beam formed based on the transmission weight value and the second uplink propagation channel information.

An aspect of the present invention is a wireless communication apparatus including: an acquisition unit which acquires a packet; a propagation channel estimation unit which estimates uplink propagation channel information indicating a propagation channel from another wireless communication apparatus to the wireless communication apparatus based on the packet; a calibration coefficient calculation unit which calculates first calibration coefficients based on downlink propagation channel information indicating a propagation channel from the wireless communication apparatus to the other wireless communication apparatus and the uplink propagation channel information; a correlation processing unit which determines a second calibration coefficient based on a correlation between the first calibration coefficients in a frequency domain; a transmission weight value calculation unit which calculates a transmission weight value based on the second calibration coefficient and the uplink propagation channel information; and a transmission unit which wirelessly transmits a predetermined signal to the other wireless communication apparatus based on the transmission weight value.

Preferably, the correlation processing unit combines the first calibration coefficients corresponding to adjacent subcarriers predetermined in the frequency domain based on weights in accordance with the correlation between the first calibration coefficients corresponding to the adjacent subcarriers and determines the second calibration coefficient based on a combined result.

Preferably, the correlation processing unit selects a first calibration coefficient in which a signal to noise ratio is highest from among first calibration coefficients corresponding to adjacent subcarriers predetermined in the frequency domain as the second calibration coefficient.

Preferably, when a received signal strength is less than a predetermined value, the correlation processing unit relatively increases the number of subcarriers to be used in calibration.

An aspect of the present invention is a wireless communication method in a wireless communication apparatus, the method including: a step of acquiring a packet; a step of estimating uplink propagation channel information indicating a propagation channel from another wireless communication apparatus to the wireless communication apparatus based on the packet; a step of calculating first calibration coefficients based on downlink propagation channel information indicating a propagation channel from the wireless communication apparatus to the other wireless communication apparatus and the uplink propagation channel information; a step of determining a second calibration coefficient based on a correlation between the first calibration coefficients in a frequency domain; a step of calculating a transmission weight value based on the second calibration coefficient and the uplink propagation channel information; and a step of wirelessly transmitting a predetermined signal to the other wireless communication apparatus based on the transmission weight value.

An aspect of the present invention is a wireless communication apparatus including: a reception unit which receives a radio signal; a demodulation unit which demodulates the radio signal and generates a demodulated signal in accordance with a demodulated result; a propagation channel estimation unit which estimates uplink propagation channel information indicating a propagation channel from another wireless communication apparatus to the wireless communication apparatus based on the demodulated signal; a calibration coefficient calculation unit which calculates a new calibration coefficient as a last calibration coefficient based on downlink propagation channel information indicating a propagation channel from the wireless communication apparatus to the other wireless communication apparatus and the uplink propagation channel information; a calibration coefficient storage unit which stores a history of the new calibration coefficient as an old calibration coefficient; a calibration coefficient update unit which calculates a calibration coefficient for value calculation based on the new calibration coefficient and the old calibration coefficient; a transmission weight value calculation unit which calculates a transmission weight value based on the calibration coefficient for value calculation and the uplink propagation channel information; a modulation unit which generates a modulated signal in accordance with a result of modulating data; and a transmission unit which wirelessly transmits a predetermined signal based on the modulated signal to the other wireless communication apparatus based on the transmission weight value.

Preferably, the wireless communication apparatus includes a first determination unit which determines a timing at which the calibration coefficient calculation unit calculates the new calibration coefficient based on a change in the old calibration coefficient.

Preferably, the wireless communication apparatus includes a second determination unit which determines a timing at which the calibration coefficient calculation unit calculates the new calibration coefficient based on reception characteristics of a predetermined signal received by the other wireless communication apparatus under control of the wireless communication apparatus or by another wireless communication apparatus which is not under control of the wireless communication apparatus.

An aspect of the present invention is a wireless communication method in a wireless communication apparatus, the method including: a step of receiving a radio signal; a step of demodulating the radio signal and generating a demodulated signal in accordance with a demodulated result; a step of estimating uplink propagation channel information indicating a propagation channel from another wireless communication apparatus to the wireless communication apparatus based on the demodulated signal; a step of calculating a new calibration coefficient as a last calibration coefficient based on downlink propagation channel information indicating a propagation channel from the wireless communication apparatus to the other wireless communication apparatus and the uplink propagation channel information; a step of storing a history of the new calibration coefficient as an old calibration coefficient; a step of calculating a calibration coefficient for value calculation based on the new calibration coefficient and the old calibration coefficient; a step of calculating a transmission weight value based on the calibration coefficient for value calculation and the uplink propagation channel information; a step of generating a modulated signal in accordance with a result of modulating data; and a step of wirelessly transmitting a predetermined signal based on the modulated signal to the other wireless communication apparatus based on the transmission weight value.

An aspect of the present invention is a wireless communication apparatus for performing spatial multiplexing transmission using the same frequency band at the same time when data is transmitted to a plurality of other wireless communication apparatuses, the wireless communication apparatus including: a propagation channel estimation unit which estimates propagation channel information between the other wireless communication apparatuses and the wireless communication apparatus for each of subcarriers included in the same frequency band based on known signals included in signals received from the other wireless communication apparatuses; a propagation channel interpolation unit which interpolates propagation channel information of a subcarrier for which no propagation channel information has been obtained based on the propagation channel information estimated by the propagation channel estimation unit and outputs the propagation channel information estimated by the propagation channel estimation unit and the interpolated propagation channel information; a transmission weight value calculation unit which calculates a transmission weight value based on the propagation channel information output by the propagation channel interpolation unit; and a transmission unit which transmits data multiplexed based on the transmission weight value calculated by the transmission weight value calculation unit to the plurality of other wireless communication apparatuses.

Preferably, the wireless communication apparatus further includes: a propagation channel storage unit which stores the propagation channel information estimated by the propagation channel estimation unit; and a propagation channel correlation calculation unit which calculates a correlation value between the propagation channel information estimated by the propagation channel estimation unit and the propagation channel information stored in the propagation channel storage unit, and, when the propagation channel information of the subcarrier for which no propagation channel information has been obtained is interpolated based on the signal received from the other wireless communication apparatus, the propagation channel interpolation unit selects, based on the correlation value calculated by the propagation channel correlation calculation unit, whether to perform interpolation using the propagation channel information estimated by the propagation channel estimation unit or to perform interpolation using the propagation channel information stored in the propagation channel storage unit for the subcarrier and the propagation channel information estimated by the propagation channel estimation unit.

An aspect of the present invention is a wireless communication apparatus for performing spatial multiplexing transmission using the same frequency band at the same time when data is transmitted to a plurality of other wireless communication apparatuses, the wireless communication apparatus including: a propagation channel estimation unit which estimates propagation channel information between the other wireless communication apparatuses and the wireless communication apparatus for each of subcarriers included in the same frequency band based on known signals included in signals received from the other wireless communication apparatuses; a transmission weight value calculation unit which calculates a transmission weight value based on the propagation channel information estimated by the propagation channel estimation unit; a transmission weight value interpolation unit which interpolates a transmission weight value of a subcarrier for which no transmission weight value has been obtained based on the transmission weight value calculated by the transmission weight value calculation unit and outputs the transmission weight value calculated by the transmission weight value calculation unit and the interpolated transmission weight value; and a transmission unit which transmits data multiplexed based on the transmission weight value output by the transmission weight value interpolation unit to the plurality of other wireless communication apparatuses.

Preferably, the wireless communication apparatus further includes: a transmission weight storage unit which stores the transmission weight value calculated by the transmission weight value calculation unit; and a transmission weight correlation calculation unit which calculates a correlation value between the transmission weight value calculated by the transmission weight value calculation unit and the transmission weight value stored in the transmission weight storage unit, and, when the transmission weight value of the subcarrier for which no transmission weight value has been obtained based on the signals received from the other wireless communication apparatuses is interpolated, the transmission weight value interpolation unit selects, based on the correlation value calculated by the transmission weight correlation calculation unit, whether to perform interpolation using the transmission weight value calculated by the transmission weight value calculation unit or to perform interpolation using the transmission weight value stored in the transmission weight storage unit for the subcarrier and the transmission weight value calculated by the transmission weight value calculation unit.

An aspect of the present invention is a wireless communication method performed by a wireless communication apparatus which performs spatial multiplexing transmission using the same frequency band at the same time when data is transmitted to a plurality of other wireless communication apparatuses, the method including: a propagation channel estimation step of estimating propagation channel information between the other wireless communication apparatuses and the wireless communication apparatus for each of subcarriers included in the same frequency band based on known signals included in signals received from the other wireless communication apparatuses; a propagation channel interpolation step of interpolating propagation channel information of a subcarrier for which no propagation channel information has been obtained based on the propagation channel information estimated in the propagation channel estimation step and outputting the propagation channel information estimated in the propagation channel estimation step and the interpolated propagation channel information; a transmission weight value calculation step of calculating a transmission weight value based on the propagation channel information output in the propagation channel interpolation step; and a transmission step of transmitting data multiplexed based on the transmission weight value calculated in the transmission weight value calculation step to the plurality of other wireless communication apparatuses.

An aspect of the present invention is a wireless communication method performed by a wireless communication apparatus which performs spatial multiplexing transmission using the same frequency band at the same time when data is transmitted to a plurality of other wireless communication apparatuses, the method including: a propagation channel estimation step of estimating propagation channel information between the other wireless communication apparatuses and the wireless communication apparatus for each of subcarriers included in the same frequency band based on known signals included in signals received from the other wireless communication apparatuses; a transmission weight value calculation step of calculating a transmission weight value based on the propagation channel information estimated in the propagation channel estimation step; a transmission weight value interpolation step of interpolating a transmission weight value of a subcarrier for which no transmission weight value has been obtained based on the transmission weight value calculated in the transmission weight value calculation step and outputting the transmission weight value calculated in the transmission weight value calculation step and the interpolated transmission weight value; and a transmission step of transmitting data multiplexed based on the transmission weight value output in the transmission weight value interpolation step to the plurality of other wireless communication apparatuses.

Advantageous Effects of the Invention

In accordance with the present invention, the designation unit generates format designation information for designating a format of transmission and reception for another wireless communication apparatus. The first transmission unit wirelessly transmits the format designation information to the other wireless communication apparatus. Thereby, in the wireless communication apparatus and the wireless communication method, implicit feedback beamforming is applicable to an MIMO transmission system.

In addition, in accordance with the present invention, the correction value calculation unit calculates a correction value by calculating temporary correction values based on downlink propagation channel information and first uplink propagation channel information and multiplying weights based on channel gains by the temporary correction values to combine the temporary correction values. Thereby, in the wireless communication apparatus and the wireless communication method, the quality of communication based on MIMO transmission is high.

In addition, in accordance with the present invention, the correlation processing unit determines a second calibration coefficient based on correlation of first calibration coefficients in a frequency domain. Thereby, in the wireless communication apparatus and the wireless communication method, it is possible to improve the quality of communication based on MIMO transmission.

In addition, in accordance with the present invention, the calibration coefficient update unit calculates a calibration coefficient for value calculation based on a new calibration coefficient and an old calibration coefficient. The transmission weight value calculation unit calculates a transmission weight value based on the calibration coefficient for value calculation and the uplink propagation channel information. Thereby, in the wireless communication apparatus and the wireless communication method, it is possible to improve the quality of communication based on MIMO transmission.

In addition, in accordance with the present invention, propagation channel information or a transmission weight value in a subcarrier for which the propagation channel information or the transmission weight value cannot be obtained based on a received signal is interpolated based on the obtained propagation channel information or transmission weight value. Thereby, even when the propagation channel information or the transmission weight value cannot be obtained from the signal received from the data reception stations, it is possible to acquire the propagation channel information and the transmission weight value necessary in spatial multiplexing transmission using the same frequency band at the same time for a plurality of data reception stations.

BRIEF DESCRIPTION OF DRAWINGS

FIG. 39 is a diagram illustrating an example of a subcarrier arrangement when bands of 80 MHz and 20 MHz×4 are used.

MODES FOR CARRYING OUT THE INVENTION

First Embodiment

Figure 1:
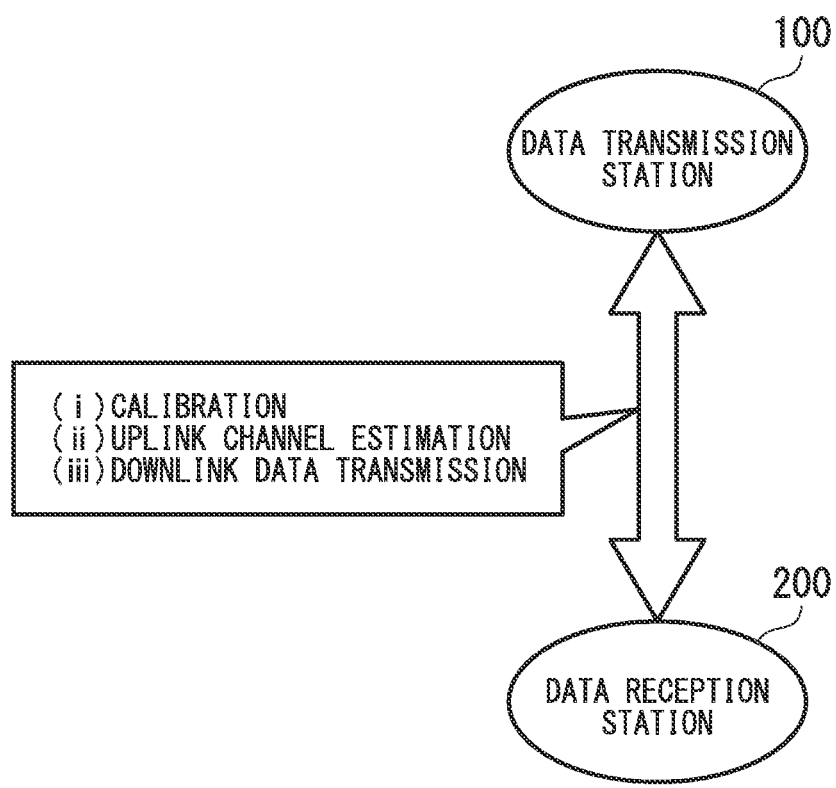
FIG. 1 is a diagram illustrating a configuration example of a wireless communication system based on SU-MIMO in a first embodiment of the present invention.

The first embodiment of the present invention will be described in detail with reference to the drawings. FIG. 1 illustrates a configuration example of a wireless communication system based on SU-MIMO. The wireless communication system includes a data transmission station 100 and a data reception station 200. Hereinafter, the direction from the data transmission station 100 to the data reception station 200 is referred to as a "downlink". In addition, the direction from the data reception station 200 to the data transmission station 100 is referred to as an "uplink".

A plurality of data reception stations 200 may be provided, such as a data reception station 200-1, . . . , a data reception station 200-m, . . . , and a data reception station 200-M (M is an integer greater than or equal to 2). However, because SU-MIMO is described in the first embodiment, the case in which the number of the data reception stations 200 is one (M=1) will be described.

The data transmission station 100 generates a radio packet. The generated radio packet may include an identifier for identifying the data transmission station 100 and an identifier for identifying the data reception station 200. The data transmission station 100 performs radio packet communication with the data reception station 200. This radio packet communication can be divided into (i) a calibration step, (ii) an uplink channel estimation step, and (iii) a downlink data transmission step.

For example, this radio packet communication may be communication using the same frequency channels in accordance with a carrier sense multiple access/collision avoidance (CSMA/CA) scheme. The data transmission station 100, for example, is an access point (AP) in a wireless local area network (LAN).

The data reception station 200 (STA: Station) performs the radio packet communication with the data transmission station 100. The data reception station 200 is an apparatus serving as a destination of the radio packet generated by the data transmission station 100. The data reception station 200, for example, is a computer or a portable information electronic device.

Next, a configuration example of the data transmission station will be described.

Figure 2:
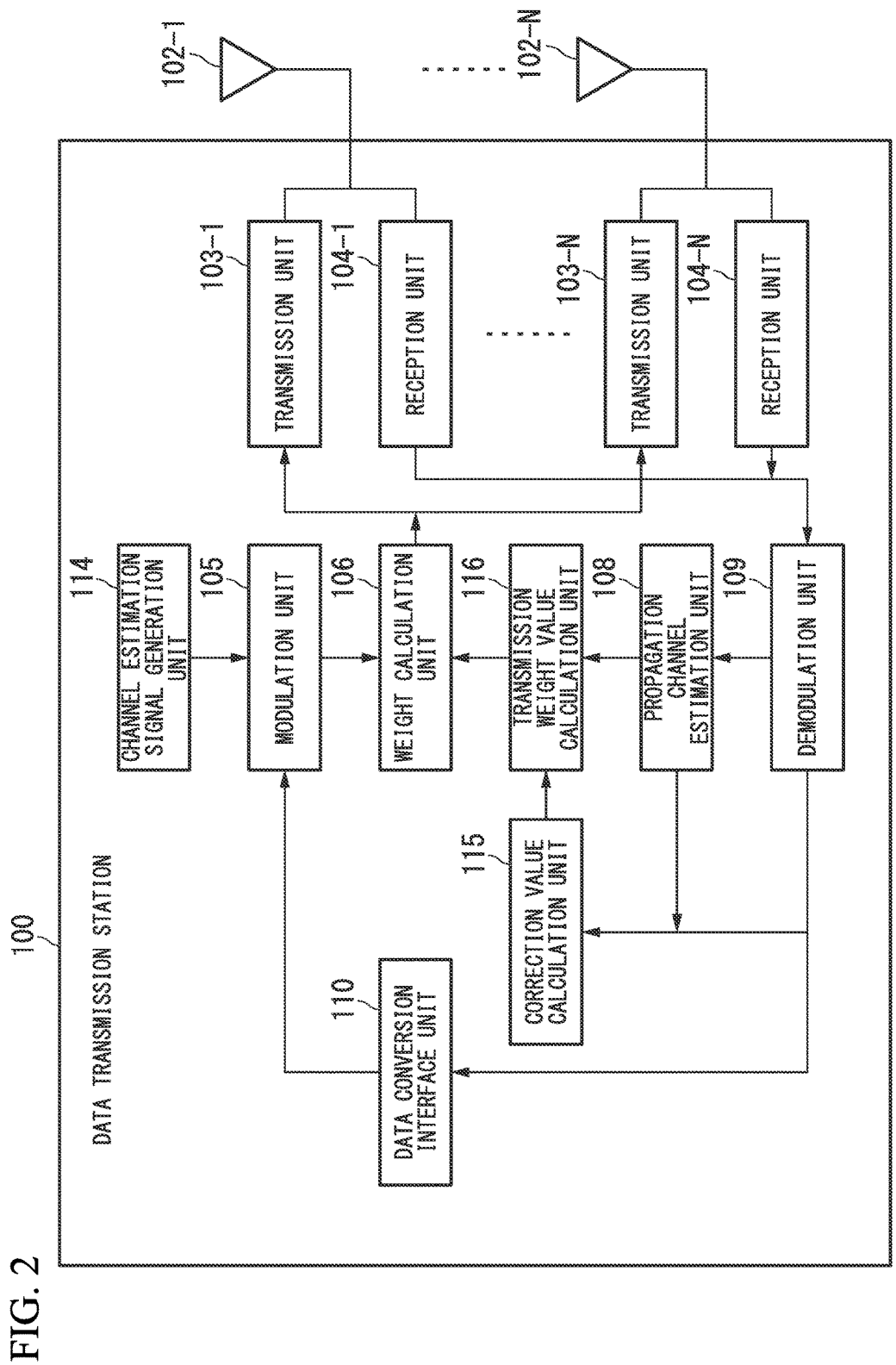
FIG. 2 is a block diagram illustrating a configuration example of a data transmission station in the first embodiment of the present invention.

FIG. 2 is a block diagram illustrating the configuration example of the data transmission station. The data transmission station 100 includes antennas 102, reception units 104, a demodulation unit 109, a propagation channel estimation unit 108, a transmission weight value calculation unit 116, a correction value calculation unit 115, a data conversion interface unit 110, a channel estimation signal generation unit 114, a modulation unit 105, a weight calculation unit 106, and transmission units 103.

The antennas 102 transmit and receive signals indicating radio packets to and from the data reception station 200. Hereinafter, the case in which a plurality of (N) antennas 102 are provided in the data transmission station 100 will be described. That is, antennas 102-$n$ ($n$ is any integer of 1 to N) are provided in the data transmission station 100. Hereinafter, with respect to descriptions that apply to all the antennas 102-$n$, they will be denoted as "antenna(s) 102" with the reference sign "-$n$" omitted.

The transmission units 103 are provided for the antennas 102 in the data transmission station 100. A signal indicating a radio packet to be downlink-transmitted is input from the weight calculation unit 106 to the transmission units 103-$n$ ($n$ is any integer of 1 to N). Hereinafter, with respect to descriptions that apply to all the transmission units 103-$n$, they will be denoted as "transmission unit(s) 103" with the reference sign "-$n$" omitted.

The transmission units 103 converts the frequency of the signal indicating the radio packet to be downlink-transmitted into a predetermined frequency defined in the wireless communication system. In addition, the transmission units 103 perform adjustment or the like of transmit power of the signal indicating the radio packet to be downlink-transmitted and output signals indicating the radio packet to be downlink-transmitted to the antennas 102-$n$.

The reception units 104 are provided for the antennas 102 in the data transmission station 100. The reception units 104-$n$ ($n$ is any integer of 1 to N) convert the frequency of signals indicating a radio packet uplink-received via the antennas 102-$n$ into a predetermined frequency. In addition, the reception units 104-$n$ perform adjustment or the like of receive power of the uplink-received signals indicating the radio packet and output the signals indicating the radio packet to the demodulation unit 109. Hereinafter, with respect to descriptions that apply to all the reception units 104-*n* will be denoted as "reception unit(s) 104" with the reference sign "-n" omitted.

The uplink-received signals indicating the radio packet are input from the reception units 104-*n* to the demodulation unit 109. The demodulation unit 109 performs a demodulation process on the uplink-received signals indicating the radio packet. The demodulation unit 109 outputs a demodulated signal indicating the radio packet to the propagation channel estimation unit 108, the correction value calculation unit 115, and the data conversion interface unit 110. Here, the demodulation unit 109 outputs downlink propagation channel information to the correction value calculation unit 115 when the demodulated signal indicating the radio packet is uplink-transmitted propagation channel information feedback (CSI-FB: Channel State Information-Feedback).

The demodulated signal indicating the radio packet is input from the demodulation unit 109 to the propagation channel estimation unit 108. For example, there is propagation channel information feedback (CSI-FB) as the demodulated signal indicating the radio packet. The propagation channel estimation unit 108 estimates uplink propagation channel information based on a preamble (predetermined signal) of the propagation channel information feedback and outputs the estimated uplink propagation channel information to the correction value calculation unit 115 and the transmission weight value calculation unit 116.

In addition, for example, there is an uplink-transmitted propagation channel estimation signal (null data packet (NDP)) as the demodulated signal indicating the radio packet. In addition, the propagation channel estimation unit 108 estimates the uplink propagation channel information based on an uplink-transmitted propagation channel estimation signal and outputs estimated uplink propagation channel information to the correction value calculation unit 115 and the transmission weight value calculation unit 116.

The estimated downlink propagation channel information is input from the demodulation unit 109 to the correction value calculation unit 115. In addition, the estimated uplink propagation channel information is input from the propagation channel estimation unit 108 to the correction value calculation unit 115. The correction value calculation unit 115 calculates correction values for calibrating the difference between the uplink propagation channel information and the downlink propagation channel information based on the uplink propagation channel information and the downlink propagation channel information. The correction value calculation unit 115 outputs information indicating the correction values to the transmission weight value calculation unit 116.

The estimated uplink propagation channel information is input from the propagation channel estimation unit 108 to the transmission weight value calculation unit 116. In addition, the information indicating the correction values is input from the correction value calculation unit 115 to the transmission weight value calculation unit 116. The transmission weight value calculation unit 116 calculates transmission weight values (transmission weights) based on the estimated uplink propagation channel information and the information indicating the correction values and outputs information indicating the transmission weight values to the weight calculation unit 106.

Here, a zero forcing (ZF) method, a minimum mean squared error (MMSE) method, and the like, which are linear calculation-based methods, may be used as a method for calculating the transmission weight values. In addition, a Tomlinson Harashima precoding (THP) method, a vector perturbation (VP) method, and the like, which are non-linear calculation-based methods, may be used as the method for calculating the transmission weight values.

The demodulated signal indicating the radio packet is input from the demodulation unit 109 to the data conversion interface unit 110. The data conversion interface unit 110 is located in a boundary between a physical layer and a medium access control layer. The data conversion interface unit 110 converts the demodulated radio packet into a data packet of a predetermined format and transmits a signal indicating the converted data packet to an external network (not illustrated).

In addition, the data conversion interface unit 110 receives a signal indicating a data packet of a predetermined format from the external network (not illustrated). The data conversion interface unit 110 converts the signal indicating the data packet received from the external network (not illustrated) into a predetermined data signal and outputs the converted data signal to the modulation unit 105.

The channel estimation signal generation unit 114 generates a propagation channel estimation signal (NDP) for estimating propagation channel information and outputs the propagation channel estimation signal to the modulation unit 105. Here, the propagation channel estimation signal is assumed to be a known signal.

The converted data signal is input from the data conversion interface unit 110 to the modulation unit 105. In addition, the propagation channel estimation signal is input from the channel estimation signal generation unit 114 to the modulation unit 105. The modulation unit 105 modulates the converted data signal into a signal indicating a radio packet and outputs the modulated signal indicating the radio packet to the weight calculation unit 106. In addition, the modulation unit 105 may modulate the propagation channel estimation signal into a signal indicating a radio packet and output the modulated signal indicating the radio packet to the weight calculation unit 106.

The modulated signal indicating the radio packet is input from the modulation unit 105 to the weight calculation unit 106. In addition, the information indicating the transmission weight values is input from the transmission weight value calculation unit 116 to the weight calculation unit 106. The weight calculation unit 106 generates a signal indicating a radio packet to be downlink-transmitted by multiplying (weight-combining) the modulated signal indicating the radio signal by the transmission weight values. The weight calculation unit 106 outputs the signal indicating the radio packet to be downlink-transmitted to the transmission units 103-*n*.

Next, a configuration example of the data reception station will be described.

Figure 3:
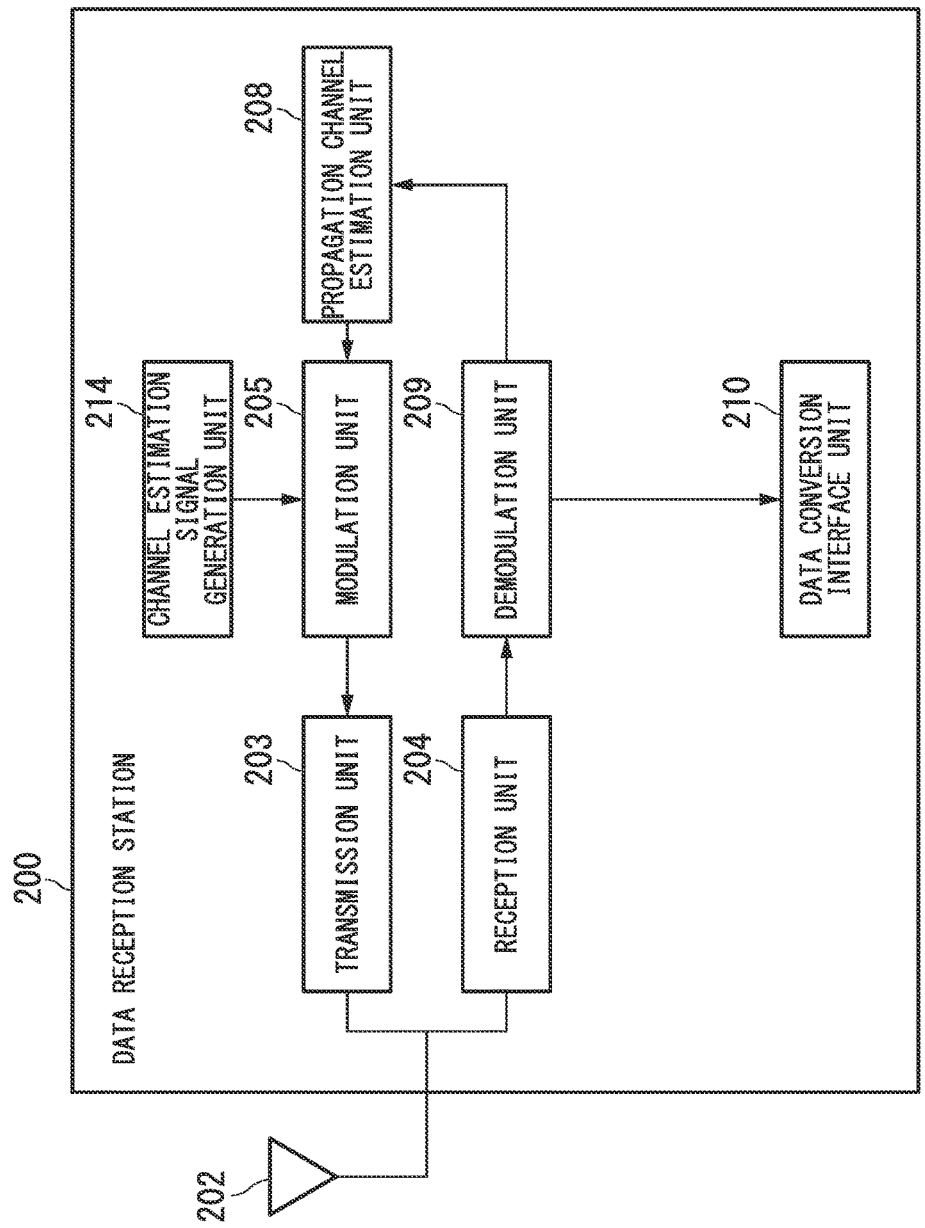
FIG. 3 is a block diagram illustrating a configuration example of a data reception station in the first embodiment of the present invention.

FIG. 3 is a block diagram illustrating the configuration example of the data reception station. The data reception station 200 includes an antenna 202, a transmission unit 203, a reception unit 204, a modulation unit 205, a propagation channel estimation unit 208, a demodulation unit 209, a data conversion interface unit 210, and a channel estimation signal generation unit 214.

The antenna 202 transmits and receives a signal indicating a radio packet to and from the data transmission station 100. Hereinafter, the case in which one antenna 202 is provided in the data reception station 200 will be described.

A signal indicating a radio packet to be uplink-transmitted is input from the modulation unit 205 to the transmission unit 203. The transmission unit 203 converts a frequency of the signal indicating the radio packet to be uplink-transmitted into a predetermined frequency defined in the wireless communication system. In addition, the transmission unit 203 performs adjustment or the like of transmit power of the signal indicating the radio packet to be uplink-transmitted and outputs the signal indicating the radio packet to be uplink-transmitted to the antenna 202.

The reception unit 204 converts a frequency of a signal indicating a radio packet downlink-received via the antenna 202 into a predetermined frequency. In addition, the reception unit 204 performs adjustment or the like of receive power of the downlink-received signal indicating the radio packet and outputs the signal indicating the radio packet to the demodulation unit 209.

The downlink-received signal indicating the radio packet is input from the reception unit 204 to the demodulation unit 209. The demodulation unit 209 performs a demodulation process on the downlink-received signal indicating the radio packet. The demodulation unit 209 outputs a demodulated signal indicating the radio packet to the propagation channel estimation unit 208 and the data conversion interface unit 210.

The demodulated signal indicating the radio packet is input from the demodulation unit 209 to the data conversion interface unit 210. The data conversion interface unit 210 is located in a boundary between a physical layer and a medium access control layer. The data conversion interface unit 210 converts the demodulated radio packet into a data packet of a predetermined format and transmits a signal indicating the converted data packet to an external network (not illustrated).

It is to be noted that the data conversion interface unit 210 may receive a signal indicating a data packet of a predetermined format from the external network (not illustrated). The data conversion interface unit 210 may convert the signal indicating the data packet received from the external network (not illustrated) into a predetermined data signal and output the converted data signal to the modulation unit 205.

The demodulated signal indicating the radio packet is input from the demodulation unit 209 to the propagation channel estimation unit 208. For example, there is a downlink-transmitted propagation channel estimation signal (NDP) as the demodulated signal indicating the radio packet. The propagation channel estimation unit 208 compares the downlink-transmitted propagation channel estimation signal with a predetermined propagation channel estimation signal. The propagation channel estimation unit 208 estimates downlink propagation channel information based on a compared result and outputs the estimated downlink propagation channel information to the modulation unit 205.

The channel estimation signal generation unit 214 generates a propagation channel estimation signal and outputs the propagation channel estimation signal to the modulation unit 205. The propagation channel estimation signal is assumed to be a known signal.

The propagation channel estimation signal is input from the channel estimation signal generation unit 214 to the modulation unit 205. In addition, the estimated downlink propagation channel information is input from the propagation channel estimation unit 208 to the modulation unit 205. The modulation unit 205 modulates the converted data signal into a signal indicating a radio packet and outputs the modulated signal indicating the radio packet to the transmission unit 203.

In addition, the modulation unit 205 modulates the propagation channel estimation signal (NDP) into a signal indicating a radio packet and outputs the modulated signal indicating the radio packet to the transmission unit 203. The modulation unit 205 modulates the estimated downlink propagation channel information into a signal indicating a radio packet and outputs a modulated signal (CSI-FB) indicating the radio packet to the transmission unit 203.

Next, an example of an operation procedure of the wireless communication system will be described.

Figure 4:
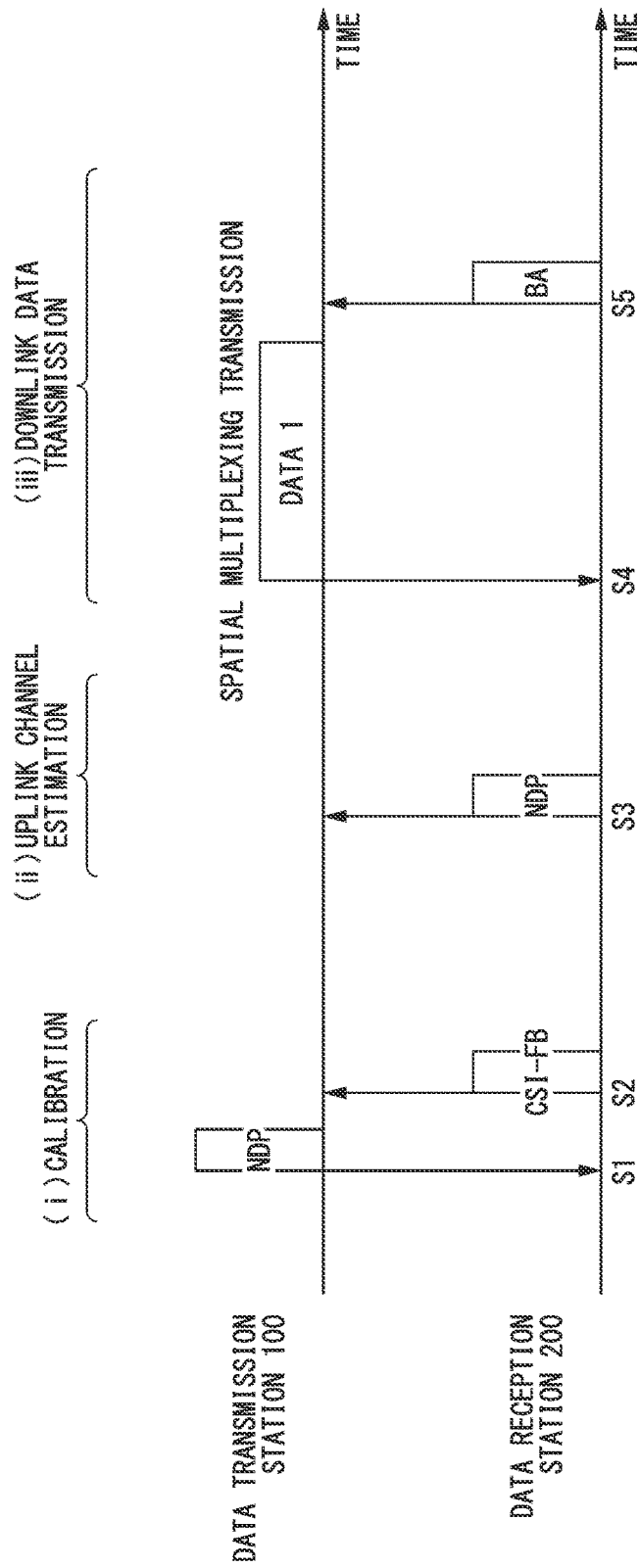
FIG. 4 is a timing chart illustrating an example of an operation procedure of the wireless communication system in the first embodiment of the present invention.

FIG. 4 is a timing chart illustrating the example of the operation procedure of the wireless communication system. Radio packet communication shown in the timing chart can be divided into (i) a calibration step, (ii) an uplink channel estimation step, and (iii) a downlink data transmission step. It is to be noted that the operation procedure shown in the timing chart is iteratively executed.

In FIG. 4, steps S1 and S2 are included in the calibration step. In addition, step S3 is included in the uplink channel estimation step. In addition, steps S4 and S5 are included in the downlink data transmission step.

(Step S1) The antennas 102-$n$ (see FIG. 2) of the data transmission station 100 transmit a propagation channel estimation signal (NDP) (training signal) to the data reception station 200.

(Step S2) The antenna 202 (see FIG. 3) of the data reception station 200 transmits a propagation channel information feedback (CSI-FB) to the data transmission station 100. The demodulation unit 109 (see FIG. 2) estimates downlink propagation channel information based on the demodulated propagation channel information feedback. The demodulation unit 109 outputs the estimated downlink propagation channel information to the correction value calculation unit 115.

The propagation channel estimation unit 108 (see FIG. 2) estimates uplink propagation channel information based on a preamble of the propagation channel information feedback (CSI-FB) and outputs the estimated uplink propagation channel information to the correction value calculation unit 115 and the transmission weight value calculation unit 116.

The downlink propagation channel information is input from the demodulation unit 109 to the correction value calculation unit 115 (sec FIG. 2). In addition, the uplink propagation channel information is input from the propagation channel estimation unit 108 to the correction value calculation unit 115. The correction value calculation unit 115 (see FIG. 2) calculates correction values C for calibrating the difference between the uplink propagation channel information and the downlink propagation channel information based on the uplink propagation channel information and the downlink propagation channel information.

Downlink propagation channel information $H_D$ is expressed by Formula (1).

[Formula 1]

$$H_D = G_{RS} H G_{TA} = \begin{bmatrix} h_{D,1,1} & h_{D,1,2} & & h_{D,1,N} \\ h_{D,2,1} & & & \\ & & \ddots & \\ h_{D,M,1} & & & h_{D,M,N} \end{bmatrix} \quad (1)$$

Here, $G_{RS}$ denotes characteristics of the reception unit 204 and the antenna 202 of the data, reception station 200. H denotes a response (communication path response) of propagation channel information in the air. Moreover, $G_{TA}$ denotes characteristics of the transmission units 103 and the antennas 102 of the data, transmission station 100, $G_{TA}$ is expressed by Formula (2).

[Formula 2]

$$G_{TA} = \begin{bmatrix} g_{TA,1} & 0 & 0 \\ 0 & \ddots & 0 \\ 0 & 0 & g_{TA,N} \end{bmatrix} \quad (2)$$

In addition, uplink propagation channel information $H_U$ is expressed by Formula (3).

[Formula 3]

$$H_U = [G_{RA} H G_{TS}]^T = \begin{bmatrix} h_{U,1,1} & h_{U,1,2} & h_{U,1,N} \\ h_{U,2,1} & & \\ & & \\ h_{U,M,1} & & h_{U,M,N} \end{bmatrix} \quad (3)$$

Here, $G_{TS}$ denotes characteristics of the transmission unit 203 and the antenna 202 of the data, reception station 200. In addition, $G_{RA}$ denotes characteristics of the reception units 104 and the antennas 102 of the data transmission station 100. A superscript T of $[G_{RA} H G_{TS}]$ shown in Formula (3) denotes transposition. $G_{RA}$ is expressed by Formula (4).

[Formula 4]

$$G_{RA} = \begin{bmatrix} g_{RA,1} & 0 & 0 \\ 0 & \ddots & 0 \\ 0 & 0 & g_{RA,N} \end{bmatrix} \quad (4)$$

The correction value calculation unit 115 calculates the correction values C based on the downlink propagation channel information $H_D$ and the uplink propagation channel information $H_U$. The correction values C are expressed by Formula (5).

[Formula 5]

$$C = \begin{bmatrix} c_1 & 0 & 0 & 0 \\ 0 & c_2 & 0 & 0 \\ 0 & 0 & \ddots & 0 \\ 0 & 0 & 0 & c_N \end{bmatrix} \quad (5)$$

It is to be noted that the correction value calculation, unit 115 can also obtain highly precise correction values C by iteratively transmitting a propagation channel estimation signal (for example, M times) (using time diversity) in radio packet communication of a predetermined period (for example, the calibration step illustrated in FIG. 4).

The uplink propagation channel information $H_U$ is input from, the propagation channel estimation unit 108 to the transmission weight value calculation unit 116. In addition, information indicating the correction values C is input from the correction value calculation unit 115 to the transmission weight value calculation, unit 116. The transmission weight value calculation, unit 116 multiplies the uplink propagation channel information $H_U$ by the corrections value C from the right as shown in Formula (6).

[Formula 6]

$$H_U' = H_U C \quad (6)$$

The transmission weight value calculation unit 116 calculates transmission weight values based on the multiplied information $H_U'$ and outputs information indicating the transmission weight values to the weight calculation unit 106. Here, it is only necessary for the correction values C to satisfy "$C_n = \beta(g_{TA,n}/g_{RA,n})$" (n is any integer of 1 to N) where $\beta$ is any complex number.

A temporary correction value $c_n^{(m)}$ for the antenna 202 of each data reception station 200 is expressed by Formula (7).

[Formula 7]

$$c_n^{(m)} = \frac{h_{U,m,n_0}}{h_{D,m,n_0}} \frac{h_{D,m,n}}{h_{U,m,n}} = \frac{g_{RA,n_0}}{g_{TA,n_0}} \frac{g_{TA,n_0}}{g_{RA,n_0}} \quad (7)$$

Here, $h_{D,m,n_0}$ is a component based on the reception unit 204 and the antenna 202 of an $m^{th}$ (m=1 in the first embodiment) data reception unit 200-$m$ and an $n_0^{th}$ transmission unit 103-$n_0$ and an $n_0^{th}$ antenna 102-$n_0$ of the data transmission station 100 among components (see Formula (1)) of the downlink propagation channel information $H_D$. It is to be noted that the $n_0^{th}$ antenna 102-$n_0$ is a reference antenna.

In addition, $h_{D,m,n}$ is a component based on the reception unit 204 and the antenna 202 of the $m^{th}$ (m=1 in the first embodiment) data reception unit 200-$m$ and an $n^{th}$ transmission unit 103-$n$ and an $n^{th}$ antenna 102-$n$ of the data transmission station 100 among the components of the downlink propagation channel information $H_D$.

In addition, $h_{U,m,n_0}$ is a component based on the reception unit 204 and the antenna 202 of the $m^{th}$ (m=1 in the first embodiment) data reception unit 200-$m$ and the $n_0^{th}$ transmission unit 103-$n_0$ and the $n_0^{th}$ antenna 102-$n_0$ of the data transmission station 100 among components (see Formula (3)) of the uplink propagation channel information $H_U$.

In addition, $h_{U,m,n}$ is a component based on the reception unit 204 and the antenna 202 of the $m^{th}$ (m=1 in the first embodiment) data reception unit 200-$m$ and the $n^{th}$ transmission unit 103-$n$ and the $n^{th}$ antenna 102-$n$ of the data transmission station 100 among the components of the uplink propagation channel information $H_U$.

The transmission weight value calculation unit 116 (see FIG. 2) calculates the transmission weight values (transmission weights) based on the estimated uplink propagation channel information and the correction values C and outputs information indicating the transmission weight values to the weight calculation unit 106. The transmission weight value calculation unit 116 can calculate highly precise transmission weight values because the transmission weight values are calculated based on the highly precise correction values C.

The weight calculation unit 106 (see FIG. 2) generates a signal indicating a radio packet to be downlink-transmitted by multiplying (weight-combining) a signal indicating the modulated radio packet by the transmission weight values.

Here, in the temporary correction value $c_n^{(m)}$ (see Formula (7)), only characteristics of the data transmission station 100 (characteristics of the antennas 102 and the circuits) are considered, and the differences between characteristics of M (M=1 in the first embodiment) data reception stations 200 are not considered. This is because the characteristics of the data reception station 200 can be estimated, together with the propagation channel information, through estimation of the uplink propagation channel information based on the propagation channel information feedback (CSI-FB) due to the propagation channel estimation signal (NDP) transmitted using beamforming. That is, the weight calculation unit 106 can select a transmit antenna and a reference antenna so as to cancel a response component of transmission circuits and reception circuits of the data reception station 200.

The components $c_n$ (see Formula (5)) of the correction values C affected by the characteristics of the M (M=1 in the first embodiment) data reception stations 200 should have the same values except for noise components. Therefore, the correction value calculation unit 115 can obtain highly precise components $c_n$ of the correction values C by performing weight combining on the temporary correction values $c_n^{(m)}$ based on weights $a_n^{(m)}$. The components $c_n$ of the correction values C are expressed by Formula (8) as an example.

[Formula 8]

$$c_n = \sum_{m=1}^{M} a_n^{[m]} c_m^{[m]} \qquad (8)$$

Here, the weight $a_n^{(m)}$ is expressed by Formula (9) as an example.

[Formula 9]

$$a_n^{(m)} = \frac{|h_{U,m,n_0} h_{D,m,n_0} h_{D,m,n} h_{U,m,n}|^2}{\left( \sum_{m'=1}^{M} |h_{U,m',n_0} h_{D,m',n_0} h_{D,m',n} h_{U,m',n}|^2 \right)} \qquad (9)$$

The weight $a_n^{(m)}$ expressed by Formula (9) represents a weighting method based on each channel gain. In this weighting method, it is possible to improve precision because a correction value (optimum correction value) having high reliability is prioritized.

In addition, the weight $a_n^{(m)}$ may be expressed by Formula (10) as an example. The weight $a_n^{(m)}$ expressed by formula (10) represents a weighting method based on channel gains.

[Formula 10]

$$a_n^{(m)} = \frac{b_n^{(m)}}{\sum_{i=1}^{M} b_n^{(i)}}, \qquad (10)$$

$$b_n^{(m)} = \left( \frac{1}{|h_{U,m,n_0}|^2} + \frac{1}{|h_{D,m,n_0}|^2} + \frac{1}{|h_{D,m,n}|^2} + \frac{1}{|h_{U,m,n}|^2} + \right)^{-1}$$

(Step S3) The antenna 202 of the data reception station 200 transmits a propagation channel estimation signal (NDP) to the data transmission station 100.

(Step S4) The propagation channel estimation unit 108 (see FIG. 2) estimates uplink propagation channel information based on the propagation channel estimation signal in order to transmit downlink data. The transmission weight value calculation unit 116 (see FIG. 2) calculates transmission weight values (transmission weights) based on the estimated uplink propagation channel information and the information indicating the correction values C and outputs information indicating the transmission weight values to the weight calculation unit 106. The weight calculation unit 106 (see FIG. 2) multiplies (weight-combines) the modulated signal indicating the radio packet by the transmission weight values.

The transmission units 103 perform adjustment or the like of transmit power of the signal indicating the radio packet to be downlink-transmitted and output signals indicating the radio packet to be downlink-transmitted to the antennas 102-$n$. The antennas 102 transmit the signals indicating the radio packet to be downlink-transmitted (data 1 in FIG. 4) to the data reception station 200 in accordance with spatial multiplexing transmission.

(Step S5) If the demodulation unit 209 (see FIG. 3) has decoded the downlink-transmitted signals indicating the radio packet (data 1 in FIG. 4) without error, the data reception station 200 transmits a predetermined confirmation signal (BA: Block Acknowledgement) to the data transmission station 100.

As described above, the data transmission station 100 (wireless communication apparatus) includes the propagation channel estimation unit 108 which estimates first uplink propagation channel information indicating a propagation channel from the data reception station 200 (another wireless communication apparatus) to the data transmission station 100 based on a predetermined signal (for example, a preamble) together with downlink propagation channel information indicating a propagation channel from the data transmission station 100 to the data reception station 200 received from the data reception station 200; the correction value calculation unit 115 which calculates correction values C (for example, see Formula (5)) by calculating temporary correction values $c_n^{(m)}$ based on the downlink propagation channel information and the first uplink propagation channel information (estimated in the calibration step) and multiplying the temporary correction values $c_n^{(m)}$ by weights $a_n^{(m)}$ based on channel gains to combine the temporary correction values $c_n^{(m)}$ (for example, see Formula (8)); the transmission weight value calculation unit 116 which calculates transmission weight values based on the correction values C and the first uplink propagation channel information or second uplink propagation channel information (estimated in the calibration step or estimated in the uplink channel estimation step); and the transmission unit 103 which wirelessly transmits a predetermined signal to the data reception station 200 through beams formed based on the transmission weight values and the second uplink propagation channel information (estimated in the uplink channel estimation step).

A wireless communication system includes the propagation channel estimation unit 108 of the data transmission station 100 which estimates first uplink propagation channel information indicating a propagation channel from the data reception station 200 to the data transmission station 100 based on a predetermined signal together with downlink propagation channel information indicating a propagation channel from the data transmission station 100 to the data reception station 200 received from the data reception station 200; the correction value calculation unit 115 of the data transmission station 100 which calculates correction values by calculating temporary correction values based on the downlink propagation channel information and the first uplink propagation channel information and multiplying the temporary correction values by weights based on channel gains to combine the temporary correction values; the transmission weight value calculation unit 116 of the data transmission station 100 which calculates transmission weight values based on the correction values and the first uplink propagation channel information or second uplink propagation channel information; and the transmission unit 103 of the data transmission station 100 which wirelessly transmits a predetermined signal to the data reception station 200 through beams formed based on the transmission weight values and the second uplink propagation channel information.

A wireless communication method of the present embodiment is a wireless communication method in a wireless communication apparatus and the wireless communication method includes: the step of estimating, by the propagation channel estimation unit 108, first uplink propagation channel information indicating a propagation channel from another wireless communication apparatus to the wireless communication apparatus based on a predetermined signal together with downlink propagation channel information indicating a propagation channel from the wireless communication apparatus to the other wireless communication apparatus received from the other wireless communication apparatus; the step of calculating, by the correction value calculation unit 115, correction values by calculating temporary correction values based on the downlink propagation channel information and the first uplink propagation channel information and multiplying the temporary correction values by weights based on channel gains to combine the temporary correction values; the step of calculating, by the transmission weight value calculation unit 116, transmission weight values based on the correction values and the first uplink propagation channel information or second uplink propagation channel information; and the step of wirelessly transmitting, by the transmission unit 103, a predetermined signal to the other wireless communication apparatus through beams formed based on the transmission weight values and the second uplink propagation channel information.

Through this configuration, the correction value calculation unit 115 calculates the correction values C by calculating the temporary correction values $c_n^{(m)}$ based on the downlink propagation channel information and the first uplink propagation channel information (estimated in the calibration step) and multiplying the temporary correction values $c_n^{(m)}$ by the weights $a_n^{(m)}$ based on the channel gains to combine the temporary correction values $c_n^{(m)}$.

Thereby, the wireless communication apparatus, the wireless communication system, and the wireless communication method in accordance with the first embodiment provide high quality of communication in SU-MIMO transmission.

That is, the wireless communication system in accordance with the first embodiment calculates the transmission weight values based on the uplink propagation channel information and performs the SU-MIMO transmission based on the calculated transmission weight values. The wireless communication system in accordance with the first embodiment can improve the effective throughput by correcting propagation channel information based on characteristic difference information between the data transmission station 100 and the data reception station 200.

In the implicit feedback beamforming technology, the difference between the uplink propagation channel information and the downlink propagation channel information is calibrated when the downlink propagation channel information is calculated based on the uplink propagation channel information. In this way, because the wireless communication system in accordance with the first embodiment does not simply fairly handle temporary correction values by the data reception station 200 (for example, temporary correction values using time diversity), the precision of the correction values C is not degraded due to a temporary correction value having low estimation precision.

The wireless communication system in accordance with the first embodiment assigns weights to data reception stations 200 based on channel gains when the correction values C are calculated. Here, the wireless communication system in accordance with the first embodiment may use time diversity as described above. Thereby, the wireless communication system in accordance with the first embodiment can improve the communication quality in SU-MIMO by prioritizing a temporary correction value $c_n^{(m)}$ having high reliability based on the weights $a_n^{(m)}$ and calculating highly precise correction values C.

The propagation channel estimation unit 108 may estimate a plurality of pieces of first uplink propagation channel information based on a plurality of predetermined signals (for example, preambles). The correction value calculation unit 115 may calculate a plurality of temporary correction values based on a plurality of pieces of downlink propagation channel information and the plurality of pieces of first uplink propagation channel information.

That is, the wireless communication system may acquire the temporary correction values by temporally iteratively transmitting a known signal (using time diversity).

The transmission weight value calculation unit 116 may calculate transmission weight values based on the first uplink propagation channel information before the second uplink propagation channel information is estimated (calibration step).

That is, when the data transmission station 100 calculates correction values, the wireless communication system may select a transmit antenna and a reference antenna for cancelling transmission and reception circuit response components of the data reception station 200 in the calibration step and use the optimum correction values.

The transmission weight value calculation unit 116 may calculate the transmission weight values based on the second uplink propagation channel information when the second uplink propagation channel information is estimated (uplink channel estimation step).

That is, the wireless communication system may perform the selection of the optimum transmit antenna and the optimum reference antenna in the uplink channel estimation step.

Second Embodiment

The second embodiment is different from the first embodiment in that there are a plurality of data reception stations (multiuser). In the second embodiment, only differences from the first embodiment will be described.

Figure 5:
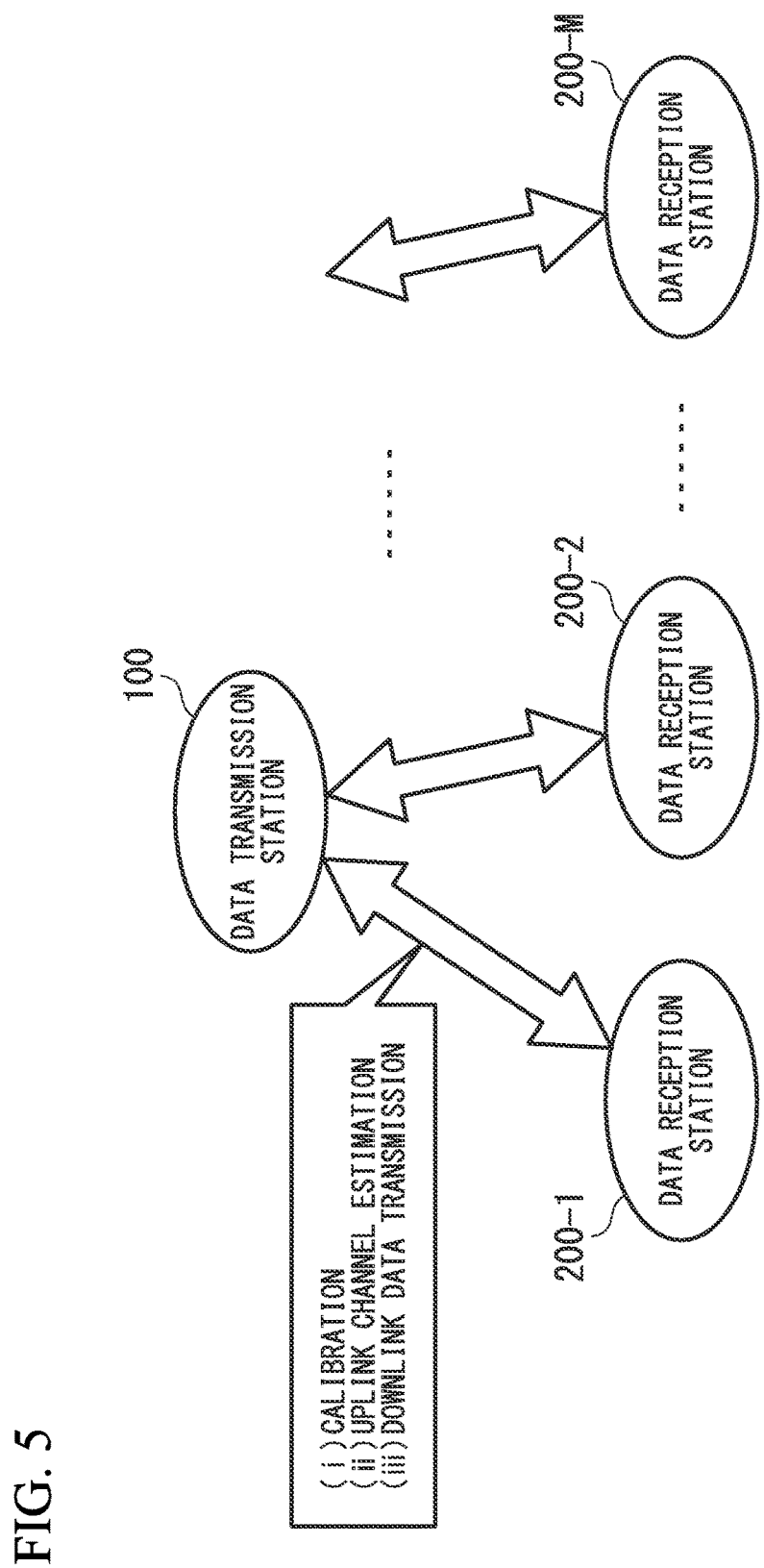
FIG. 5 is a diagram illustrating a configuration example of a wireless communication system based on MU-MIMO in a second embodiment of the present invention.

FIG. 5 is a diagram illustrating a configuration example of a wireless communication system based on MU-MIMO. The wireless communication system includes a data transmission station 100 and data reception stations 200-1 to 200-M.

In the second embodiment, the case in which there are M data reception stations 200 will be described. Hereinafter, descriptions that apply to all the data reception stations 200-m will be denoted as "data reception station(s) 200" with the reference sign "-m" omitted The data transmission station 100 generates a radio packet. An identifier for identifying the data transmission station 100 and identifiers for identifying the data reception stations 200-1 to 200-M may be included in the generated radio packet.

The data transmission station 100 performs radio packet communication with the data reception stations 200-1 to 200-M. This radio packet communication can be divided into (i) a calibration step, (ii) an uplink channel estimation step, and (iii) a downlink data transmission step. For example, the radio packet communication may be communication using the same frequency channels in accordance with the CSMA-CA scheme.

The data reception stations 200 perform the radio packet communication with the data transmission station 100. The data reception stations 200 are apparatuses serving as destinations of the radio packet generated by the data transmission station 100. The data reception stations 200, for example, are computers or portable information electronic devices.

Figure 6:
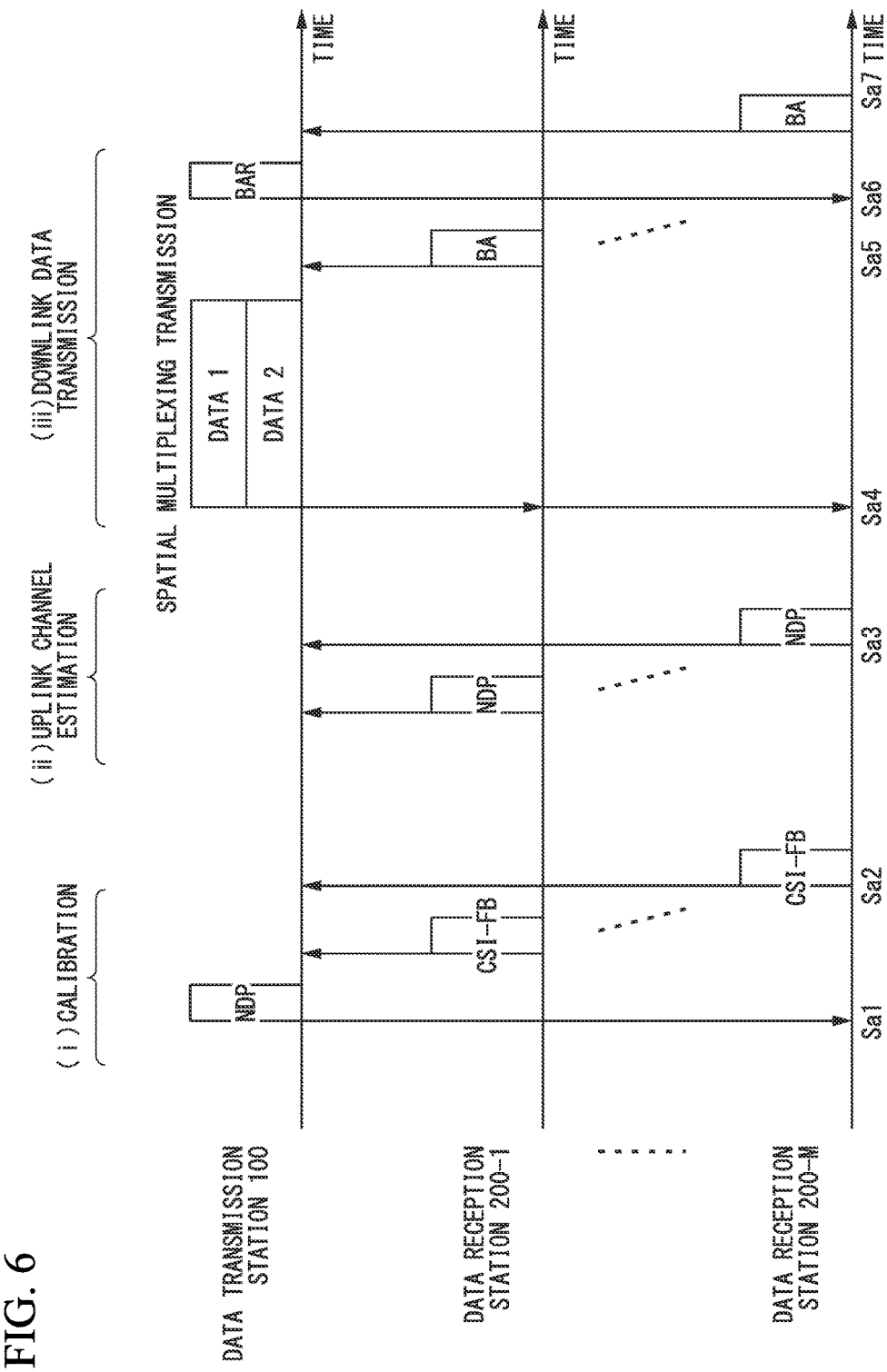
FIG. 6 is a timing chart illustrating an example of an operation procedure of the wireless communication system in the second embodiment of the present invention.

FIG. 6 is a timing chart, illustrating an example of an operation procedure of the wireless communication system. The radio packet communication shown in this timing chart can be divided into (i) a calibration step, (ii) an uplink channel estimation step, and (iii) a downlink data transmission step. It is to be noted that the operation procedure shown in the timing chart is iteratively executed.

In FIG. 6, steps Sa1 and Sa2 are included in the calibration step. In addition, step Sa3 is included in the uplink channel estimation step. In addition, steps Sa4 to Sa7 are included in the downlink data transmission step.

(Step Sa1) The antennas 102-$n$ (see FIG. 2) of the data transmission station 100 transmit a propagation channel estimation signal (NDP) (training signal) to the data reception stations 200-1 to 200-M.

(Step Sa2) The antennas 202 (see FIG. 3) of the data reception stations 200-1 to 200-M transmit propagation channel information feedback (CSI-FB) to the data transmission station 100. The demodulation unit 109 (see FIG. 2) estimates downlink propagation channel information of one or all the data reception stations 200 based on the propagation channel information feedback received from one or all the data reception stations 200 and demodulated. The demodulation unit 109 outputs the estimated downlink propagation channel information of one or all the data reception stations 200 to the correction value calculation unit 115.

The propagation channel estimation unit 108 (see FIG. 2) estimates uplink propagation channel information based on preambles of the propagation channel information feedback (CSI-FB) of one or all the data reception stations 200 and outputs the estimated uplink propagation channel information of one or all the data reception stations 200 to the correction value calculation unit 115 and the transmission weight value calculation unit 116.

The estimated downlink propagation channel information of one or all the data reception stations 200 is input from the demodulation unit 109 to the correction value calculation unit 115. In addition, the estimated uplink propagation channel information of one or all the data reception stations 200 is input from the propagation channel estimation unit 108 to the correction value calculation unit 115.

The correction value calculation unit 115 calculates correction values for calibrating the difference between the uplink propagation channel information and the downlink propagation channel information based on the uplink propagation channel information of one or all the data reception stations 200 and the downlink propagation channel information of one or all the data reception stations 200. The correction value calculation unit 115 outputs information indicating the correction values to the transmission weight value calculation unit 116.

The estimated uplink propagation channel information of one or all the data reception stations 200 is input from the propagation channel estimation unit 108 to the transmission weight value calculation unit 116. In addition, the information indicating the correction values is input from the correction value calculation unit 115 to the transmission weight value calculation unit 116.

The transmission weight value calculation unit 116 calculates transmission weight values (transmission weights) based on the estimated uplink propagation channel information of one or all the data reception stations 200 and the information indicating the correction values and outputs information indicating the transmission weight values to the weight calculation unit 106.

Because the number of the antennas of the data transmission station 100 is N, there are N candidates for a reference antenna ($n_0^{th}$ antenna) of the data transmission station 100 with respect to Formula (7). Likewise, there are N candidates for calculation of the components $c_n$ of the correction values C illustrated in Formula (8).

The correction value calculation unit 115 selects components $c_n$ of the highest precise correction values C among components $c_n$ of N correction values C in the calibration step. This selection method, for example, may be a method in which the data transmission station 100 performs beamforming so that null signals are observed by the data reception stations 200 and selects components corresponding to power closest to a value of 0.

(Step Sa3) The antennas 202 of the data reception stations 200-1 to 200-M transmit propagation channel estimation signals (NDP) to the data transmission station 100. The correction value calculation unit 115 selects the N candidates for the reference antenna (no antenna) with respect to Formula (7).

(Step Sa4) The transmission units 103 of the data transmission station 100 perform adjustment or the like of transmit power of signals indicating the radio packet to be downlink-transmitted and outputs the signals indicating the radio packet to be downlink-transmitted to the antennas 102-$n$. The antennas 102 transmit the signals (data 1 and 2 in FIG. 6) indicating the radio packet to be downlink-transmitted to the data reception stations 200-1 to 200-M through spatial multiplexing transmission.

(Step Sa5) If the demodulation unit 209 (see FIG. 3) has decoded the downlink-transmitted signal (data 1 or 2 in FIG. 6) indicating the radio packet without error, the data reception station 200-1 transmits a predetermined confirmation signal (BA) to the data transmission station 100.

(Step Sa6) The transmission units 103 of the data transmission station 100 transmit a signal (BAR: BA request) for requesting a predetermined confirmation signal to the data reception station 200-M. This process is also performed for the data reception stations 200-2 to 200-(M−1).

(Step Sa7) If the demodulation unit 209 (see FIG. 3) has decoded the downlink-transmitted signal (data 1 or 2 in FIG. 6) indicating the radio packet without error, the data reception station 200-M transmits a predetermined confirmation signal (BA) to the data transmission station 100. This process is also performed for the data reception stations 200-2 to 200-(M−1).

As described above, the data transmission station 100 (wireless communication apparatus) includes the propagation channel estimation unit 108 which estimates first uplink propagation channel information indicating a propagation channel from the data reception station 200 to the data transmission station 100 based on a predetermined signal (for example, a preamble) together with downlink propagation channel information indicating a propagation channel from the data transmission station 100 to the data reception station 200-$m$ received from the data reception station 200-$m$; the correction value calculation unit 115 which calculates correction values C by calculating temporary correction values $c_n^{(m)}$ based on the downlink propagation channel information and the first uplink propagation channel information (estimated in the calibration step) and multiplying the temporary correction values $c_n^{(m)}$ by weights $a_n^{(m)}$ based on channel gains to combine the temporary correction values $c_n^{(m)}$; the transmission weight value calculation unit 116 which calculates transmission weight values based on the correction values C and the first uplink propagation channel information or second uplink propagation channel information (estimated in the calibration step or estimated in the uplink channel estimation step); and the transmission unit 103 which wirelessly transmits a predetermined signal to the data reception station 200-$m$ through beams formed based on the transmission weight values and the second uplink propagation channel information (estimated in the uplink channel estimation step).

A wireless communication system includes the propagation channel estimation unit 108 of the data transmission station 100 which estimates first uplink propagation channel information indicating a propagation channel from the data reception station 200 to the data transmission station 100 based on a predetermined signal together with downlink propagation channel information indicating a propagation channel from the data transmission station 100 to the data reception station 200 received from the data reception station 200; the correction value calculation unit 115 of the data transmission station 100 which calculates correction values by calculating temporary correction values based on the downlink propagation channel information and the first uplink propagation channel information and multiplying the temporary correction values by weights based on channel gains to combine the temporary correction values; the transmission weight value calculation unit 116 of the data transmission station 100 which calculates transmission weight values based on the correction values and the first uplink propagation channel information or second uplink propagation channel information; and the transmission unit of the data transmission station 100 which wirelessly transmits a predetermined signal to the data reception station 200 through beams formed based on the transmission weight values and the second uplink propagation channel information.

A wireless communication method of the present embodiment is a wireless communication method in a wireless communication apparatus, and the wireless communication method includes: the step of estimating, by the propagation channel estimation unit 108, first uplink propagation channel information indicating a propagation channel from another wireless communication apparatus to the wireless communication apparatus based on a predetermined signal together with downlink propagation channel information indicating a propagation channel from the wireless communication apparatus to the other wireless communication apparatus received from the other wireless communication apparatus; the step of calculating, by the correction value calculation unit 115, correction values by calculating temporary correction values based on the downlink propagation channel information and the first uplink propagation channel information and multiplying the temporary correction values by weights based on channel gains to combine the temporary correction values; the step of calculating, by the transmission weight value calculation unit 116, transmission weight values based on the correction values and the first uplink propagation channel information or second uplink propagation channel information; and the step of wirelessly transmitting, by the transmission unit 103, a predetermined signal to the other wireless communication apparatus through beams formed based on the transmission weight values and the second uplink propagation channel information.

Through this configuration, the correction value calculation unit 115 calculates the correction values C by calculating the temporary correction values $c_n^{(m)}$ based on the downlink propagation channel information and the first uplink propagation channel information (estimated in the calibration step) and multiplying the temporary correction values $c_n^{(m)}$ by the weights $a_n^{(m)}$ based on the channel gains to combine the temporary correction values $c_n^{(m)}$.

Thereby, the wireless communication apparatus, the wireless communication system, and the wireless communication method in accordance with the second embodiment provide high communication quality in MU-MIMO transmission.

That is, the wireless communication system in accordance with the second embodiment calculates the transmission weight values based on the uplink propagation channel information and performs the MU-MIMO transmission based on the calculated transmission weight values. The wireless communication system in accordance with the second embodiment can improve the effective throughput by correcting propagation channel information based on characteristic difference information between the data transmission station 100 and the data reception station 200-$m$.

In the implicit feedback beamforming technology, the difference between the uplink propagation channel information and the downlink propagation channel information is calibrated when the downlink propagation channel information is calculated based on the uplink propagation channel information. In this way, because the wireless communication system in accordance with the second embodiment does not simply fairly handle temporary correction values by the data reception station 200-$m$, the precision of the correction values C is not degraded due to a temporary correction value having low estimation precision.

The wireless communication system in accordance with the second embodiment assigns weights to the data reception station 200-$m$ based on channel gains when the correction values C are calculated. Here, the wireless communication system in accordance with the second embodiment may use time diversity as described above. Thereby, the wireless communication system in accordance with the second embodiment can further improve the communication quality in MU-MIMO by prioritizing a temporary correction value $c_n^{(m)}$ having high reliability based on the weights $a_n^{(m)}$ and calculating highly precise correction values C.

In addition, the correction value calculation unit 115 may calculate a plurality of temporary correction values for each antenna of a plurality of other wireless communication apparatuses.

That is, in the wireless communication system, the data transmission station may acquire temporary correction values for each of the plurality of antennas of a communication partner station.

Third Embodiment

The third embodiment is different from the first and second embodiments in that a wireless communication system includes a network control server. In the third embodiment, only differences from the first and second embodiments will be described.

Figure 7:
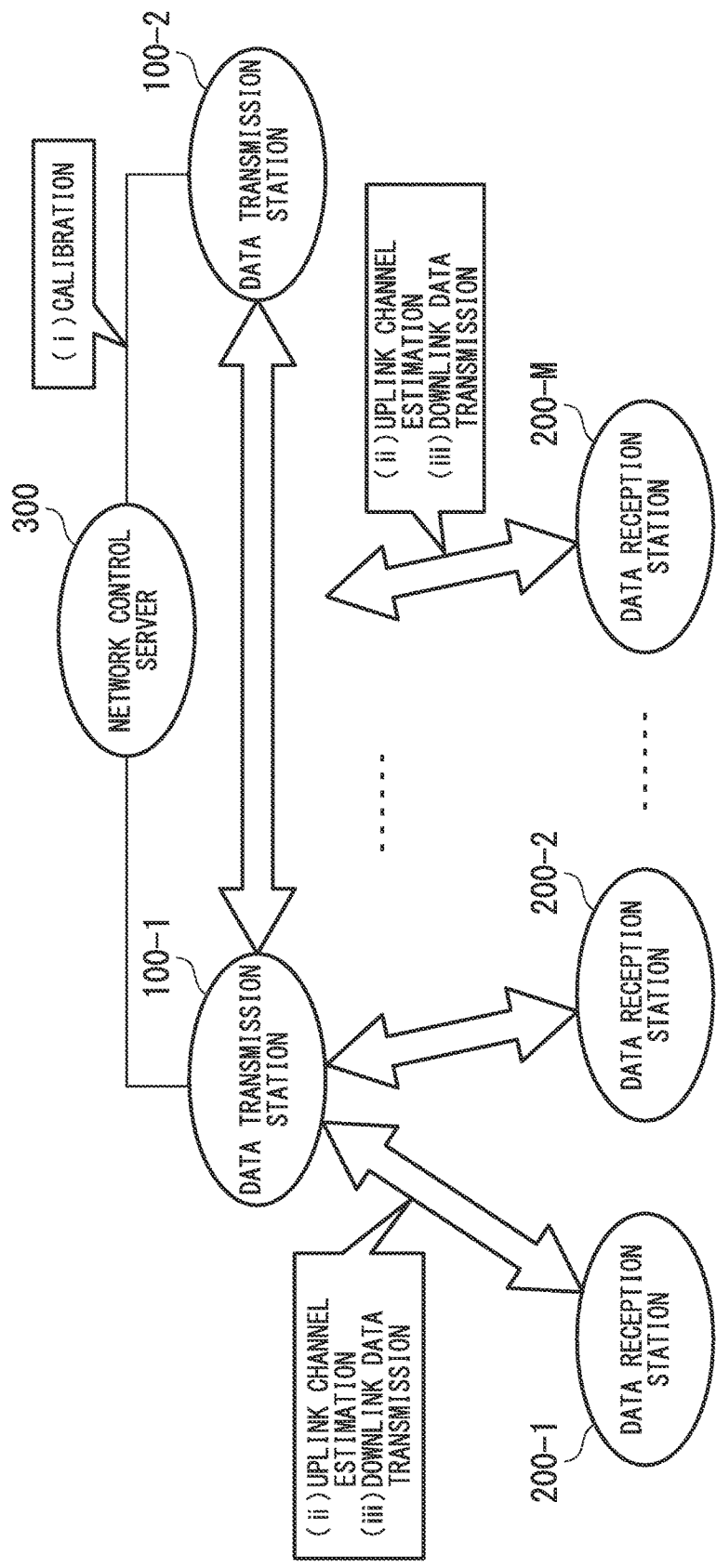
FIG. 7 is a diagram illustrating a configuration example of a wireless communication system based on network control in a third embodiment of the present invention.

FIG. 7 is a diagram illustrating a configuration example of a wireless communication system based on network control. The wireless communication system includes data transmission stations 100-1 to 100-2, data reception stations 200-1 to 200-M, and a network control server 300 (server apparatus).

The data transmission station 100-1 is fixedly installed and transmits uplink propagation channel information and downlink propagation channel information to the network control server 300. The data transmission station 100-1 receives information indicating correction values C or information indicating transmission weight values from the network control server 300.

The data transmission station 100-2 is fixedly installed and transmits uplink propagation channel information and downlink propagation channel information to the network control server 300. The data transmission station 100-2 receives information indicating correction values C or information indicating transmission weight values from the network control server 300.

The network control server 300 is connected to the data transmission station 100-1 and the data transmission station 100-2 by wire. The network control server 300 relays data communication between the data transmission station 100-1 and the data transmission station 100-2.

The uplink propagation channel information and the downlink propagation channel information are input from the data transmission stations 100-1 and 100-2 to the network control server 300. Similar to the correction value calculation unit 115 (see FIG. 2), the network control server 300 calculates the correction values C based on the uplink propagation channel information and the downlink propagation channel information.

The network control server 300 calculates the transmission weight values (transmission weights). Then, the network control server 300 notifies the data transmission stations 100-1 and 100-2 of the information indicating the correction values C or the information indicating the transmission weight values.

Figure 8:
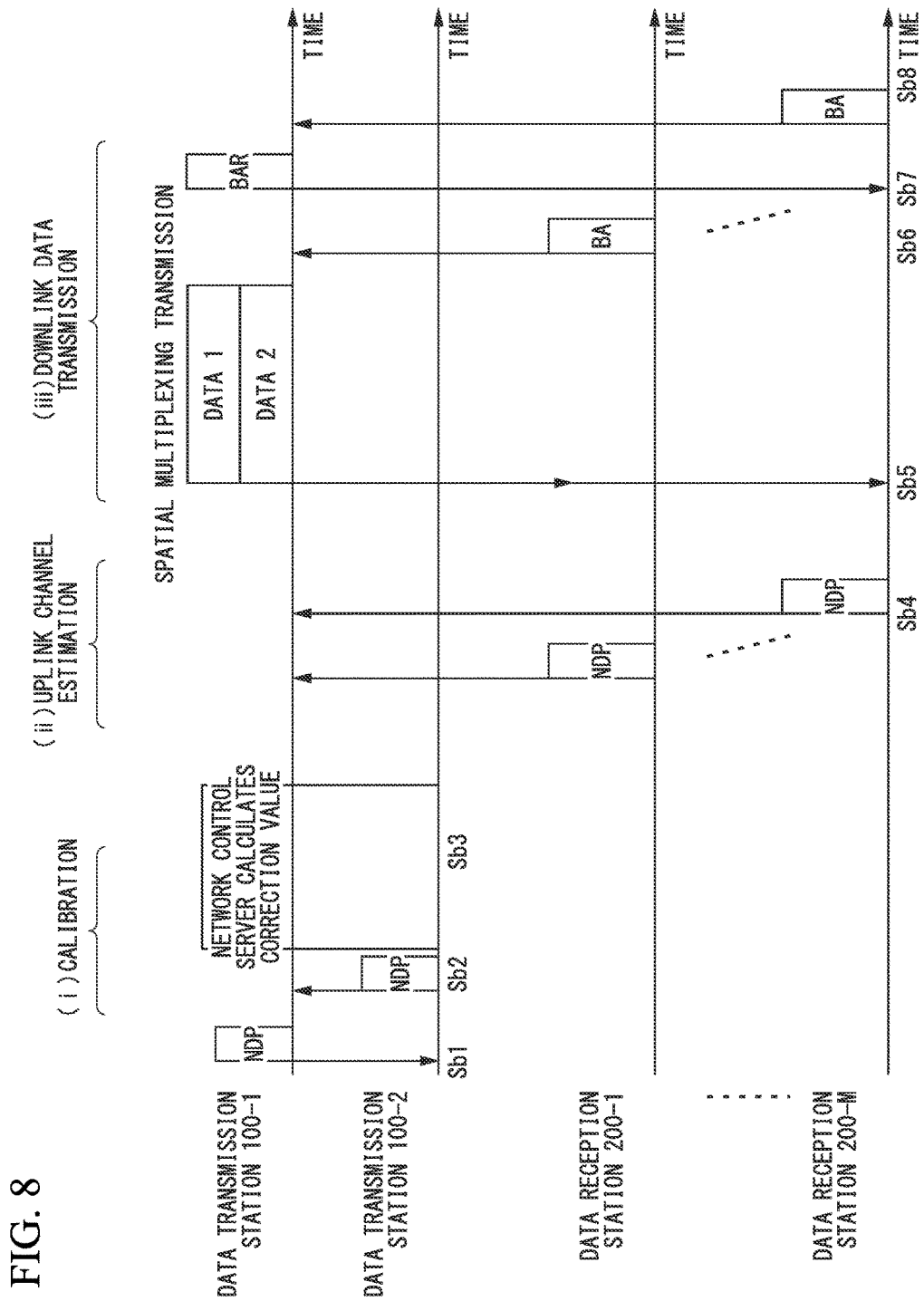
FIG. 8 is a timing chart illustrating an example of an operation procedure of the wireless communication system in the third embodiment of the present invention.

FIG. 8 is a timing chart illustrating an example of an operation procedure of the wireless communication system. Radio packet communication shown in the timing chart can be divided into (i) a calibration step, (ii) an uplink channel estimation step, and (iii) a downlink data transmission step. It is to be noted that the operation procedure shown in the timing chart is iteratively executed.

In FIG. 8, steps Sb1 to Sb3 are included in the calibration step. In addition, step Sb4 is included in the uplink channel estimation step. In addition, steps Sb5 to Sb8 are included in the downlink data transmission step.

Steps Sb1 and Sb2 are similar to steps Sa1 and Sa2 illustrated in FIG. 6 of the second embodiment. However, in this case, the notification of information (propagation channel estimation signals NDP) is provided between the data transmission stations 100-1 and 100-2.

(Step Sb3) The network control server 300 calculates correction values C and transmission weight values and notifies the data transmission stations 100-1 and 100-2 of information indicating the correction values C or information indicating the transmission weight values.

Steps Sb4 to Sb8 are similar to steps Sa3 to Sa7 illustrated in FIG. 6 of the second embodiment.

As described above, the transmission unit 103 of the data transmission station 100 transmits at least one of the downlink propagation channel information, the first uplink propagation channel information, and the second uplink propagation channel information to the network control server 300. That is, in the wireless communication system, the data transmission stations 100-1 and 100-2 transmit and receive known signals and communicate notification of obtained channel estimation values via the network control server 300. In accordance with the wireless communication apparatus, the wireless communication system, and the wireless communication method of the present embodiment, the network control server 300 can improve estimation precision of the correction values C due to a compressed error involved in the notification of the uplink propagation channel information and the downlink propagation channel information.

Hereinafter, wireless communication apparatuses and wireless communication methods in the fourth to ninth embodiments of the present invention will be described with reference to the drawings. For the wireless communication systems to be described below, a data transmission station serving as a wireless communication apparatus acquires propagation channel information or transmission weight values of subcarriers used in uplink transmission from a data reception station. The data transmission station interpolates propagation channel information or a transmission weight value in a subcarrier other than that for which propagation channel information or a transmission weight value has been acquired based on the acquired propagation channel information or transmission weight value. The data transmission station uses the propagation channel information or transmission weight value obtained through the interpolation in MU-MIMO transmission in a downlink.

Figure 9:
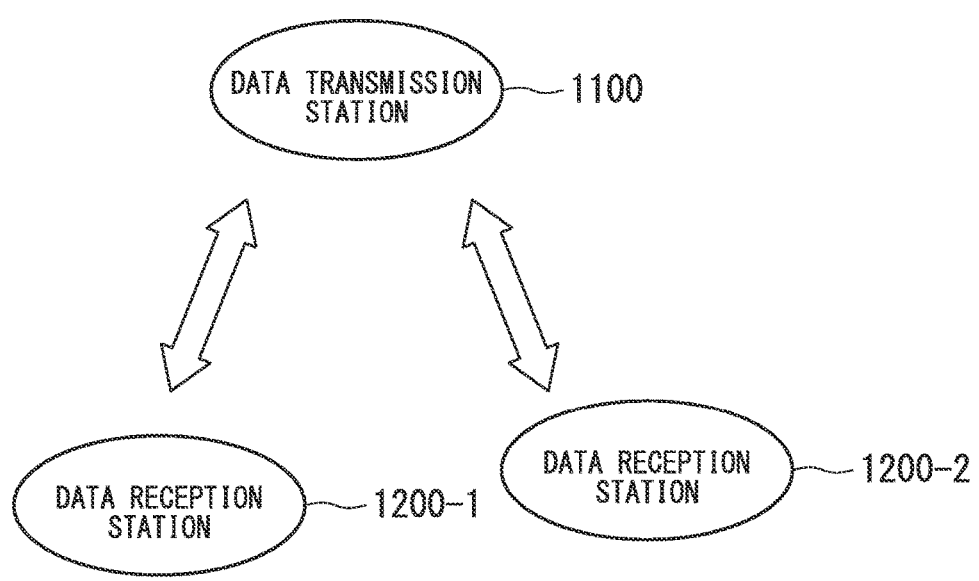
FIG. 9 is a diagram illustrating an overview of a wireless communication system in accordance with fourth to ninth embodiments of the present invention.

FIG. 9 is a diagram illustrating an overview of the wireless communication systems in accordance with the fourth to ninth embodiments of the present invention. As illustrated in FIG. 9, a wireless communication system includes a data transmission station 1100 and data reception stations 1200-1 and 1200-2 which perform radio packet communication with the data transmission station 1100. The data transmission station 1100 and the data reception stations 1200-1 and 1200-2 perform the radio packet communication using the same frequency channels and a carrier sense multiple access/collision avoidance (CSMA/CA) scheme. When data is transmitted to the data reception stations 1200-1 and 1200-2, the data transmission station 1100 performs spatial multiplexing transmission (MU-MIMO) using the same frequency band at the same time.

Identifiers indicating a transmission station and a destination station are included in a radio packet transmitted and received in the radio packet communication. Here, the transmission station is an apparatus which generates and transmits a radio packet. The destination station is an apparatus serving as a destination of the radio packet. For example, the data transmission station 1100 is an access point or the like in a wireless LAN, and the data reception stations 1200-1 and 1200-2 are computers or portable information electronic devices in the wireless LAN. Although FIG. 9 illustrates an example in which the wireless communication system includes the two data reception stations 1200 (1200-1 and 1200-2), three or more data reception stations 1200 or one data reception station 1200 may be provided.

The following description assumes that propagation channel information of subcarrier number k in a downlink between the data transmission station 1100 and the data reception station 1200-1 is $H_{d1,k}$ and propagation channel information of subcarrier number k in a downlink between the data transmission station 1100 and the data reception station 1200-2 is $H_{d2,k}$. In addition, it is assumed that propagation channel information of subcarrier number k in an uplink between the data transmission station 1100 and the data reception station 1200-1 is $H_{u1,k}$ and propagation channel information of subcarrier number k in an uplink between the data transmission station 1100 and the data reception station 1200-2 is $H_{u2,k}$.

Fourth Embodiment

Figure 10:
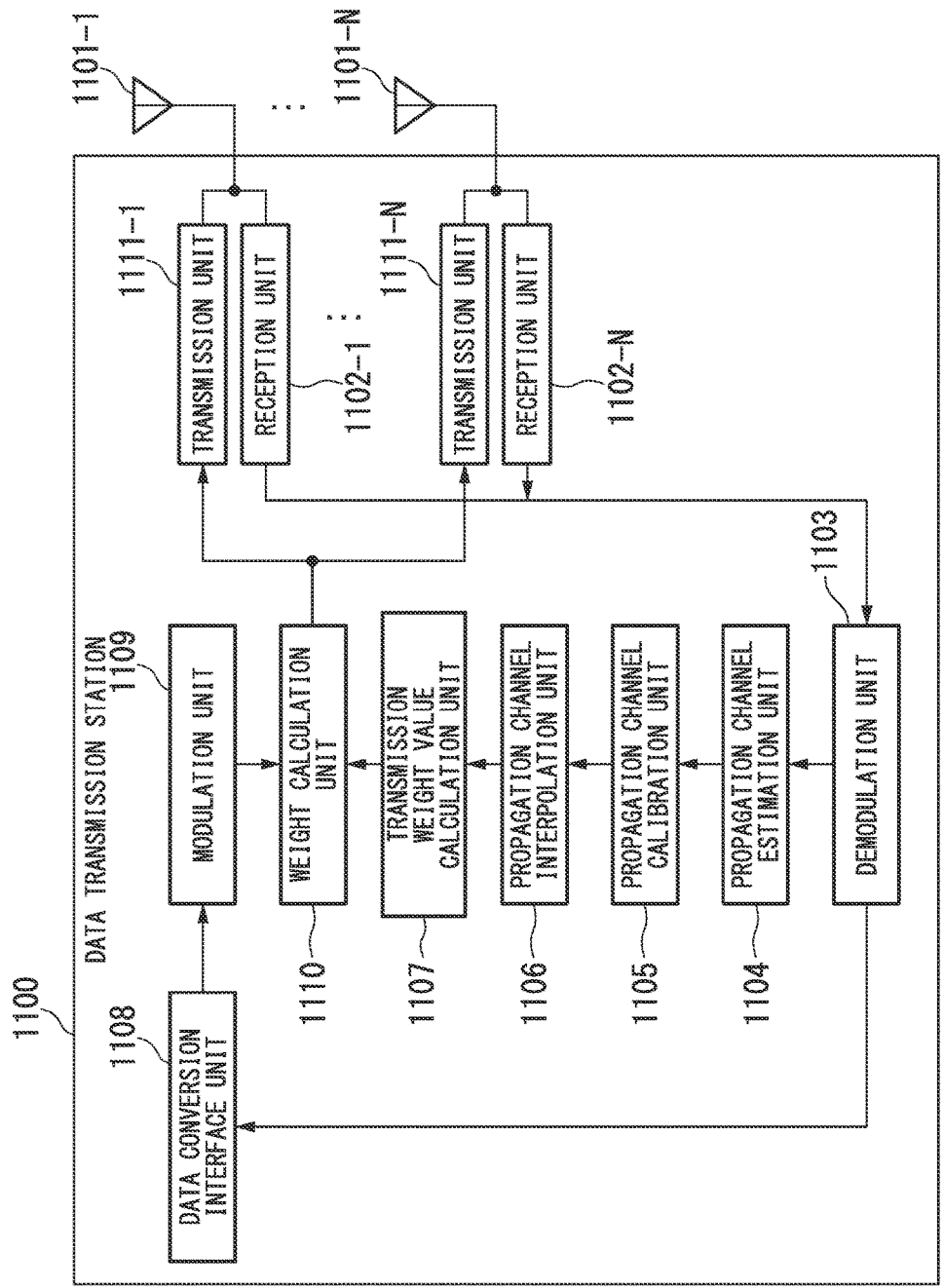
FIG. 10 is a block diagram illustrating a configuration example of a data transmission station 1100 in the fourth embodiment.

As illustrated in FIG. 9, the wireless communication system in the fourth embodiment includes a data transmission station 1100 and a plurality of data reception stations 1200. FIG. 10 is a block diagram illustrating a configuration example of the data transmission station 1100 in the fourth embodiment. As illustrated in FIG. 10, the data transmission station 1100 includes antennas 1101-1 to 1101-N, reception units 1102-1 to 1102-N, a demodulation unit 1103, a propagation channel estimation unit 1104, a propagation channel calibration unit 1105, a propagation channel interpolation unit 1106, a transmission weight value calculation unit 1107, a data conversion interface unit 1108, a modulation unit 1109, a weight calculation unit 1110, and transmission units 1111-1 to 1111-N.

The reception units 1102-1 to 1102-N convert a frequency of reception signals received via the antennas 1101-1 to 1101-N connected thereto into a baseband frequency, adjust receive power or the like, and output the converted and adjusted reception signals to the demodulation unit 1103.

The demodulation unit 1103 demodulates the reception signals input from the reception units 1102-1 to 1102-N. The demodulation unit 1103 outputs a signal (known signal) for propagation channel estimation among data signals obtained through the demodulation to the propagation channel estimation unit 1104 and outputs the other data signals to the data conversion interface unit 1108.

The propagation channel estimation unit 1104 compares the signal for propagation channel estimation input from the demodulation unit 1103 with a known signal for propagation channel estimation to estimate propagation channel information for each subcarrier in the uplink between each of the antennas 1101-1 to 1101-N and a data reception station 1200. The propagation channel estimation unit 1104 outputs the estimated propagation channel information to the propagation channel calibration unit 1105.

The propagation channel calibration unit 1105 calculates downlink propagation channel information from uplink propagation channel information using a predetermined calibration value for the propagation channel information input from the propagation channel estimation unit 1104. The propagation channel calibration unit 1105 outputs the calculated downlink propagation channel information to the propagation channel interpolation unit 1106. Downlink propagation channel information $H_{d,k}$ is calculated using the following Formula (11). It is to be noted that a matrix $H_{d,k}$ is a matrix including the matrix $H_{d1,k}$ and the matrix $H_{d2,k}$ as elements.

[Formula 11]

$$H_{d,k} = H_{u,k} C_k \qquad (11)$$

A matrix $C_k$ in Formula (11) is a calibration matrix (calibration values) for calibrating uplink propagation channel information $H_{u,k}$ to the downlink propagation channel information $H_{d,k}$. It is to be noted that the matrix $H_{u,k}$ is a matrix including the matrix $H_{u1,k}$ and the matrix $H_{u2,k}$ as elements.

The propagation channel information is input from the propagation channel calibration unit 1105 to the propagation channel interpolation unit 1106. The propagation channel interpolation unit 1106 interpolates propagation channel information for a subcarrier other than that of the propagation channel information input from the propagation channel calibration unit 1105 among all subcarriers to be used in the wireless communication system. The interpolation of the propagation channel information, for example, is performed through copy, averaging, or the like of the input propagation channel information. The propagation channel interpolation unit 1106 outputs the input propagation channel information and the propagation channel information obtained through the interpolation to the transmission weight value calculation unit 1107.

The case in which the propagation channel information in the subcarrier (hereinafter referred to as a subcarrier in which propagation channel information is absent) other than that of the propagation channel information input from the propagation channel calibration unit 1105 among the subcarriers used in the wireless communication system is interpolated through the copy will be described. The propagation channel interpolation unit 1106 detects a subcarrier number closest to subcarrier number k of the subcarrier in which propagation channel information is absent among subcarrier numbers of subcarriers of the input propagation channel information. The propagation channel interpolation unit 1106 copies propagation channel information corresponding to the detected subcarrier number to the propagation channel information for the subcarrier of the subcarrier number k. That is, the propagation channel interpolation unit 1106 interpolates the propagation channel information through the following Formula (12).

[Formula 12]

$$H_{d,k} = H_{d,\hat{k}} \qquad (12)$$

In Formula (12), k with a "^(hat)" denotes the number of the subcarrier closest to subcarrier number k among subcarrier numbers of subcarriers for which there is corresponding propagation channel information. Hereinafter, characters with a "^(hat)" in formulas or the like are expressed by writing "^" before the characters. For example, the propagation channel information in the right side of Formula (12) is expressed as "$H_{d,\hat{k}}$".

The case in which propagation channel information in a subcarrier in which propagation channel information is absent is interpolated through averaging will be described. The propagation channel interpolation unit 1106 calculates an average value of propagation channel information of subcarriers for which there is corresponding propagation channel information among subcarriers near the subcarrier in which propagation channel information is absent. The propagation channel interpolation unit 1106 performs interpolation by setting the calculated average value of the propagation channel information as the propagation channel information of the subcarrier in which the propagation channel information is absent. It is to be noted that the near subcarriers are subcarriers within a predetermined range.

For example, when there is propagation channel, information corresponding to subcarrier number (k−1) and subcarrier number (k+1), the propagation channel information corresponding to subcarrier number k is $(H_{d,k-1}+H_{d,k+1})/2$. In addition, the average value of the propagation channel information may be calculated using the following Formula (13). It is to be noted that N denotes the average number.

[Formula 13]

$$H_{d,k} = \frac{1}{2N} \sum_{n=1}^{N}(H_{d,k-n} + H_{d,k+n}) \qquad (13)$$

The transmission weight value calculation unit 1107 calculates a transmission weight value corresponding to each subcarrier based on the downlink propagation channel information input from the propagation channel interpolation unit 1106. The transmission weight value calculation unit 1107 outputs the calculated transmission weight value to the weight calculation unit 1110. As a method in which the transmission weight value calculation unit 1107 calculates the transmission weight value, a zero forcing (ZF) method, a minimum mean square (MMSE) method, or the like as a linear calculation, and a Tomlinson Harashima Precoding (THP) method, a vector perturbation (VP) method, or the like as a non-linear calculation may be used. It is to be noted that the transmission weight value calculation unit 1107 calculates the transmission weight value using any one of the above-described techniques or another technique.

The data conversion interface unit 1108 converts a data signal input from the demodulation unit 1103 into a packet to be used in an external apparatus and outputs the packet obtained through the conversion to the external apparatus or an external network. In addition, the data conversion interface unit 1108 converts a packet input from the external apparatus or the external network into a data signal and outputs the data signal obtained through the conversion to the modulation unit 1109.

The modulation unit 1109 modulates the data signal input from the data conversion interface unit 1108 to generate a radio packet signal and outputs the generated radio packet signal to the weight calculation unit 1110.

The radio packet signal is input from the modulation unit 1109 to the weight calculation unit 1110 and the transmission weight values are input from the transmission weight value calculation unit 1107 to the weight calculation unit 1110. The weight calculation unit 1110 multiplies the radio packet signal by each transmission weight value and outputs a transmission signal indicating a multiplied result to the transmission units 1111-1 to 1111-N.

The transmission units 1111-1 to 1111-N convert a frequency of the transmission signal input from the weight calculation unit 1110 into a radio frequency defined in the wireless communication system, perform adjustment of transmit power or the like, and transmit transmission signals obtained through the conversion and adjustment from the antennas 1101-1 to 1101-N. Through transmission using the transmission weight values, the data transmission station 1100 can multiplex data addressed to the data reception stations 1200 and transmit the multiplexed data.

Figure 11:
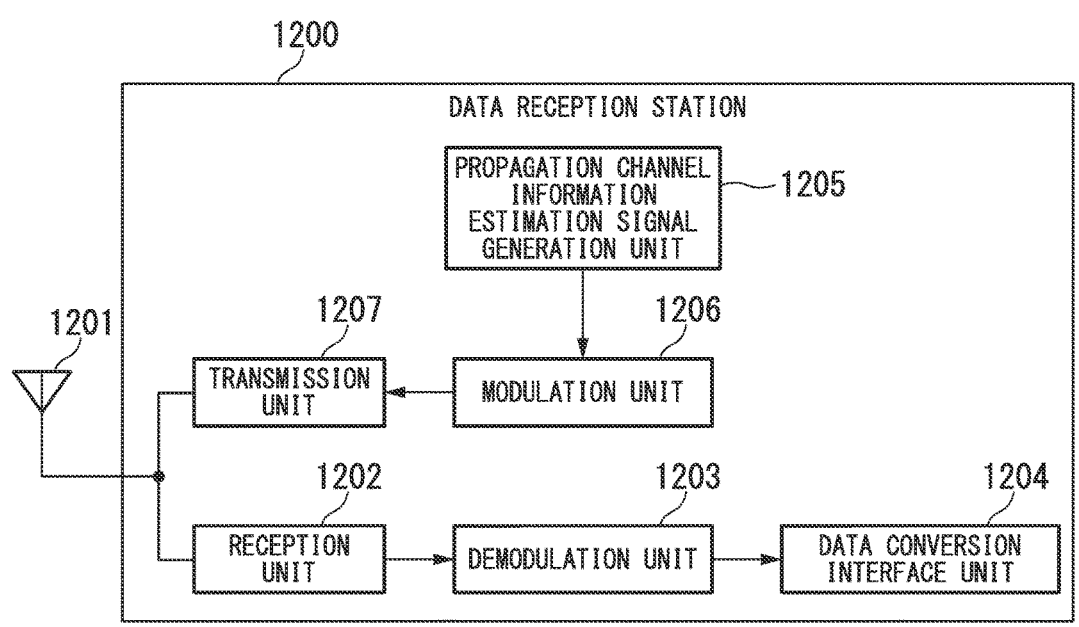
FIG. 11 is a block diagram illustrating a configuration example of a data reception station 1200 in the fourth embodiment.

FIG. 11 is a block diagram illustrating a configuration example of a data reception station 1200 in the present embodiment. As illustrated in FIG. 11, the data reception station 1200 includes an antenna 1201, a reception unit 1202, a demodulation unit 1203, a data conversion interface unit 1204, a propagation channel information estimation signal generation unit 1205, a modulation unit 1206, and a transmission unit 1207.

The reception unit 1202 converts a frequency of a reception signal received via the antenna 1201 connected thereto into a baseband frequency, performs adjustment of receive power or the like, and outputs a reception signal obtained through the conversion and adjustment to the demodulation unit 1203.

The demodulation unit 1203 demodulates the reception signal input from the reception unit 1202. The demodulation unit 1203 outputs a data signal obtained through the demodulation to the data conversion interface unit 1204.

The data conversion interface unit 1204 converts the data signal input from the demodulation unit 1203 into a packet to be used in the external apparatus and outputs the packet obtained through the conversion to the external apparatus or the external network.

The propagation channel information estimation signal generation unit 1205 generates a signal (known signal) for propagation channel estimation and outputs the generated signal to the modulation unit 1206.

The modulation unit 1206 modulates the signal for propagation channel estimation input from the propagation channel information estimation signal generation unit 1205 and a signal to be transmitted to the data transmission station 1100 to generate a radio packet signal. The modulation unit 1206 outputs the generated radio packet signal to the transmission unit 1207.

The transmission unit 1207 converts a frequency of the radio packet signal input from the modulation unit 1206 into a radio frequency defined in the wireless communication system, performs adjustment of transmit power or the like, and transmits a radio packet signal obtained through the conversion and adjustment from the antenna 1201.

Figure 12:
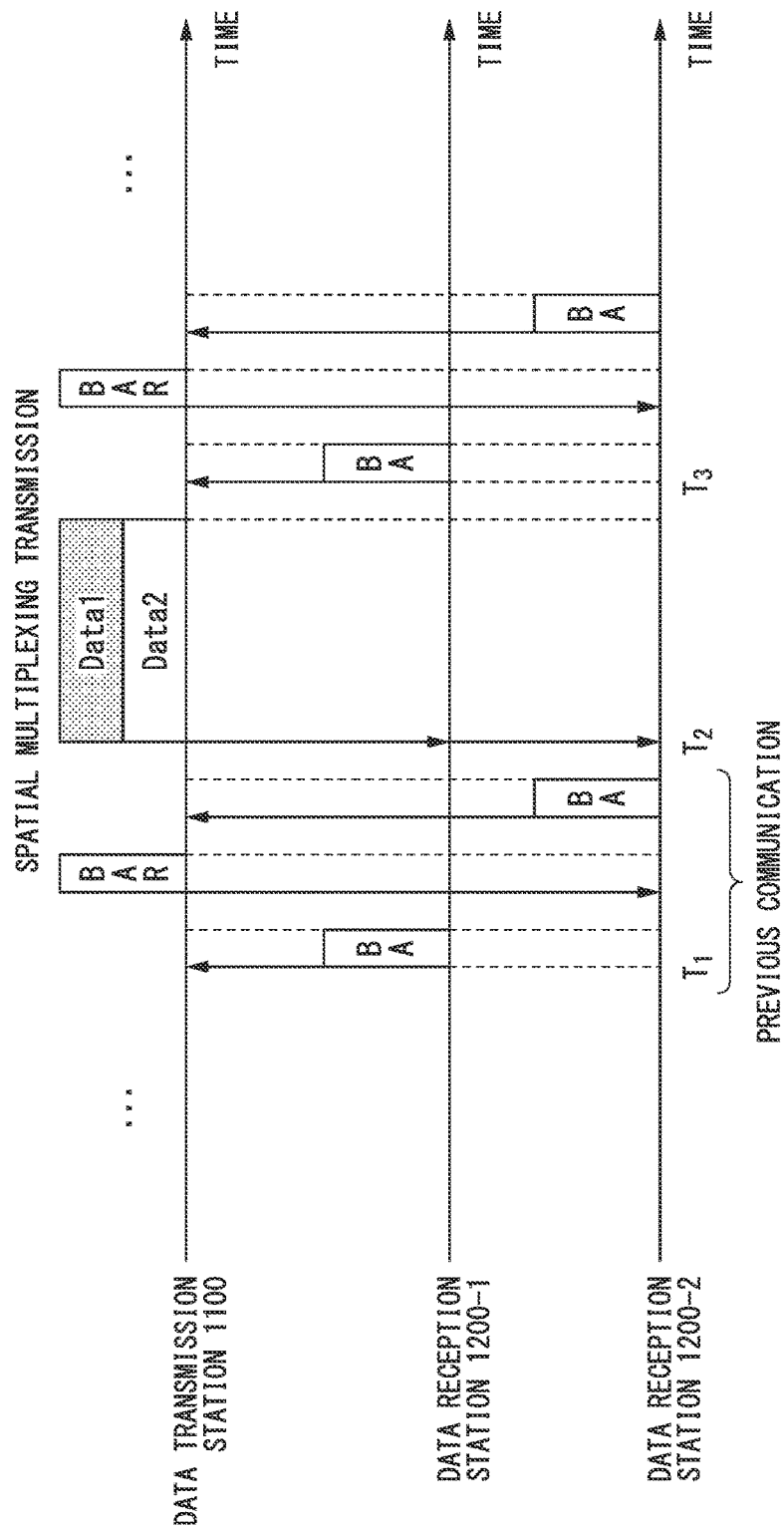
FIG. 12 is a time chart illustrating an example of a communication operation of the wireless communication system in the fourth embodiment.

FIG. 12 is a time chart illustrating an example of a communication operation of the wireless communication system in the present embodiment. The communication operation example illustrated in FIG. 12 shows part of an operation when packets addressed to the data reception stations 1200-1 and 1200-2 are continuously generated in the data transmission station 1100 and data transmissions are continuously performed.

At time $T_1$, the data reception station 1200-1 transmits a response confirmation signal (BA: Block Acknowledgement) addressed to the data transmission station 1100 for data received before time $T_1$. It is to be noted that the transmission of the response confirmation signal is performed in the format of "arrangement of 20 MHz×4" so that data transmission stations, data reception stations, and the like of the conventional standards can receive the response confirmation signal.

After the response confirmation signal is received from the data reception station 1200-1, the data transmission station 1100 transmits a response confirmation instruction signal (BAR: Block Acknowledgement Request) for instructing transmission of a response confirmation signal to the data reception station 1200-2 in order to check whether the data reception station 1200-2 has decoded a packet signal including data transmitted to the data reception station 1200-2 before time $T_1$ without error.

When the response confirmation instruction signal is received from the data transmission station 1100, the data reception station 1200-2 transmits a response confirmation signal in response to the instruction. The transmission of the response confirmation signal by the data reception station 1200-2 is also performed in the format of "arrangement of 20 MHz×4".

The data transmission station 1100 estimates uplink propagation channel information based on a known signal (a signal for propagation channel estimation) included in the response confirmation signal received from each data reception station 1200. The data transmission station 1100 calibrates and interpolates a propagation channel for the estimated uplink propagation channel information and then calculates transmission weight values.

At time $T_2$, the data transmission station 1100 transmits a radio packet signal including data (Data 1) addressed to the data reception station 1200-1 and a radio packet signal including data (Data 2) addressed to the data reception station 1200-2 in MU-MIMO using the calculated transmission weight values.

If the data reception station 1200-1 decodes the data (Data 1) addressed to the data reception station itself which has been transmitted at time $T_2$ without error at time $T_3$, the data reception station 1200-1 transmits a response confirmation signal (BA) to the data transmission station 1100.

After the response confirmation signal is received from the data reception station 1200-1, the data transmission station 1100 transmits a response confirmation instruction signal (BAR: Block Acknowledgement Request) for instructing transmission of a response confirmation signal to the data reception station 1200-2 in order to check whether the data reception station 1200-2 has decoded the data (Data 2) addressed to the data reception station 1200-2 which has been transmitted at time $T_2$ without error.

When the response confirmation instruction signal is received from the data transmission station 1100, the data reception station 1200-2 transmits a response confirmation signal in response to the instruction.

As described above, the data transmission station 1100 in the present embodiment acquires uplink propagation channel information based on a known signal included in a response confirmation signal received from each data reception station 1200 and calibrates the uplink propagation channel information to calculate downlink propagation channel information. The data transmission station 1100 acquires downlink propagation channel information of a subcarrier for which the downlink propagation channel information has not been obtained based on the response confirmation signal through interpolation based on the obtained propagation channel information.

Even if there is a subcarrier for which propagation channel information has not been obtained from a response confirmation signal transmitted by the data reception station 1200 in the format of "arrangement of 20 MHz×4", the data transmission station 1100 can calculate transmission weight values necessary in transmission using downlink MU-MIMO by interpolating the propagation channel information in this subcarrier. It is to be noted that an example in which the data reception station 1200 has transmitted the response confirmation signal in the format of "arrangement of 20 MHz×4" has been described. However, the present embodiment is not limited to this example. When there is a subcarrier for which no propagation channel information is obtained based on a signal received from the data reception station 1200, the data transmission station 1100 may interpolate propagation channel information of this subcarrier.

Using the data transmission station 1100 of the present embodiment, it is possible to acquire the transmission weight values necessary in MU-MIMO even if no propagation channel information is obtained from reception signals from the data reception station 1200-1 and 1200-2 when the base station estimation method is used. For example, because the transmission weight value is obtained in each subcarrier even if there is a subcarrier for which no known signal is obtained when the data reception station 1200 has transmitted the response confirmation signal or the like in the format of "arrangement of 20 MHz×4", it is possible to apply an MU-MIMO transmission and extend the range in which the MU-MIMO transmission is applied.

Fifth Embodiment

Figure 13:
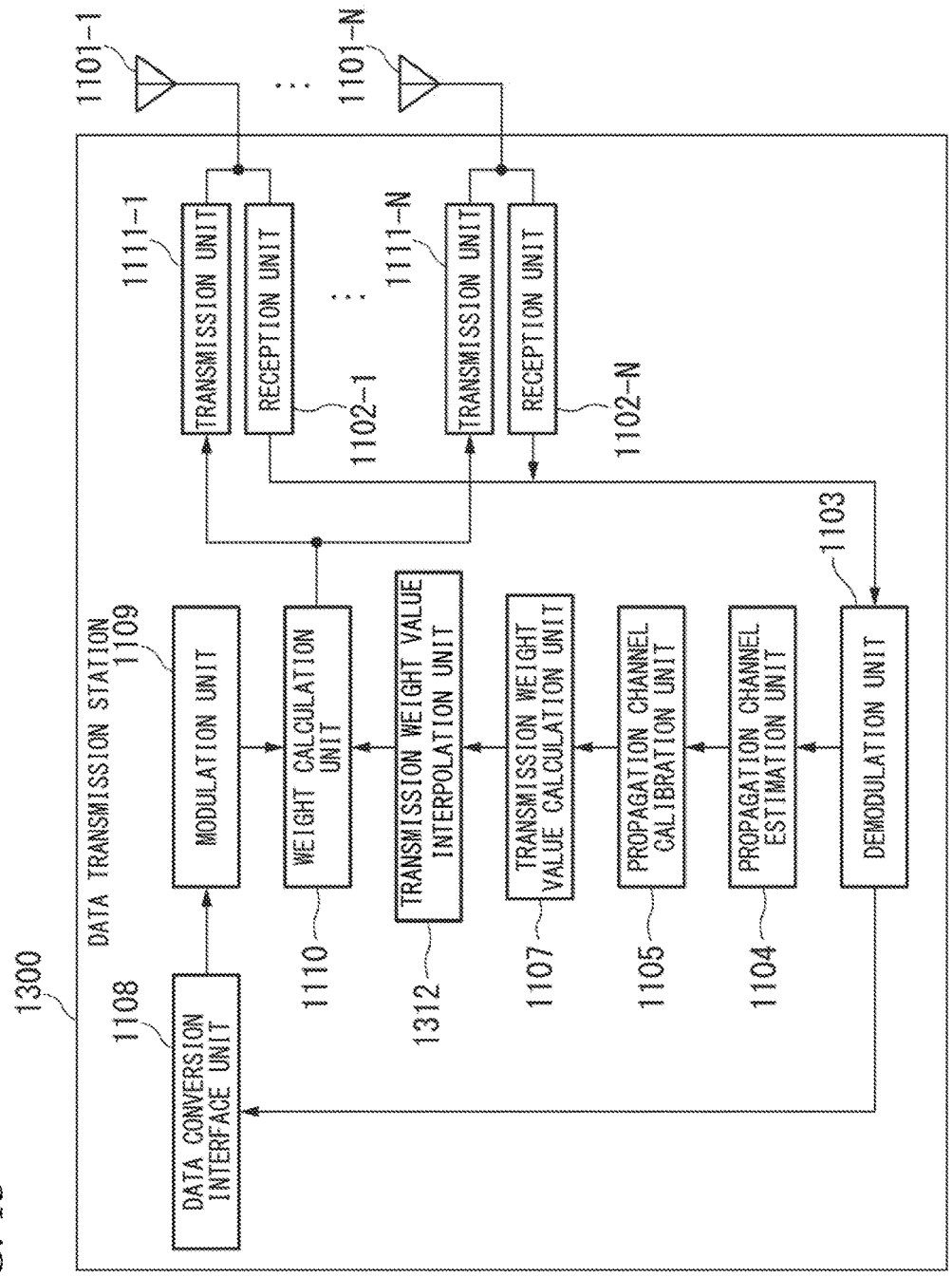
FIG. 13 is a block diagram illustrating a configuration example of a data transmission station 1300 in the fifth embodiment.

A wireless communication system in the fifth embodiment is provided with a data transmission station to be described below in place of the data transmission station 1100 provided in the wireless communication system in the fourth embodiment. FIG. 13 is a block diagram illustrating a configuration example of a data transmission station 1300 in the fifth embodiment. As illustrated in FIG. 13, the data transmission station 1300 includes antennas 1101-1 to 1101-N, reception units 1102-1 to 1102-N, a demodulation unit 1103, a propagation channel estimation unit 1104, a propagation channel calibration unit 1105, a transmission weight value calculation unit 1107, a transmission weight value interpolation unit 1312, a data conversion interface unit 1108, a modulation unit 1109, a weight calculation unit 1110, and transmission units 1111-1 to 1111-N.

The data transmission station 1300 in the present embodiment is different from the data transmission station 1100 (FIG. 10) in the fourth embodiment in that the transmission weight value interpolation unit 1312 is provided in place of the propagation channel interpolation unit 1106. In the data transmission station 1300, propagation channel information output from the propagation channel calibration unit 1105 is input to the transmission weight value calculation unit 1107 and transmission weight values calculated in the transmission weight value interpolation unit 1312 is input to the weight calculation unit 1110. It is to be noted that the same functional units of the data transmission station 1300 as those of the data transmission station 1100 are assigned the same reference signs and a description thereof will be omitted.

The transmission weight values calculated in the transmission weight value calculation unit 1107 are input to the transmission weight value interpolation unit 1312. In the data transmission station 1300, the propagation channel information input from the propagation channel calibration unit 1105 to the transmission weight value calculation unit 1107 is propagation channel information of a subchannel obtained based on a signal received from each data reception station 1200. Thus, the transmission weight values calculated in the transmission weight value calculation unit 1107 lack a transmission weight value of a subchannel for which no propagation channel information has been obtained.

The transmission weight value interpolation unit 1312 interpolates the transmission weight value of the subchannel which lacks the transmission weight value based on the transmission weight values input from the transmission weight value calculation unit 1107. The interpolation by the transmission weight value interpolation unit 1312 is performed through copy, averaging, or the like of the input transmission weight values. The transmission weight value interpolation unit 1312 outputs the input transmission weight values and the transmission weight values obtained through the interpolation to the weight calculation unit 1110.

The case in which a transmission weight value in a subcarrier (hereinafter referred to as a subcarrier for which a transmission weight value is absent) other than subcarriers of transmission weight values input from the transmission weight value calculation unit 1107 among subcarriers for use in the wireless communication system is interpolated through copy will be described. The transmission weight value interpolation unit 1312 detects a subcarrier number closest to subcarrier number k of the subcarrier for which the transmission weight value is absent from subcarrier numbers of the subcarriers of the input transmission weight values. The transmission weight value interpolation unit 1312 copies a transmission weight value corresponding to the detected subcarrier number to a transmission weight value in a subcarrier of subcarrier number k. That is, the transmission weight value interpolation unit 1312 interpolates the transmission weight value through Formula (14).

[Formula 14]

$$W_k = W_{\hat{k}} \quad (14)$$

A matrix $W_k$ in Formula (14) represents a transmission weight value in the subcarrier of subcarrier number k. A matrix $W_{-k}$ is a transmission weight value in the subcarrier of a subcarrier number closest to subcarrier number k among the transmission weight values input from the transmission weight value calculation unit 1107.

The case in which the transmission weight value in the subcarrier for which the transmission weight value is absent is interpolated through averaging will be described. The transmission weight value interpolation unit 1312 calculates an average value of transmission weight values of subcarriers for which the corresponding transmission weight values are present among subcarriers near the subcarrier for which the transmission weight value is absent. The transmission weight value interpolation unit 1312 performs interpolation by setting the calculated average value of the transmission weight values as the transmission weight value of the subcarrier for which the transmission weight value is absent. It is to be noted that the near subcarriers are subcarriers within a predetermined range.

For example, when there are transmission weight values corresponding to subcarrier number (k−1) and subcarrier number (k+1), propagation channel information corresponding to subcarrier number k is $(W_{k-1}+W_{k+1})/2$. In addition, the average value of the transmission weight values may be calculated using the following Formula (15). It is to be noted that N is the average number and determines the near subcarriers.

[Formula 15]

$$W_k = \frac{1}{2N}\sum_{n=1}^{N}(W_{k-n} + W_{k+n}) \tag{15}$$

Because a communication operation of the wireless communication system in the present embodiment is the same as that of the wireless communication system in the fourth embodiment, a description thereof will be omitted. In the data transmission station 1300 in the present embodiment, it is possible to reduce the computational complexity necessary for calculation of transmission weight values of all subcarriers by interpolating a transmission weight value instead of interpolating propagation channel information, as compared with the case in which transmission weight values are calculated after propagation channel information of all subcarriers is prepared.

Sixth Embodiment

Figure 14:
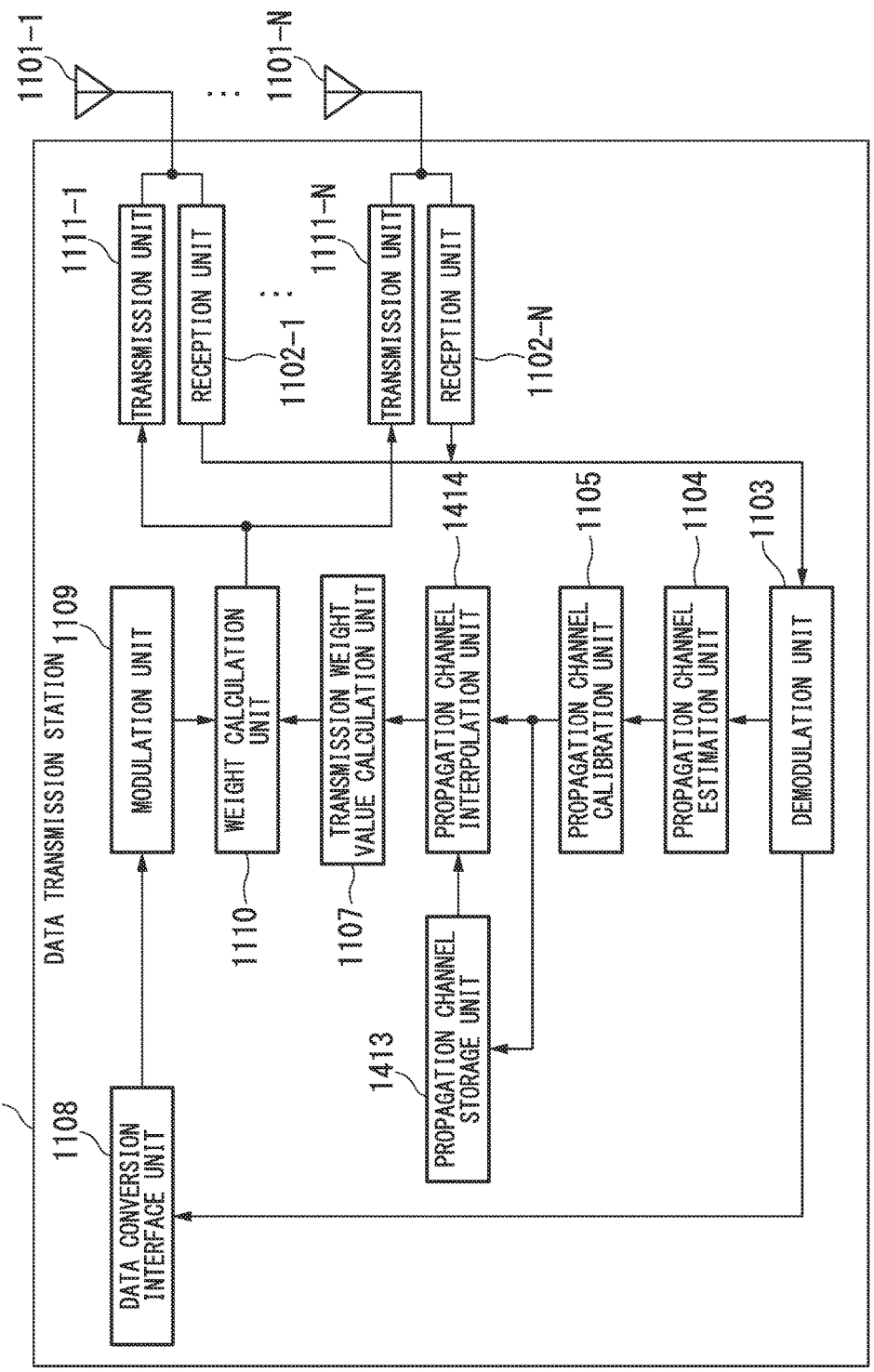
FIG. 14 is a block diagram illustrating a configuration example of a data transmission station 1400 in the sixth embodiment.

In a wireless communication system in the sixth embodiment, a data transmission station to be described below is provided in place of the data transmission station 1100 provided in the wireless communication system in the fourth embodiment. FIG. 14 is a block diagram illustrating a configuration example of a data transmission station 1400 in the sixth embodiment. As illustrated in FIG. 14, the data transmission station 1400 includes antennas 1101-1 to 1101-N, reception units 1102-1 to 1102-N, a demodulation unit 1103, a propagation channel estimation unit 1104, a propagation channel calibration unit 1105, a propagation channel storage unit 1413, a propagation channel interpolation unit 1414, a transmission weight value calculation unit 1107, a data conversion interface unit 1108, a modulation unit 1109, a weight calculation unit 1110, and transmission units 1111-1 to 1111-N.

The data transmission station 1400 in the present embodiment is different from the data transmission station 1100 (FIG. 10) in the fourth embodiment in that the propagation channel interpolation unit 1414 is provided in place of the propagation channel interpolation unit 1106 and the propagation channel storage unit 1413 is further provided. In the data transmission station 1400, downlink propagation channel information output from the propagation channel calibration unit 1105 is input to the propagation channel storage unit 1413 and the propagation channel interpolation unit 1414. In addition, downlink propagation channel information output from the propagation channel interpolation unit 1414 is input to the transmission weight value calculation unit 1107. It is to be noted that the same functional units of the data transmission station 1400 as those of the data transmission station 1100 are assigned the same reference signs and a description thereof will be omitted.

The propagation channel storage unit 1413 stores the downlink propagation channel information input from the propagation channel calibration unit 1105 for each subcarrier. Every time downlink propagation channel information is obtained based on a signal received from the data reception station 1200, the obtained downlink propagation channel information is stored in the propagation channel storage unit 1413. For example, when the data reception station 1200 has transmitted a response confirmation signal or the like in a format of "arrangement of 80 MHz", downlink propagation channel information is obtained in many subcarriers and stored in the propagation channel storage unit 1413.

It is to be noted that when propagation channel information in a subcarrier for which propagation channel information is already stored is input from the propagation channel calibration unit 1105, the propagation channel storage unit 1413 may overwrite the stored propagation channel information with the newly input propagation channel information. Alternatively, the propagation channel storage unit 1413 may calculate a weighted average based on a forgetting coefficient for the stored propagation channel information and the input propagation channel information and perform overwriting with a calculated result.

The downlink propagation channel information is input from the propagation channel calibration unit 1105 to the propagation channel interpolation unit 1414. The propagation channel interpolation unit 1414 interpolates propagation channel information for a subcarrier other than those of the propagation channel information input from the propagation channel calibration unit 1105 among all subcarriers used in the wireless communication system. The interpolation of the propagation channel information, for example, is performed using the input propagation channel information and the propagation channel information stored in the propagation channel storage unit 1413. The propagation channel interpolation unit 1414 outputs the input propagation channel information and the propagation channel information obtained through the interpolation to the transmission weight value calculation unit 1107.

Two techniques will be described as examples of the interpolation of the propagation channel information in the subcarrier for which the propagation channel information is absent. As a first technique, the propagation channel information in the subcarrier for which the propagation channel information is absent is interpolated by calculating a weighted average of propagation channel information corresponding to a subcarrier number closest to a subcarrier number of the subcarrier for which the propagation channel information is absent among the input propagation channel information and propagation channel information which corresponds to the subcarrier for which the propagation channel information is absent and which is stored in the propagation channel storage unit 1413. For example, the propagation channel interpolation unit 1414 interpolates downlink propagation channel information in a subcarrier of subcarrier number k using the following Formula (16).

[Formula 16]

$$H_{d,k} = \alpha H_{d,k} + (1-\alpha)\hat{H}_{d,k} \quad (16)$$

In Formula (16), α denotes a weight coefficient and the value of α is a value in the range from 0 to 1. A matrix $H_{d,k}$ denotes propagation channel information in a subcarrier of a subcarrier number closest to subcarrier number k among the propagation channel information input from the propagation channel calibration unit 1105. A matrix $\hat{H}_{d,k}$ denotes propagation channel information in the subcarrier of subcarrier number k stored in the propagation channel storage unit 1413.

As a second technique, the propagation channel information of subcarrier number k is interpolated by calculating a weighted average of an average value of propagation channel information corresponding to subcarrier numbers near subcarrier number k of a subcarrier for which propagation channel information is absent among the propagation channel information input from the propagation channel calibration unit 1105 and propagation channel information corresponding to subcarrier number k stored in the propagation channel storage unit 1413. For example, the propagation channel interpolation unit 1414 interpolates the downlink propagation channel information in the subcarrier of subcarrier number k using the following Formula (17). Near subcarriers serving as calculation targets of the average value of the propagation channel information are predetermined by N (average number).

[Formula 17]

$$H_{d,k} = \alpha \left( \frac{1}{2N} \sum_{n=1}^{N} (H_{d,k-n} + H_{d,k+n}) \right) + (1-\alpha)\hat{H}_{d,k} \quad (17)$$

Because a communication operation of the wireless communication system in the present embodiment is the same as that of the wireless communication system in the fourth embodiment, a description thereof will be omitted. In the data transmission station 1400 in the present embodiment, it is possible to increase interpolation precision of propagation channel information and improve the quality of MU-MIMO transmission by interpolating propagation channel information of a subcarrier for which the propagation channel information is absent using propagation channel information obtained in the last reception and propagation channel information obtained in the past reception.

Seventh Embodiment

Figure 15:
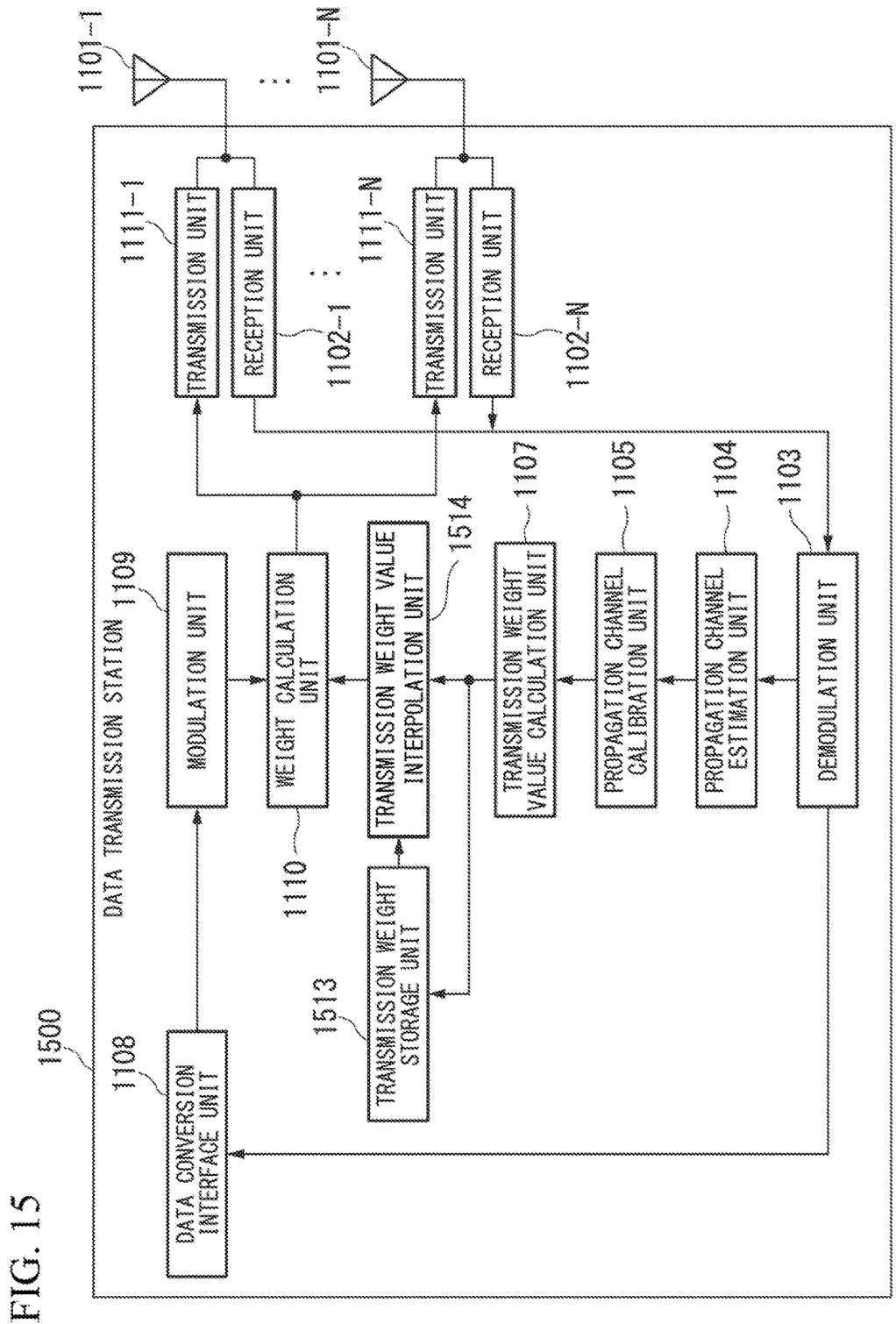
FIG. 15 is a block diagram illustrating a configuration example of a data transmission station 1500 in the seventh embodiment.

A wireless communication system in the seventh embodiment is provided with a data transmission station to be described below in place of the data transmission station 1300 provided in the wireless communication system in the fifth embodiment. FIG. 15 is a block diagram illustrating a configuration example of a data transmission station 1500 in the seventh embodiment. As illustrated in FIG. 15, the data transmission station 1500 includes antennas 1101-1 to 1101-N, reception units 1102-1 to 1102-N, a demodulation unit 1103, a propagation channel estimation unit 1104, a propagation channel calibration unit 1105, a transmission weight value calculation unit 1107, a transmission weight storage unit 1513, a transmission weight value interpolation unit 1514, a data conversion interface unit 1108, a modulation unit 1109, a weight calculation unit 1110, and transmission units 1111-1 to 1111-N.

The data transmission station 1500 in the present embodiment is different from the data transmission station 1300 (FIG. 13) in the fifth embodiment in that the transmission weight value interpolation unit 1514 is provided in place of the transmission weight value interpolation unit 1312 and the transmission weight storage unit 1513 is further provided. In the data transmission station 1500, transmission weight values output from the transmission weight value calculation unit 1107 are input to the transmission weight storage unit 1513 and the transmission weight value interpolation unit 1514, and transmission weight values output from the transmission weight value interpolation unit 1514 are input to the weight calculation unit 1110. It is to be noted that the same functional units of the data transmission station 1500 as those of the data transmission station 1300 are assigned the same reference signs and a description thereof will be omitted.

The transmission weight storage unit 1513 stores the transmission weight values input from the transmission weight value calculation unit 1107 for each subcarrier. Every time transmission weight values are obtained based on a signal received from the data reception station 1200, the obtained transmission weight value information is stored in the transmission weight storage unit 1513. For example, when the data reception station 1200 has transmitted a response confirmation signal or the like in a format of "arrangement of 80 MHz", transmission weight values can be obtained in many subcarriers and the obtained transmission weight value information is stored in the transmission weight storage unit 1513.

It is to be noted that when transmission weight values in subcarriers for which transmission weight values are already stored are input from the transmission weight value calculation unit 1107, the transmission weight storage unit 1513 may overwrite the stored transmission weight values with the newly input transmission weight values. Alternatively, the transmission weight storage unit 1513 may calculate a weighted average of the stored transmission weight values and the input transmission weight values based on a forgetting coefficient and perform overwriting with a calculated result.

The transmission weight values are input from the transmission weight value calculation unit 1107 to the transmission weight value interpolation unit 1514. The transmission weight value interpolation unit 1514 interpolates transmission weight values for subcarriers other than those of the transmission weight values input from the transmission weight value calculation unit 1107 among all subcarriers used in the wireless communication system. The interpolation of the transmission weight values, for example, is performed using the input transmission weight values and the transmission weight values stored in the transmission weight storage unit 1513. The transmission weight value interpolation unit 1514 outputs the input transmission weight values and the transmission weight values obtained through the interpolation to the weight calculation unit 1110.

Two techniques will be described as examples of the interpolation of transmission weight value in a subcarrier for which the transmission weight value is absent. As a first technique, the transmission weight value in the subcarrier for which the transmission weight value is absent is interpolated by calculating a weighted average of a transmission weight value corresponding to a subcarrier number closest to a subcarrier number of the subcarrier for which the transmission weight value is absent among the input transmission weight values and a transmission weight value which corresponds to the subcarrier in which the transmission weight value is absent and which is stored in the transmission weight storage unit 1513. For example, the transmission weight value interpolation unit 1514 interpolates a transmission weight value in a subcarrier of subcarrier number k using the following Formula (18).

[Formula 18]

$$W_k = \alpha W_{\bar{k}} + (1-\alpha)\hat{W}_k \quad (18)$$

In Formula (18), a matrix $W_{\bar{k}}$ denotes a transmission weight value in a subcarrier of a subcarrier number closest to subcarrier number k among the transmission weight values input from the transmission weight value calculation unit 1107. A matrix $\hat{W}_k$ denotes a transmission weight value in the subcarrier of subcarrier number k stored in the transmission weight storage unit 1513.

As a second technique, the transmission weight value of subcarrier number k is interpolated by calculating a weighted average of an average value of a transmission weight value corresponding to a subcarrier number near subcarrier number k of the subcarrier for which the transmission weight value is absent among the transmission weight values input from the transmission weight value calculation unit 1107 and the transmission weight value corresponding to subcarrier number k stored in the transmission weight storage unit 1513. For example, the transmission weight value interpolation unit 1514 interpolates the transmission weight value in the subcarrier of subcarrier number k using the following Formula (19). Subcarriers serving as calculation targets of the average value of the transmission weight values are predetermined by N (average number).

[Formula 19]

$$W_k = \alpha\left(\frac{1}{2N}\sum_{n=1}^{N}(W_{k-n}+W_{k+n})\right) + (1+\alpha)\hat{W}_k \quad (19)$$

Because a communication operation of the wireless communication system in the present embodiment is the same as that of the wireless communication system in the fifth embodiment, a description thereof will be omitted. In the data transmission station 1500 in the present embodiment, it is possible to increase interpolation precision and improve the quality of MU-MIMO transmission by interpolating a transmission weight value of a subcarrier for which the transmission weight value is absent using a transmission weight value obtained in the last reception and transmission weight values obtained in the past reception.

Eighth Embodiment

Figure 16:
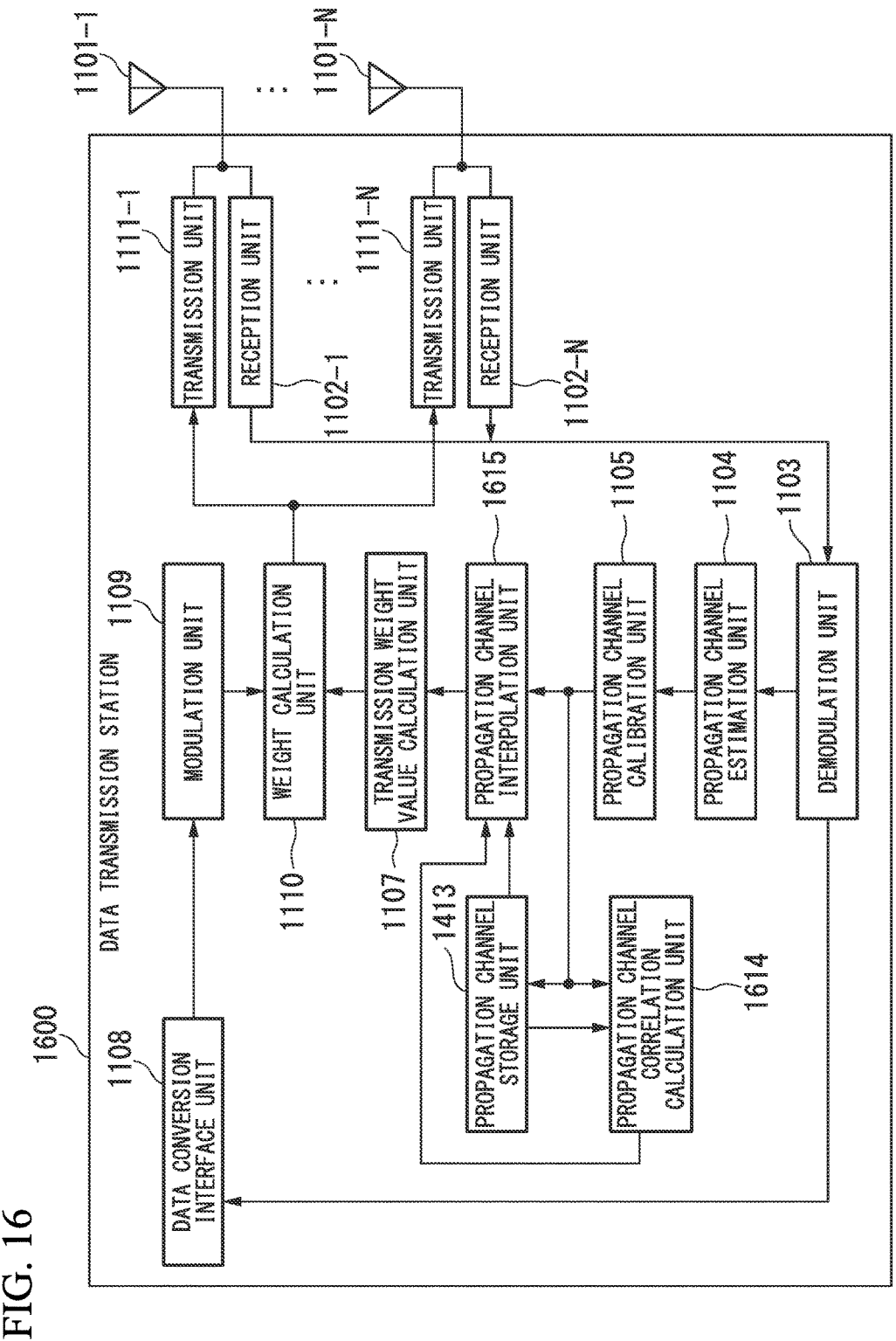
FIG. 16 is a block diagram illustrating a configuration example of a data transmission station 1600 in the eighth embodiment.

A wireless communication system in the eighth embodiment is provided with a data transmission station to be described below in place of the data transmission station 1400 provided in the wireless communication system in the sixth embodiment. FIG. 16 is a block diagram illustrating a configuration example of the data transmission station 1600 in the eighth embodiment. As illustrated in FIG. 16, the data transmission station 1600 includes antennas 1101-1 to 1101-N, reception units 1102-1 to 1102-N, a demodulation unit 1103, a propagation channel estimation unit 1104, a propagation channel calibration unit 1105, a propagation channel storage unit 1413, a propagation channel correlation calculation unit 1614, a propagation channel interpolation unit 1615, a transmission weight value calculation unit 1107, a data conversion interface unit 1108, a modulation unit 1109, a weight calculation unit 1110, and transmission units 1111-1 to 1111-N.

The data transmission station 1600 in the present embodiment is different from the data transmission station 1400 (FIG. 14) in the sixth embodiment in that the propagation channel interpolation unit 1615 is provided in place of the propagation channel interpolation unit 1414 and the propagation channel correlation calculation unit 1614 is further provided. In the data transmission station 1600, downlink propagation channel information output from the propagation channel calibration unit 1105 is input to the propagation channel storage unit 1413, the propagation channel correlation calculation unit 1614, and the propagation channel interpolation unit 1615. Downlink propagation channel information is input from the propagation channel interpolation unit 1615 to the transmission weight value calculation unit 1107. It is to be noted that the same functional units of the data transmission station 1600 as those of the data transmission station 1400 are assigned the same reference signs and a description thereof will be omitted.

The downlink propagation channel information is input from the propagation channel calibration unit 1105 to the propagation channel correlation calculation unit 1614. The propagation channel correlation calculation unit 1614 reads propagation channel information of the same subcarriers as those of the input propagation channel information from the propagation channel storage unit 1413. The propagation channel correlation calculation unit 1614 calculates a correlation value for each frequency band based on the input propagation channel information and the read propagation channel information. The propagation channel correlation calculation unit 1614 outputs the calculated correlation value of each frequency band to the propagation channel interpolation unit 1615. Here, a frequency band serving as a calculation target of the correlation value is a predetermined frequency band among a plurality of frequency bands obtained by dividing a frequency band used in the wireless communication system. The propagation channel correlation calculation unit 1614, for example, calculates a correlation value S for each frequency band using the following Formula (20).

[Formula 20]

$$S = \sum_{a=1}^{A}\sum_{b=1}^{B}\sum_{k}\frac{|h_{d,k,a,b}\hat{h}_{d,k,a,b}^{H}|}{|h_{d,k,a,b}||\hat{h}_{d,k,a,b}^{H}|} \quad (20)$$

In Formula (20). A denotes the number of rows of the matrix $H_{d,k}$ (downlink propagation channel information of subcarrier number k). B denotes the number of columns of the matrix $H_{d,k}$, and $h_{d,k,a,b}$ is an element in row a and column b in the matrix $H_{d,k}$. $\hat{h}_{d,k,a,b}$ denotes an element in row a and column b in the matrix $\hat{H}_{d,k}$ (propagation channel information of subcarrier number k stored in the propagation channel storage unit 1413). In addition, $\hat{h}_{d,k,a,b}^{H}$ is a complex conjugate of $\hat{h}_{d,k,a,b}$. k in Formula (20) is subcarrier number k of a subcarrier included in each frequency band.

The propagation channel information is input from the propagation channel calibration unit 1105 to the propagation channel interpolation unit 1615, and the correlation value of each frequency band is input from the propagation channel correlation calculation unit 1614 to the propagation channel interpolation unit 1615. The propagation channel interpolation unit 1615 switches a technique when the propagation channel information of subcarriers included in each frequency band is interpolated based on the correlation value. Specifically, if the correlation value is less than a predetermined threshold value, the propagation channel interpolation unit 1615 interpolates the propagation channel information through copy, averaging, or the like of the input propagation channel information as in the propagation channel interpolation unit 1106 in the fourth embodiment. If the correlation value is greater than or equal to the threshold value, the propagation channel interpolation unit 1615 performs interpolation using the input propagation channel information and the propagation channel information stored in the propagation channel storage unit 1413 as in the propagation channel interpolation unit 1414 in the sixth embodiment.

Because a communication operation of the wireless communication system in the present embodiment is the same as that of the wireless communication system in the sixth embodiment, a description thereof will be omitted. In the data transmission station 1600 in the present embodiment, the correlation value between the propagation channel information stored in the propagation channel storage unit 1413 and the propagation channel information obtained based on the reception signal is calculated and a technique of interpolating the propagation channel information is selected based on the correlation value. For example, when the difference between the propagation channel information stored in the propagation channel storage unit 1413 and current propagation channel information is large, the propagation channel information is interpolated without using the stored propagation channel information. It is possible to further increase the interpolation precision of propagation channel information and improve the quality of MU-MIMO transmission by switching the interpolation technique based on the correlation value.

Ninth Embodiment

Figure 17:
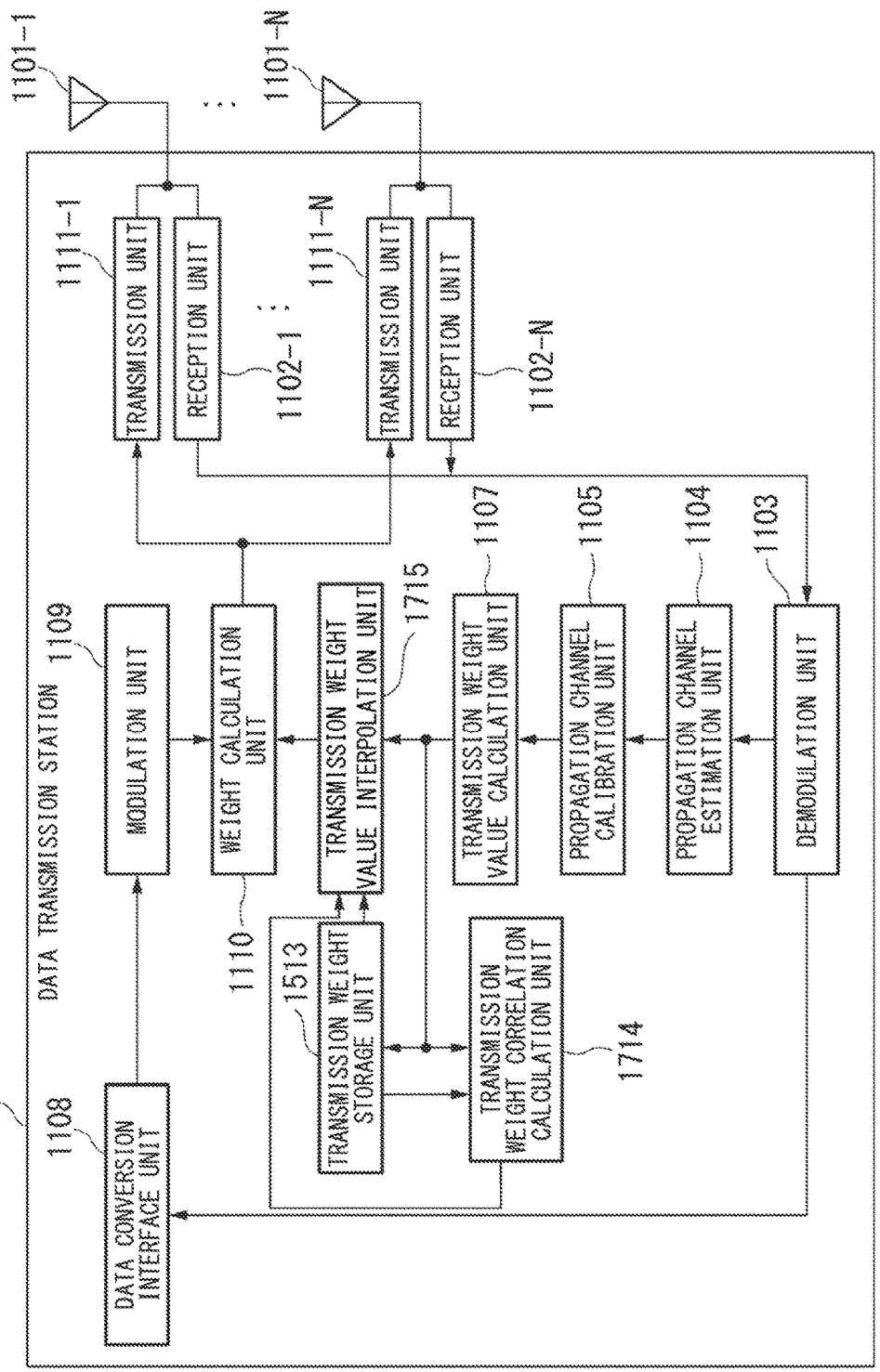
FIG. 17 is a block diagram illustrating a configuration example of a data transmission station 1700 in the ninth embodiment.

A wireless communication system in the ninth embodiment is provided with a data transmission station to be described below in place of the data transmission station 1500 provided in the wireless communication system in the seventh embodiment. FIG. 17 is a block diagram illustrating a configuration example of the data transmission station 1700 in the ninth embodiment. As illustrated in FIG. 17, the data transmission station 1700 includes antennas 1101-1 to 1101-N, reception units 1102-1 to 1102-N, a demodulation unit 1103, a propagation channel estimation unit 1104, a propagation channel calibration unit 1105, a transmission weight value calculation unit 1107, a transmission weight storage unit 1513, a transmission weight correlation calculation unit 1714, a transmission weight value interpolation unit 1715, a data conversion interface unit 1108, a modulation unit 1109, a weight calculation unit 1110, and transmission units 1111-1 to 1111-N.

The data transmission station 1700 in the present embodiment is different from the data transmission station 1500 (FIG. 15) in the seventh embodiment in that the transmission weight value interpolation unit 1715 is provided in place of the transmission weight value interpolation unit 1514 and the transmission weight correlation calculation unit 1714 is further provided. In the data transmission station 1700, transmission weight values output from the transmission weight value calculation unit 1107 are input to the transmission weight storage unit 1513, the transmission weight correlation calculation unit 1714, and the transmission weight value interpolation unit 1715. Transmission weight values are input from the transmission weight value interpolation unit 1715 to the weight calculation unit 1110. It is to be noted that the same functional units of the data transmission station 1700 as those of the data transmission station 1500 are assigned the same reference signs and a description thereof will be omitted.

The transmission weight values are input from the transmission weight value calculation unit 1107 to the transmission weight correlation calculation unit 1714. The transmission weight correlation calculation unit 1714 reads transmission weight values of the same subcarriers as those of the input transmission weight values from the transmission weight storage unit 1513. The transmission weight correlation calculation unit 1714 calculates a correlation value for each frequency band based on the input transmission weight values and the read transmission weight values. The transmission weight correlation calculation unit 1714 outputs the calculated correlation value of each frequency to the transmission weight value interpolation unit 1715. The transmission weight correlation calculation unit 1714, for example, calculates a correlation value S for each frequency band using the following Formula (21).

[Formula 21]

$$S = \sum_{a=1}^{A}\sum_{b=1}^{B}\sum_{k}\frac{|w_{k,a,b}\hat{w}_{k,a,b}^{H}|}{|w_{k,a,b}||\hat{w}_{k,a,b}^{H}|} \qquad (21)$$

In Formula (21). A denotes the number of rows of the matrix $W_k$ (a transmission weight value of subcarrier number k). B denotes the number of columns of the matrix $W_k$, and $w_{k,a,b}$ denotes an element in row a and column b in the matrix $W_k$. $\hat{w}_{k,a,b}$ is an element in row a and column b in the matrix $\hat{W}_k$ (a transmission weight value of subcarrier number k stored in the transmission weight storage unit 1513). In addition, $\hat{w}_{k,a,b}^{H}$ is a complex conjugate of $\hat{w}_{k,a,b}$. In Formula (21), k is subcarrier number k of a subcarrier included in each frequency band.

The transmission weight values are input from the transmission weight value calculation unit 1107 to the transmission weight value interpolation unit 1715 and the correlation value of each frequency band is input from the transmission weight correlation calculation unit 1714 to the transmission weight value interpolation unit 1715. The transmission weight value interpolation unit 1715 switches a technique of interpolating a transmission weight value of a subcarrier included in each frequency band based on the correlation value. Specifically, if the correlation value is less than a predetermined threshold value, the transmission weight value interpolation unit 1715 interpolates transmission weight values through copy, averaging, or the like of the input transmission weight values as in the transmission weight value interpolation unit 1312 in the fifth embodiment. If the correlation value is greater than or equal to the threshold value, the transmission weight value interpolation unit 1715 performs interpolation using the input transmission weight values and the transmission weight values stored in the transmission weight storage unit 1513 as in the transmission weight value interpolation unit 1514 in the seventh embodiment.

Because a communication operation of the wireless communication system in the present embodiment is the same as that of the wireless communication system in the seventh embodiment, a description thereof will be omitted. In the data transmission station 1700 in the present embodiment, the correlation value between the transmission weight values stored in the transmission weight storage unit 1513 and the transmission weight values obtained based on the reception signal is calculated and a technique of interpolating the transmission weight values is selected based on the correlation value. For example, when the differences between the transmission weight values stored in the transmission weight storage unit 1513 and current transmission weight values are large, the transmission weight values are interpolated without using the stored transmission weight values. It is possible to further increase the interpolation precision of transmission weight values and improve the quality of MU-MIMO transmission by switching the interpolation technique based on the correlation value.

In the wireless communication systems in the fourth to ninth embodiments, the data transmission station calculates propagation channel information or transmission weight values based on a reception signal and performs interpolation based on the calculated propagation channel information or transmission weight values with respect to a subcarrier for which the propagation channel information or the transmission weight values have not been obtained. By interpolating the propagation channel information or transmission weight values, it is possible to acquire transmission weight values necessary in MU-MIMO (spatial multiplexing transmission using the same frequency band at the same time) for a plurality of data reception stations even if propagation channel information cannot be obtained from signals transmitted to the data transmission station by the plurality of data reception stations.

Tenth Embodiment

Figure 18:
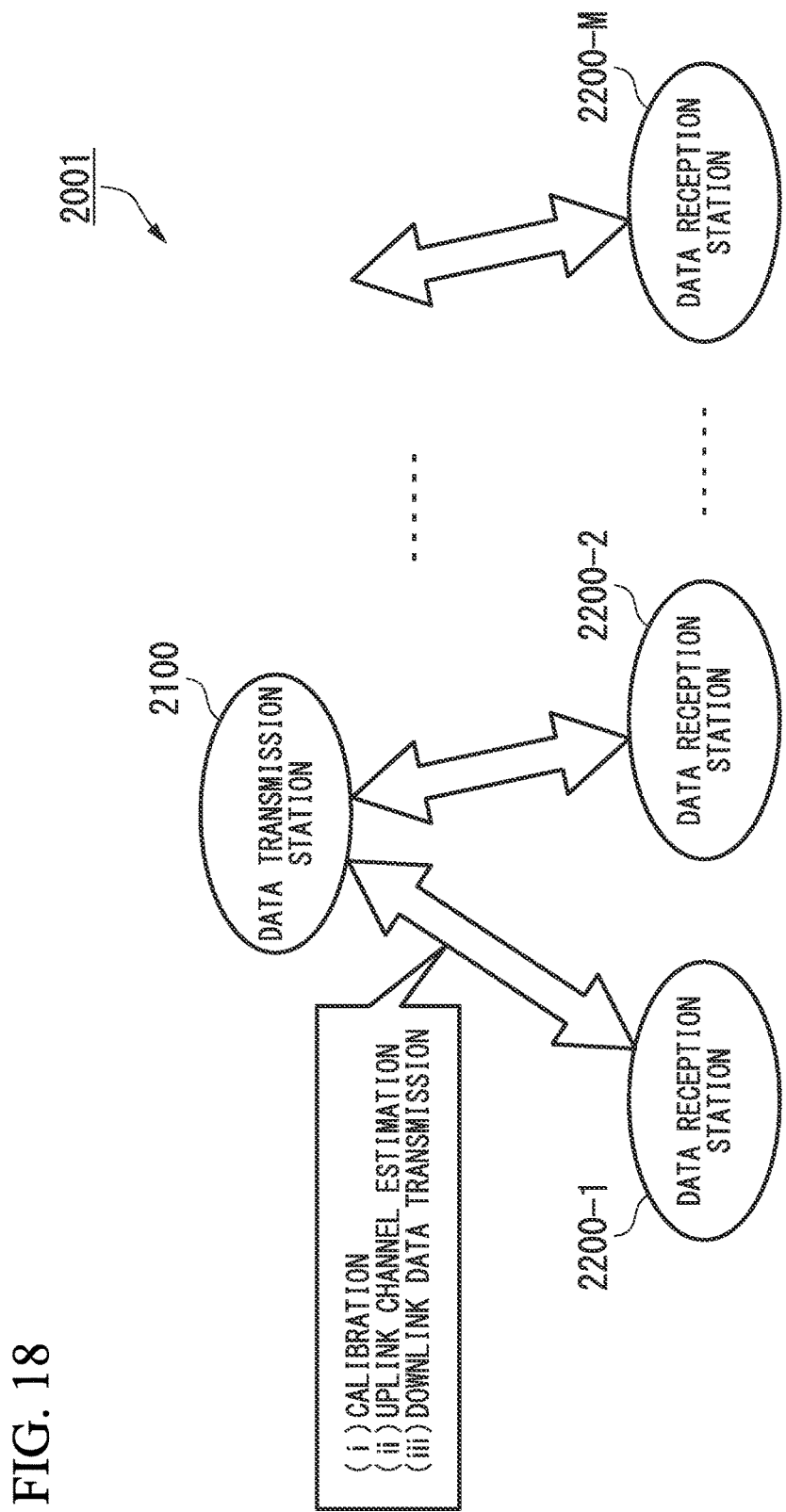
FIG. 18 is a diagram illustrating a configuration example of a wireless communication system based on MU-MIMO in a tenth embodiment of the present invention.

The tenth embodiment of the present invention will be described in detail with reference to the drawings. FIG. 18 is a diagram illustrating a configuration example of a wireless communication system 2001 based on MU-MIMO in the present embodiment. The wireless communication system 2001 includes a data transmission station 2100 (base station apparatus), and data reception stations 2200-1 to 2200-M (M is an integer greater than or equal to 2) (terminal station apparatuses).

Hereinafter, descriptions that apply to all the data reception stations 2200-1 to 2200-M will be denoted as "data reception station(s) 2200" with part of the reference signs omitted. Hereinafter, the direction from the data transmission station 2100 to the data reception stations 2200 is referred to as a "downlink". In addition, the direction from the data reception stations 2200 to the data transmission station 2100 is referred to as an "uplink".

The data transmission station 2100 is a wireless communication apparatus. The data transmission station 2100, for example, is an access point (AP) in a wireless local area network (LAN). The data transmission station 2100 generates a radio packet. The generated radio packet includes an identifier for identifying the data transmission station 2100 and identifiers for identifying the data reception stations 2200.

The data transmission station 2100 performs radio packet communication with the data reception stations 2200 through a communication process including (i) a calibration step, (ii) an uplink channel estimation step, and (iii) a downlink data transmission step. The data transmission station 2100 performs the radio packet communication with the data reception stations 2200 using the same frequency channels based on a carrier sense multiple access/collision avoidance (CSMA/CA) scheme.

The data reception stations 2200 (STA: Station) perform the radio packet communication with the data transmission station 2100. The data reception stations 2200 are apparatuses serving as destinations of the radio packet generated by the data transmission station 2100. The data reception stations 2200, for example, are computers or portable information electronic devices.

Next, a configuration example of the data transmission station 2100 will be described.

Figure 19:
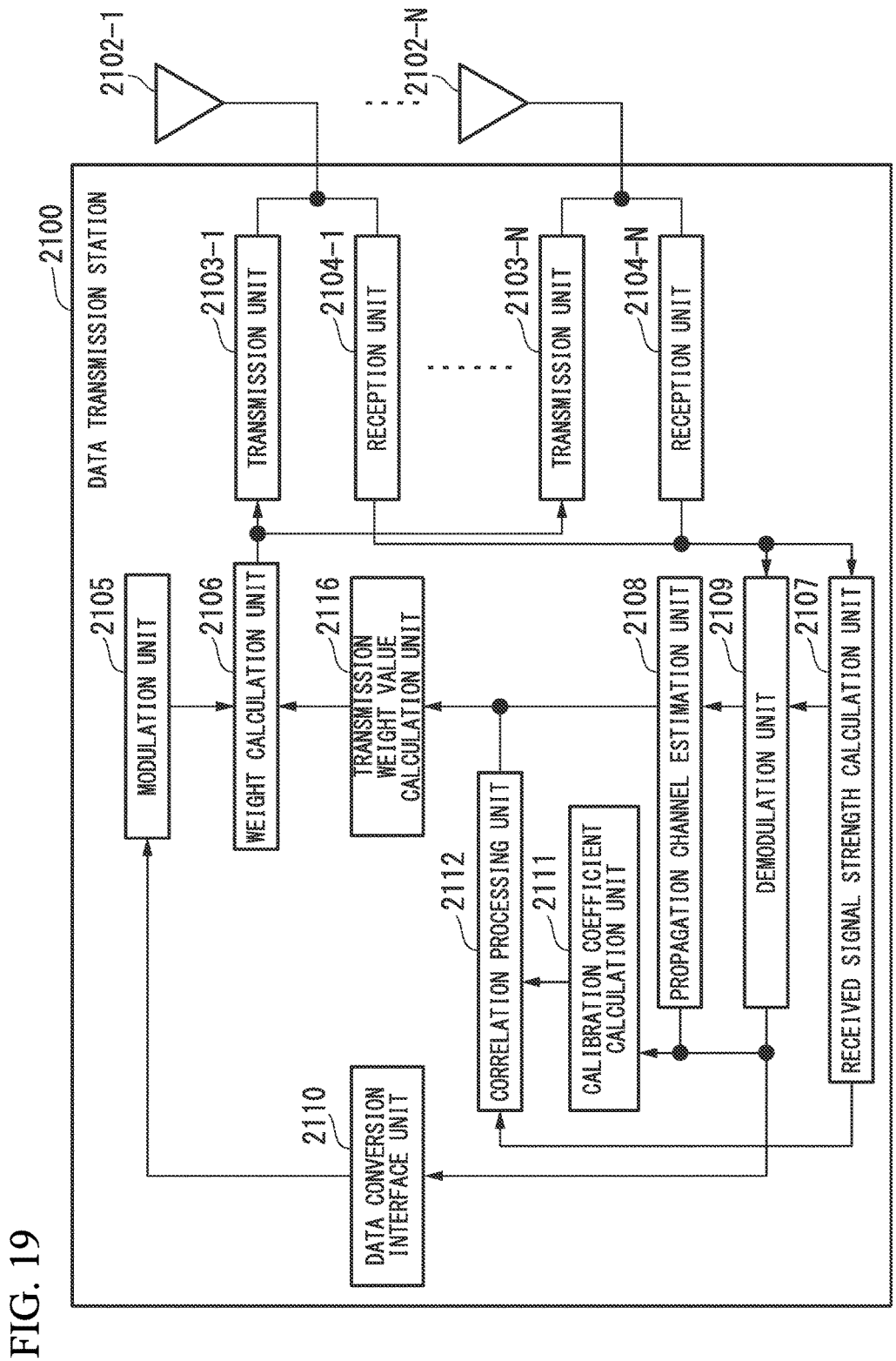
FIG. 19 is a diagram illustrating a configuration example of a data transmission station in the tenth embodiment of the present invention.

FIG. 19 is a diagram illustrating the configuration example of the data transmission station 2100 in the present embodiment. The data transmission station 2100 includes antennas 2102, transmission units 2103, reception units 2104, a modulation unit 2105, a weight calculation unit 2106, a received signal strength calculation unit 2107, a propagation channel estimation unit 2108, a demodulation unit 2109, a data conversion interface unit 2110, a calibration coefficient calculation unit 2111, a correlation processing unit 2112, and a transmission weight value calculation unit 2116.

The data transmission station 2100 includes antennas 2102-1 to 2102-N (N is an integer greater than or equal to 2). Hereinafter, descriptions that apply to all the antennas 2102-1 to 2102-N will be denoted as "antenna(s) 2102" with part of the reference signs omitted.

The data transmission station 2100 includes the transmission unit 2103 for each antenna 2102. That is, the data transmission station 2100 includes transmission units 2103-1 to 2103-N. Hereinafter, descriptions that apply to all the transmission units 2103-1 to 2103-N will be denoted as "transmission unit(s) 2103" with part of the reference signs omitted.

The data transmission station 2100 includes the reception unit 2104 (acquisition unit) for each antenna 2102. That is, the data transmission station 2100 includes reception units 2104-1 to 2104-N. Hereinafter, descriptions that apply to all the reception units 2104-1 to 2104-N will be denoted as "reception unit(s) 2104" with part of the reference signs omitted.

The antennas 2102 transmit and receive signals indicating radio packets to and from the data reception stations 2200. Hereinafter, the transmission via the antennas 2102 of the data transmission station 2100 is referred to as "downlink transmission". Hereinafter, the reception via the antennas 2102 of the data transmission station 2100 is referred to as "uplink reception".

The reception unit 2104-$n$ (n is any integer of 1 to N) receives a signal indicating a radio packet via the antenna 2102-$n$. The reception unit 2104-$n$ converts a frequency of the uplink-received signal indicating the radio packet into a predetermined frequency. In addition, the reception unit 2104-$n$ performs adjustment or the like of receive power on the uplink-received signal indicating the radio packet. The reception unit 2104-$n$ outputs the uplink-received signal indicating the radio packet to the demodulation unit 2109 and the received signal strength calculation unit 2107.

The uplink-received signal indicating the radio packet may include propagation channel information feedback (CSI-FB: Channel State Information—Feedback). In addition, the uplink-received signal indicating the radio packet may include a known signal used in estimation of propagation channel information. The known signal, for example, is a null data packet (NDP). In addition, the uplink-received signal indicating the radio packet may include a predetermined confirmation signal (confirmation response signal) (BA: Block Acknowledgement).

The received signal strength calculation unit 2107 acquires uplink-received signals indicating the radio packet from the reception units 2104. The received signal strength calculation unit 2107 calculates a received signal strength (receive power) (RSSI: Received Signal Strength Indicator) based on the uplink-received signals indicating the radio packet. The received signal strength calculation unit 2107 outputs information indicating the received signal strength to the demodulation unit 2109 and the correlation processing unit 2112.

The demodulation unit 2109 (acquisition unit) acquires the uplink-received signals indicating the radio packet from the reception units 2104. The demodulation unit 2109 performs a demodulation process on the uplink-received signals indicating the radio packet. A data portion of the uplink-received signal indicating the radio packet may include downlink propagation channel information (for example, CSI-FB) from the data transmission station 2100 to one of the data reception stations 2200. The demodulation unit 2109 outputs the demodulated signal indicating the radio packet to the propagation channel estimation unit 2108, the calibration coefficient calculation unit 2111, and the data conversion interface unit 2110.

The data conversion interface unit 2110 acquires the demodulated signal indicating the radio packet from the demodulation unit 2109. The data conversion interface unit 2110 is an interface located in a boundary between a physical layer and a medium access control layer. The data conversion interface unit 2110 converts the demodulated radio packet into a data packet of a predetermined format and transmits a signal indicating the converted data packet to an external network (not illustrated).

In addition, the data conversion interface unit 2110 receives a signal indicating a data packet of a predetermined format from the external network. The data conversion interface unit 2110 converts the signal indicating the data packet received from the external network into a predetermined data signal and outputs the converted data signal to the modulation unit 2105.

The propagation channel estimation unit 2108 acquires the uplink-received signal indicating the radio packet from the demodulation unit 2109. A data portion of the uplink-received signal indicating the radio packet may include downlink propagation channel information (for example, CSI-FB) from the data transmission station 2100 to one of the data reception stations 2200. When the signal indicating the radio packet including the downlink propagation channel information is acquired, the propagation channel estimation unit 2108 estimates uplink propagation channel information based on a training preamble portion of the packet in which the downlink propagation channel information is included in the data portion.

In addition, the data portion of the uplink-received signal indicating the radio packet may include a known signal (for example, NDP). The propagation channel estimation unit 2108 compares an uplink-received known signal with a predetermined signal for estimation. The propagation channel estimation unit 2108 estimates the uplink propagation channel information based on a compared result. The propagation channel estimation unit 2108 outputs the downlink propagation channel information and the uplink propagation channel information to the calibration coefficient calculation unit 2111 and the transmission weight value calculation unit 2116.

The calibration coefficient calculation unit 2111 acquires the downlink propagation channel information from the propagation channel estimation unit 2108. In addition, the calibration coefficient calculation unit 2111 acquires the uplink propagation channel information from one of the data reception stations 2200 to the data transmission station 2100 from the propagation channel estimation unit 2108. The calibration coefficient calculation unit 2111 calculates calibration coefficients (hereinafter referred to as "unprocessed calibration coefficients") before highly precise processing based on the downlink propagation channel information and the uplink propagation channel information. That is, the calibration coefficient calculation unit 2111 calculates the unprocessed calibration coefficients based on a ratio between circuit characteristics of a transmission end and circuit characteristics of a reception end in the data transmission station 2100. The calibration coefficient calculation unit 2111 outputs information indicating the unprocessed calibration coefficients to the correlation processing unit 2112.

The correlation processing unit 2112 acquires the information indicating the unprocessed calibration coefficients from the calibration coefficient calculation unit 2111. The correlation processing unit 2112 acquires the information indicating the received signal strength from the received signal strength calculation unit 2107. The calibration coefficients have correlations in a frequency domain. The correlation processing unit 2112 calculates calibration coefficients (hereinafter referred to as a "processed calibration coefficients") after the highly precise processing by performing the highly precise processing on the unprocessed calibration coefficients based on the correlation between the calibration coefficients in the frequency domain. The correlation processing unit 2112 calculates calibration coefficients (hereinafter referred to as a "processed calibration coefficient") after the highly precise processing by performing the highly precise processing on the unprocessed calibration coefficients based on the received signal strength. The correlation processing unit 2112 outputs information indicating the processed calibration coefficients to the transmission weight value calculation unit 2116.

The transmission weight value calculation unit 2116 acquires the uplink propagation channel information from the propagation channel estimation unit 2108. The transmission weight value calculation unit 2116 acquires the information indicating the processed calibration coefficients from the correlation processing unit 2112. The transmission weight value calculation unit 2116 calculates transmission weight values (transmission weights) based on the uplink propagation channel information and the processed calibration coefficients. The transmission weight value calculation unit 2116 outputs information indicating the transmission weight values to the weight calculation unit 2106.

The transmission weight value calculation unit 2116 calculates the transmission weight values based on a method using a linear calculation such as a zero forcing (ZF) method or a minimum mean squared error (MMSE) method. In addition, the transmission weight value calculation unit 2116 may calculate the transmission weight values based on a method using a non-linear calculation such as a Tomlinson Harashima precoding (THP) method or a vector perturbation (VP) method. It is to be noted that a method for calculating the transmission weight values may be any method, and is not limited to a specific method.

The modulation unit 2105 acquires the converted data signal from the data conversion interface unit 2110. The modulation unit 2105 modulates the converted data signal into a signal indicating a radio packet. The modulation unit 2105 outputs the modulated signal indicating the radio packet to the weight calculation unit 2106.

The weight calculation unit 2106 acquires the modulated signal indicating the radio packet from the modulation unit 2105. The weight calculation unit 2106 acquires the information indicating the transmission weight values from the transmission weight value calculation unit 2116. The weight calculation unit 2106 generates a signal indicating a radio packet to be downlink-transmitted by multiplying (weight-combining) the modulated signal indicating the radio packet by the transmission weight values. The signal indicating the radio packet to be downlink-transmitted is a signal used for transmit beamforming. The weight calculation unit 2106 outputs the signal indicating the radio packet to be downlink-transmitted to the transmission units 2103.

The transmission units 2103 acquire the signal indicating the radio packet to be downlink-transmitted from the weight calculation unit 2106. The transmission unit 2103 converts a frequency of the signal indicating the radio packet to be downlink-transmitted into a predetermined frequency defined in the wireless communication system 2001. In addition, the transmission unit 2103-$n$ (n is any integer of 1 to N) performs adjustment or the like of transmit power for the signal indicating the radio packet to be downlink-transmitted. The transmission unit 2103-$n$ outputs the signal indicating the radio packet to be downlink-transmitted to the antenna 2102-$n$.

Next, a configuration example of the data reception station 2200 will be described.

Figure 20:
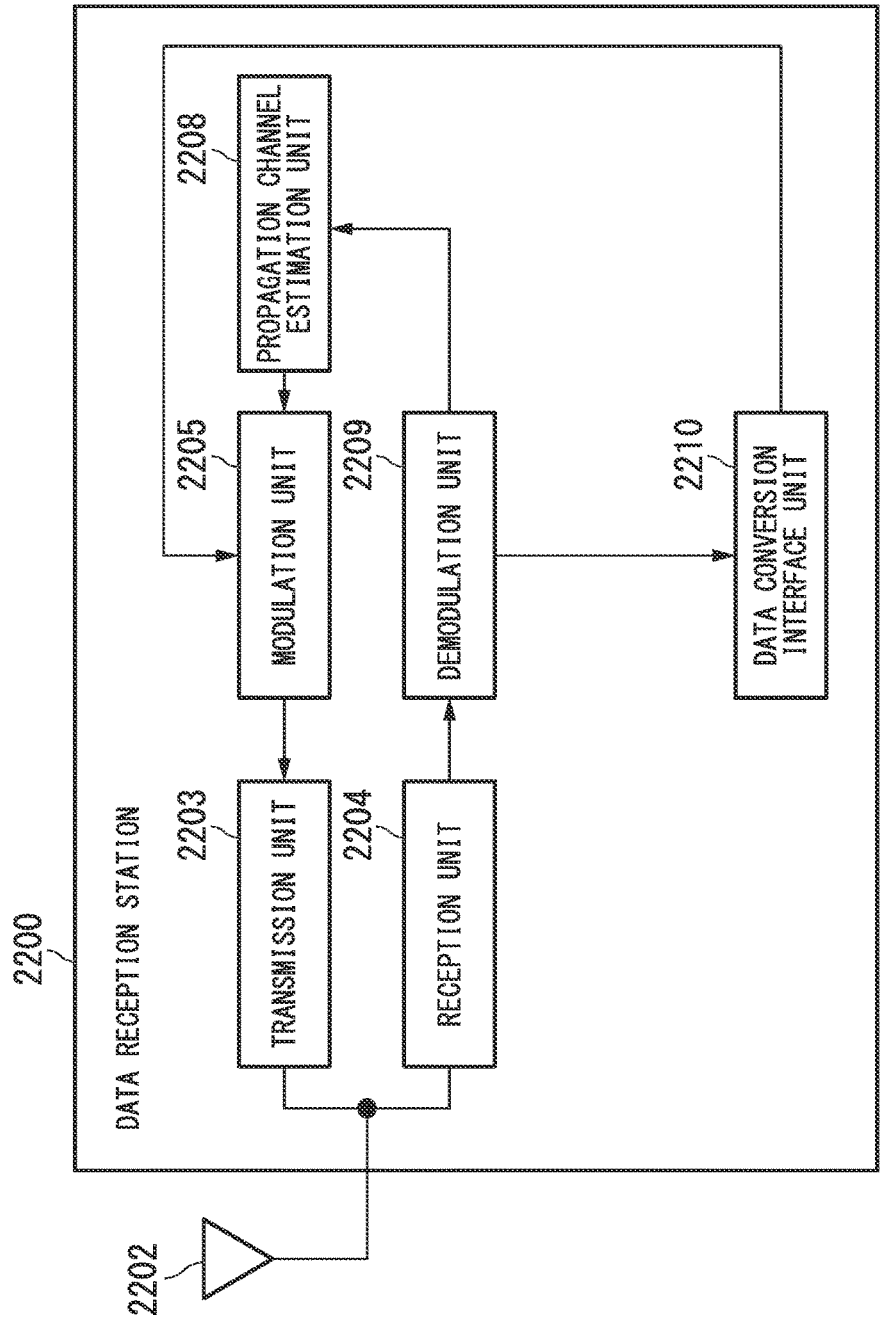
FIG. 20 is a diagram illustrating a configuration example of a data reception station in the tenth embodiment of the present invention.

FIG. 20 is a diagram illustrating the configuration example of the data reception station 2200 in the present embodiment. The data reception station 2200 includes an antenna 2202, a transmission unit 2203, a reception unit 2204, a modulation unit 2205, a propagation channel estimation unit 2208, a demodulation unit 2209, and a data conversion interface unit 2210.

The antenna 2202 transmits and receives signals indicating a radio packet to and from the data transmission station 2100. Hereinafter, the transmission via the antenna 2202 of the data reception station 2200 is referred to as "uplink transmission". Hereinafter, the reception via the antenna 2202 of the data reception station 2200 is referred to as "downlink reception".

The reception unit 2204 receives the signal indicating the radio packet via the antenna 2202. The reception unit 2204 converts a frequency of the downlink-received signal indicating the radio packet into a predetermined frequency. In addition, the reception unit 2204 performs adjustment or the like of receive power on the downlink-received signal indicating the radio packet. The reception unit 2204 outputs the downlink-received signal indicating the radio packet to the demodulation unit 2209.

The demodulation unit 2209 acquires the downlink-received signal indicating the radio packet from the reception unit 2204. The demodulation unit 2209 performs a demodulation process on the downlink-received signal indicating the radio packet. The demodulation unit 2209 outputs the demodulated signal indicating the radio packet to the propagation channel estimation unit 2208 and the data conversion interface unit 2210.

The data conversion interface unit 2210 acquires the demodulated signal indicating the radio packet from the demodulation unit 2209. The data conversion interface unit 2210 is an interface located in a boundary between a physical layer and a medium access control layer. The data conversion interface unit 2210 converts the demodulated radio packet into a data packet of a predetermined format and transmits a signal indicating the converted data packet to an external network (not illustrated).

In addition, the data conversion interface unit 2210 receives a signal indicating a data packet of a predetermined format from the external network. The data conversion interface unit 2210 may convert the signal indicating the data packet received from the external network into a predetermined data signal and output the converted data signal to the modulation unit 2205.

The propagation channel estimation unit 2208 acquires the signal indicating the demodulated radio packet from the demodulation unit 2209. The propagation channel estimation unit 2208 compares a downlink-received known signal with a predetermined signal for estimation. The propagation channel estimation unit 2208 estimates downlink propagation channel information based on a compared result. The propagation channel estimation unit 2208 outputs propagation channel information feedback (CSI-FB) indicating the downlink propagation channel information to the modulation unit 2205.

The modulation unit 2205 acquires the propagation channel information feedback (CSI-FB) from the propagation channel estimation unit 2208. The modulation unit 2205 modulates the propagation channel information feedback. The modulation unit 2205 outputs the propagation channel information feedback to the transmission unit 2203. The modulation unit 2205 acquires a known signal (NDP) from the data conversion interface unit 2210. The modulation unit 2205 modulates the known signal. The modulation unit 2205 acquires a predetermined confirmation signal (BA) from the data conversion interface unit 2210. The modulation unit 2205 modulates the predetermined confirmation signal. The modulation unit 2205 outputs a signal indicating a radio packet to be uplink-transmitted to the transmission unit 2203.

The modulation unit 2205 acquires a data signal from the data conversion interface unit 2210. The modulation unit 2105 modulates the data signal into a signal indicating a radio packet. The modulation unit 2205 outputs the modulated signal indicating the radio packet to the transmission unit 2203.

The transmission unit 2203 acquires the signal indicating the radio packet to be uplink-transmitted from the modulation unit 2205. The transmission unit 2203 converts a frequency of the signal indicating the radio packet to be uplink-transmitted into a predetermined frequency defined in the wireless communication system. The transmission unit 2203 performs adjustment or the like of transmit power on the signal indicating the radio packet to be uplink-transmitted. The transmission unit 2203 outputs the signal indicating the radio packet to be uplink-transmitted to the antenna 2202.

This signal indicating the radio packet to be uplink-transmitted may include propagation channel information feedback (CSI-FB). In addition, this signal indicating the radio packet to be uplink-transmitted may include a known signal. In addition, this signal indicating the radio packet to be uplink-transmitted may include a predetermined confirmation signal (BA).

Next, an operation example of the wireless communication system 2001 will be described.

Figure 21:
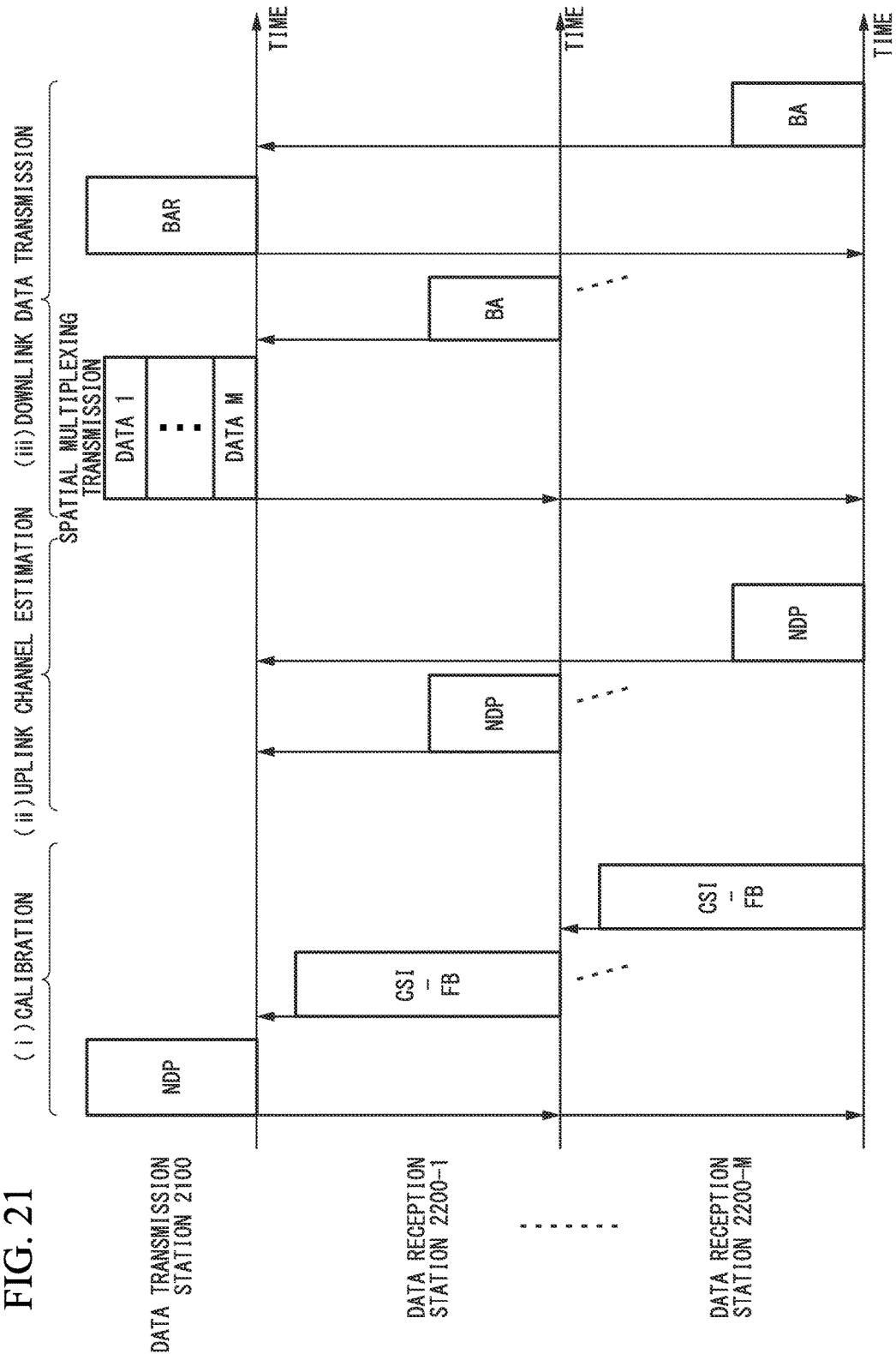
FIG. 21 is a timing chart illustrating an example of an operation procedure of the wireless communication system in the tenth embodiment of the present invention.

FIG. 21 is a timing chart illustrating the operation example of the wireless communication system in the present embodiment. The data transmission station 2100 generates transmission data to be transmitted to the data reception stations 2200. The data transmission station 2100 performs radio packet communication with the data reception stations 2200 through a communication process including (i) a calibration step, (ii) an uplink channel estimation step, and (iii) a downlink data transmission step.

(i) Calibration step

The data transmission station 2100 transmits a known signal (NDP) to the data reception stations 2200. The data reception stations 2200 receive the known signal. The data reception stations 2200 estimate downlink propagation channel information based on the received known signal. The data reception stations 2200 transmit propagation channel information feedback (CSI-FB) in which the downlink propagation channel information is included in a data portion to the data transmission station 2100.

The demodulation unit 2109 acquires the downlink propagation channel information (for example, CSI-FB) from the data reception stations 2200 via the reception units 2104.

The propagation channel estimation unit 2108 estimates uplink propagation channel information based on a training preamble portion of the propagation channel information feedback. Hereinafter, in order to simplify the description, Formulas (22) to (29) are represented in accordance with a notation in which calibration coefficients include no estimation error.

The calibration coefficient calculation unit 2111 calculates calibration coefficients C[k] based on the downlink propagation channel information and the estimated uplink propagation channel information. The downlink propagation channel information $H_D[k]$ is expressed by Formula (22).

[Formula 22]

$$H_D[k] = G_{RS}[k]H[k]G_{TA}[k] = \begin{bmatrix} h_{D,1,1}[k] & h_{D,1,2}[k] & & h_{D,1,N}[k] \\ h_{D,2,1}[k] & & & \\ & & \ddots & \\ h_{D,M,1}[k] & & & h_{D,M,N}[k] \end{bmatrix} \quad (22)$$

Here, k denotes a subcarrier number. N denotes the number of the antennas 2102 of the data transmission station 2100. M denotes the number of the data reception stations 2200. H[k] denotes a response (communication path response) of propagation channel information in the air. $G_{RS}[k]$ denotes circuit characteristics of the reception units 2204 of the data reception stations 2200. $G_{TA}[k]$ denotes circuit characteristics of the transmission units 2103 of the data transmission station 2100.

The response H[k] of the propagation channel information in the air, the circuit characteristics $G_{RS}[k]$ of the reception units 2204 of the data reception stations 2200, and the circuit characteristics $G_{TA}[k]$ of the transmission units 2103 of the data transmission, station 2100 are expressed by Formulas (23).

[Formula 23]

$$H[k] = \begin{bmatrix} h_{1,1}[k] & h_{1,2}[k] & & h_{1,N}[k] \\ h_{2,1}[k] & & & \\ & & \ddots & \\ h_{M,1}[k] & & & h_{M,N}[k] \end{bmatrix}$$

$$G_{RS}[k] = \begin{bmatrix} g_{RS,1}[k] & 0 & 0 \\ 0 & \ddots & 0 \\ 0 & 0 & g_{RS,M}[k] \end{bmatrix}$$

$$G_{TA}[k] = \begin{bmatrix} g_{TA,1}[k] & 0 & 0 \\ 0 & \ddots & 0 \\ 0 & 0 & g_{TA,N}[k] \end{bmatrix} \quad (23)$$

In addition, the uplink propagation channel information $H_U[k]$ is expressed by formula (24).

[Formula 24]

$$H_U[k] = G_{TS}[k]H[k]G_{RA}[k] = \begin{bmatrix} h_{U,1,1}[k] & h_{U,1,2}[k] & & h_{U,1,N}[k] \\ h_{U,2,1}[k] & & & \\ & & & \\ h_{U,M,1}[k] & & & h_{U,M,N}[k] \end{bmatrix} \quad (24)$$

Here, $G_{TS}[k]$ denotes circuit characteristics of the transmission units 2203 of the data, reception stations 2200. $G_{RA}[k]$ denotes circuit characteristics of the reception units 2104 of the data transmission station 2100.

The circuit characteristics $G_{TS}[k]$ of the transmission units 2203 of the data reception stations 2200 and the circuit characteristics $G_{RA}[k]$ of the reception units 2104 of the data transmission station 2100 are expressed by Formulas (25).

[Formula 25]

$$G_{TS}[k] = \begin{bmatrix} g_{TS,1}[k] & 0 & 0 \\ 0 & \ddots & 0 \\ 0 & 0 & g_{TS,M}[k] \end{bmatrix}$$

$$G_{RA}[k] = \begin{bmatrix} g_{RA,1}[k] & 0 & 0 \\ 0 & \ddots & 0 \\ 0 & 0 & g_{RA,N}[k] \end{bmatrix} \quad (25)$$

The downlink propagation channel information and the uplink propagation channel information are used in the calculation of the calibration coefficients C[k] shown in Formula (26).

[Formula 26]

$$C[k] = \begin{bmatrix} c_1[k] & 0 & 0 & 0 \\ 0 & c_2[k] & 0 & 0 \\ 0 & 0 & \ddots & 0 \\ 0 & 0 & 0 & c_N[k] \end{bmatrix} \quad (26)$$

The transmission weight value calculation unit 2116 multiplies the uplink propagation channel information $H_U[k]$ by the calibration coefficients C[k] as shown in Formula (27). The transmission weight value calculation unit 2116 calculates transmission weight values (transmission weights) based on calibrated uplink propagation channel information $H_C[k]$.

[Formula 27]

$$H_C[k] = H_U[k]C[k] \quad (27)$$

The calibration coefficients. C[k] shown in Formula (27) satisfy Formula (28). β[k] shown in Formula (28) is any complex number.

[Formula 28]

$$c_n[k] = \beta[k]\frac{g_{TA,n}[k]}{g_{RA,n}[k]} \quad (28)$$

For example, a calibration coefficient $c_n^{(m)}[k]$ obtained using an estimation, value of propagation channel information between the data, reception station 2200-*m* and the antenna 2102-*n* is expressed by Formula (29).

[Formula 29]

$$c_n^{(m)}[k] = \frac{h_{U,m,1}[k]}{h_{D,m,1}[k]} \frac{h_{D,m,n}[k]}{h_{U,m,n}[k]} = \frac{g_{RA,1}[k]}{g_{TA,1}[k]} \frac{g_{TA,n}[k]}{g_{RA,n}[k]} \quad (29)$$

Although the calibration coefficient $c_n^{(m)}[k]$ shown in Formula (29) is written with a notation including no estimation error, an estimation error is actually included when the propagation channel information is estimated.

Hereinafter, a symbol "^" above a variable h in formulas is written before the variable h herein as "(^h)". In addition, hereinafter, a symbol "^" above a variable c in the formulas is written before the variable c herein as "(^c)". In addition, hereinafter, a symbol "~" above the variable c in the formulas is written before the variable c herein as "(~c)". Hereinafter, propagation channel information including the estimation error is expressed as $(\hat{h})_{D,m,1}[k]$, $(\hat{h})_{U,m,1}[k]$, $(\hat{h})_{D,m,n}[k]$, and $(\hat{h})_{U,m,n}[k]$.

Here, $(\hat{h})_{D,m,1}[k]$ is a component based on the reception unit 2204 and the antenna 2202 of the $m^{th}$ data reception station 2200-*m* and the first transmission unit 2103-1 and the first antenna 2102-1 of the data transmission station 2100 among components of the downlink propagation channel information $H_D$.

In addition, $(\hat{h})_{U,m,1}[k]$ is a component based on the reception unit 2204 and the antenna 2202 of the $m^{th}$ data reception station 2200-*m* and the first transmission unit 2103-1 and the first antenna 2102-1 of the data transmission station 2100 among components of the uplink propagation channel information $H_U$.

In addition, $(\hat{h})_{D,m,n}[k]$ is a component based on the reception unit 2204 and the antenna 2202 of the $m^{th}$ data reception station 2200-*m* and the $n^{th}$ transmission unit 2103-*n* and the $n^{th}$ antenna 2102-*n* of the data transmission station 2100 among the components of the downlink propagation channel information in.

In addition, $(\hat{h})_{U,m,n}[k]$ is a component based on the reception unit 2204 and the antenna 2202 of the $m^{th}$ data reception station 2200-*m* and the $n^{th}$ transmission unit 2103-*n* and the $n^{th}$ antenna 2102-*n* of the data transmission station 2100 among the components of the uplink propagation channel information $H_U$.

An unprocessed calibration coefficient $(\hat{c})_n^{(m)}[k]$ is obtained based on the propagation channel information including the estimation error. The unprocessed calibration coefficient $(\hat{c})_n^{(m)}[k]$ is expressed by Formula (30).

[Formula 30]

$$\hat{c}_n^{(m)}[k] = \frac{\hat{h}_{U,m,1}[k]}{\hat{h}_{D,m,1}[k]} \frac{\hat{h}_{D,m,n}[k]}{\hat{h}_{U,m,n}[k]} \quad (30)$$

The correlation processing unit 2112 obtains information indicating the unprocessed calibration coefficient $(\hat{c})_n^{(m)}[k]$ shown in Formula (30) from the calibration coefficient calculation unit 2111. The correlation processing unit 2112 performs highly precise processing using a correlation of the calibration coefficients in the frequency domain on the unprocessed calibration coefficient $(\hat{c})_n^{(m)}[k]$ shown in Formula (30). The correlation processing unit 2112 obtains a processed calibration coefficient $(\sim c)_n^{(m)}[k]$ by the highly precise processing. The correlation processing unit 2112 outputs the processed calibration coefficient $(\sim c)_n^{(m)}[k]$ as the calibration coefficient C[k] shown in Formula (27) to the transmission weight value calculation unit 2116.

As shown in Formula (27), the transmission weight value calculation unit 2116 calculates the transmission weight values by multiplying the uplink propagation channel information $H_U[k]$ by the processed calibration coefficients $(\sim c)_n^{(m)}[k]$ serving as the calibration coefficients C[k] shown in Formula (27). The weight calculation unit 2106 multiplies a signal indicating the modulated radio packet by the transmission weight values.

(i-1) Simple Combining in a Frequency Direction Domain in the Calibration Step

Hereinafter, a method using the unprocessed calibration coefficient $(\hat{c})_n^{(1)}[k]$ of the data reception station 2200-*m* for any one subcarrier k will be described as an example.

The correlation processing unit 2112 combines the unprocessed calibration coefficient $(\hat{c})_n^{(1)}[k]$ with the unprocessed calibration coefficients $(\hat{c})_n^{(m)}[k\pm1], \ldots$, the unprocessed calibration coefficients $(\hat{c})_n^{(m)}[k\pm R]$ corresponding to adjacent subcarriers (R subcarriers from the next subcarrier) predetermined in the frequency domain as shown in Formula (31). Thereby, the correlation processing unit 2112 can reduce the influence of noise.

[Formula 31]

$$\tilde{c}_n[k] = a_0 \hat{c}_n^{(1)}[k] + \sum_{r=1}^{R} \left( a_{-r} \hat{c}_n^{(1)}[k-r] + a_{+r} \hat{c}_n^{(1)}[k+r] \right) \quad (31)$$

Here, "$a_0, a_{\pm 1}, \ldots, a_{\pm R}$" are weight coefficients corresponding to correlations of the calibration coefficients in the frequency domain. The weight coefficients corresponding to the correlations in the frequency domain are determined so as to satisfy Formula (32).

[Formula 32]

$$a_0 + \sum_{r=1}^{R} (a_{-r} + a_{+r}) = 1 \quad (32)$$

In general, a relation of "$a_0 \geq a_{\pm 1} \geq \ldots \geq a_{\pm R} \geq 0$" is established among the weight coefficients. The weight coefficient $a_0$ is defined to be relatively larger when the correlation between the calibration coefficients in the frequency domain is lower. R denotes the number of the adjacent subcarriers to be used. The number of the subcarriers R may be a predetermined constant or it may be adaptively determined. For example, when amplitude fluctuation of a frequency response of circuit characteristics is greater than a predetermined threshold value, the number of the subcarriers R may be adaptively determined so as to be less than a predetermined number.

Because the influence of noise is greater when the received signal strength (RSSI) is less, the effect by using the correlations between the calibration coefficients in the frequency domain is higher when the received signal strength is less. When the received signal strength is less than a predetermined value, the weight coefficients other than the weight coefficient $a_0$ are determined to be relatively larger and the number of the subcarriers R is determined to be relatively larger, so that the effect by using the correlations in the frequency domain becomes high.

(i-2) Combination with a Weight Combining Calibration Method in the Calibration Step A combination of a weight combining calibration method in which a plurality of unprocessed calibration coefficients $(\hat{c})_n^{(1)}[k], \ldots, (\hat{c})_n^{(m)}[k]$ are used for any one subcarrier k and weight coefficients corresponding to the correlations between the calibration coefficients in the frequency domain are expressed by Formula (33).

[Formula 33]

$$\tilde{c}_n[k] = \sum_{m=1}^{M_C} \left[ \rho_{m,n,0} \hat{c}_n^{(m)}[k] + \sum_{r=1}^{R} \left( \rho_{m,n,-r} \hat{c}_n^{(m)}[k-r] + \rho_{m,n,+r} \hat{c}_n^{(m)}[k+r] \right) \right] \quad (33)$$

$$\rho_{m,n,\pm r} = a_{\pm r} \left( \frac{1}{|\hat{h}_{U,m,1}[k \pm r]|^2} + \frac{1}{|\hat{h}_{D,m,1}[k \pm r]|^2} + \frac{1}{|\hat{h}_{U,m,n}[k \pm r]|^2} + \frac{1}{|\hat{h}_{D,m,n}[k \pm r]|^2} \right)^{-1}$$

The weight coefficients "$a_0, a_{\pm 1}, \ldots, a_{\pm R}$" corresponding to the correlations between the calibration coefficients in the frequency domain are determined so as to satisfy Formula (34).

[Formula 34]

$$\sum_{m=1}^{M_C} \left[ \rho_{m,n,0} + \sum_{r=1}^{R} \left( \rho_{m,n,-r} + \rho_{m,n,+r} \right) \right] = 1 \quad (34)$$

As described with reference to Formula (32), the weight coefficient $a_0$ is determined to be relatively larger when the correlations between the calibration coefficients in the frequency domain is lower.

(i-3) Selection of the Processed Calibration Coefficient $(\sim c)_n^{(m)}[k]$ in the Calibration Step The correlation processing unit 2112 selects an unprocessed calibration coefficient having the highest signal-to-noise ratio (SNR) from the unprocessed calibration coefficient $(\hat{c})_n^{(m)}[k]$, the unprocessed calibration coefficients $(\hat{c})_n^{(m)}[k\pm 1], \ldots,$ and the unprocessed calibration coefficients $(\hat{c})_n^{(m)}[k\pm R]$. The correlation processing unit 2112 determines the selected unprocessed calibration coefficient as the processed calibration coefficient $(\sim c)_n[k]$.

When the unprocessed calibration coefficient $(\hat{c})_n^{(m)}[k]$ is expressed by Formula (30), the signal-to-noise ratio, for example, is defined as shown in Formula (35).

[Formula 35]

$$\left( \frac{1}{|\hat{h}_{U,m,1}[k']|^2} + \frac{1}{|\hat{h}_{D,m,1}[k']|^2} + \frac{1}{|\hat{h}_{U,m,n}[k']|^2} + \frac{1}{|\hat{h}_{D,m,n}[k']|^2} \right)^{-1} \quad (35)$$

$(k' = k, k \pm 1, \ldots, k \pm R)$ (ii) Uplink Channel Estimation Step

The data reception stations 2200 transmit known signals (for example, NDP) to the data transmission station 2100. The known signals transmitted by the data reception station 2200 are used to estimate the uplink propagation channel information $H_U[k]$.

The demodulation unit 2100 acquires the known signals (for example, NDP) front the data reception stations 2200 via the reception units 2104.

The propagation channel estimation unit 2108 estimates the uplink propagation channel information $H_U[k]$ based on the known signals transmitted by the data reception stations 2200.

(iii) Downlink Data Transmission Step

The transmission weight value calculation unit 2116 multiplies the processed calibration coefficient $(\sim c)_n[k]$ by the uplink propagation channel information $H_U[k]$ obtained in the above-described (ii) uplink channel estimation step. The transmission weight value calculation unit 2116 calculates transmission weight values based on the calibrated uplink propagation channel information $H_C[k]$. The transmission weight values are used for transmit beamforming. The weight calculation unit 2106 generates signals indicating a radio packet to be downlink-transmitted by multiplying (weight-combining) the signal indicating the modulated radio packet by the transmission weight values.

The transmission units 2103 output the signals indicating the radio packet to be downlink-transmitted to the antennas 2102. The antennas 2102 perform spatial multiplexing transmission (MIMO transmission) on the signals indicating the radio packet to be downlink-transmitted for the data reception stations 2200.

A data reception station 2200 receives the signals indicating the radio packet. The data reception station 2200 determines whether the signals indicating the radio packet have been decoded without error. If the signals indicating the radio packet have been decoded without error, the data reception station 2200 transmits a predetermined confirmation signal (BA) to the data transmission station 2100.

The data transmission station 2100 transmits a confirmation response request signal (BAR: BA Request) to the data reception station 2200. The confirmation response request signal is a signal for requesting the transmission of a predetermined confirmation signal (BA). When the confirmation response request signal is received, the data reception station 2200 transmits a confirmation signal to the data transmission station 2100. The data transmission station 2100 receives the confirmation signal transmitted by the data reception station 2200. The data transmission station 2100 determines whether the data reception station 2200 has decoded the signals indicating the radio packet without error based on the confirmation signal transmitted by the data reception station 2200.

As described above, the data transmission station 2100 (wireless communication apparatus) of the present embodiment includes the reception units 2104, the demodulation unit 2109, the propagation channel estimation unit 2108, the calibration coefficient calculation unit 2111, the correlation processing unit 2112, the transmission weight value calculation unit 2116, the weight calculation unit 2106, and the transmission units 2103.

The reception units 2104 and the demodulation unit 2109 acquire a packet.

The propagation channel estimation unit 2108 estimates uplink propagation channel information based on the packet. For example, the propagation channel estimation unit 2108 estimates the uplink propagation channel information based on a training preamble portion of a packet including propagation channel information feedback (CSI-FB). In addition, for example, the propagation channel estimation unit 2108 estimates the uplink propagation channel information based on a known signal.

The calibration coefficient calculation unit 2111 calculates unprocessed calibration coefficients based on downlink propagation channel information and the uplink propagation channel information.

The correlation processing unit 2112 determines processed calibration coefficients based on the correlation between unprocessed calibration coefficients in the frequency domain.

The transmission weight value calculation unit 2116 calculates transmission weight values based on the processed calibration coefficients and the uplink propagation channel information.

The weight calculation unit 2106 and the transmission units 2103 wirelessly transmit a predetermined signal to the data reception stations 2200 based on the transmission weight values.

In addition, a wireless communication method in the data transmission station 2100 (wireless communication apparatus) of the present embodiment includes: a step of acquiring a packet; a step of estimating uplink propagation channel information; a step of calculating unprocessed calibration coefficients; a step of determining processed calibration coefficients; a step of calculating transmission weight values; and a step of wirelessly transmitting a predetermined signal.

In the step of acquiring the packet, the reception units 2104 and the demodulation unit 2109 acquire the packet.

In the step of estimating the uplink propagation channel information, the propagation channel estimation unit 2108 estimates the uplink propagation channel information based on the packet.

In the step of calculating the unprocessed calibration coefficients, the calibration coefficient calculation unit 2111 calculates the unprocessed calibration coefficients based on the downlink propagation channel information and the uplink propagation channel information.

In the step of determining the processed calibration coefficients, the correlation processing unit 2112 determines the processed calibration coefficients based on the correlations between the unprocessed calibration coefficients in the frequency domain.

In the step of calculating the transmission weight values, the transmission weight value calculation unit 2116 calculates the transmission weight values based on the processed calibration coefficients and the uplink propagation channel information.

In the wireless transmission step, the weight calculation unit 2106 and the transmission units 2103 wirelessly transmit the predetermined signal to the data reception stations 2200 based on the transmission weight values.

Through this configuration, the correlation processing unit 2112 determines the processed calibration coefficients based on the correlations between the unprocessed calibration coefficients in the frequency domain. That is, the correlation processing unit 2112 improves calibration precision using the correlations between the unprocessed calibration coefficients in the frequency domain. Thereby, in the data transmission station 2100 and the wireless communication method, it is possible to improve the quality of communication based on MIMO transmission.

In the implicit feedback beamforming technology, it is necessary to improve the precision of a calibration coefficient $c_n$ for calibrating the difference between propagation channel information in the uplink and propagation channel information in the downlink when the downlink propagation channel information is calculated using the uplink propagation channel information. However, the estimation precision of the calibration coefficient may be degraded and the transmission characteristics may be degraded due to noise and/or frequency selective fading.

The wireless communication system 2001 of the present embodiment improves the estimation precision of calibration coefficients of adjacent frequencies using the correlations between the calibration coefficients in the frequency domain. Thereby, the wireless communication system 2001 can improve the calibration precision of the uplink propagation channel information in an MIMO-orthogonal frequency-division multiplexing (OFDM) system. The wireless communication system 2001 can improve the precision of the transmission weight values. In addition, the wireless communication system 2001 can improve transmission characteristics of the wireless communication system which performs transmit beamforming.

The correlation processing unit 2112 of the present embodiment combines unprocessed calibration coefficients corresponding to adjacent subcarriers based on weights in accordance with correlations between the unprocessed calibration coefficients corresponding to the adjacent subcarriers predetermined in the frequency domain. The correlation processing unit 2112 of the present embodiment determines the processed calibration coefficients based on a combined result. That is, the correlation processing unit 2112 of the present embodiment performs combining in which the correlations between the unprocessed coefficients are used as weights.

The calibration coefficient calculation unit 2111 of the present embodiment calculates the unprocessed calibration coefficients for each data reception station 2200. That is, the calibration coefficient calculation unit 2111 of the present embodiment calculates a plurality of unprocessed calibration coefficients in a spatial direction.

The correlation processing unit 2112 of the present embodiment combines the unprocessed calibration coefficients based on weights based on channel gains and correlations between adjacent subcarriers predetermined in the frequency domain.

The calibration coefficient calculation unit 2111 of the present embodiment calculates the unprocessed calibration coefficients every time. That is, the calibration coefficient calculation unit 2111 of the present embodiment calculates a plurality of unprocessed calibration coefficients in the time direction.

The correlation processing unit 2112 of the present embodiment selects an unprocessed calibration coefficient having the highest signal-to-noise ratio (SNR) as a processed calibration coefficient from among unprocessed calibration coefficients corresponding to adjacent subcarriers predetermined in the frequency domain.

The correlation processing unit 2112 of the present embodiment relatively increases the number of subcarriers for use in calibration when the received signal strength (RSSI) is less than a predetermined value.

Eleventh Embodiment

Figure 22:
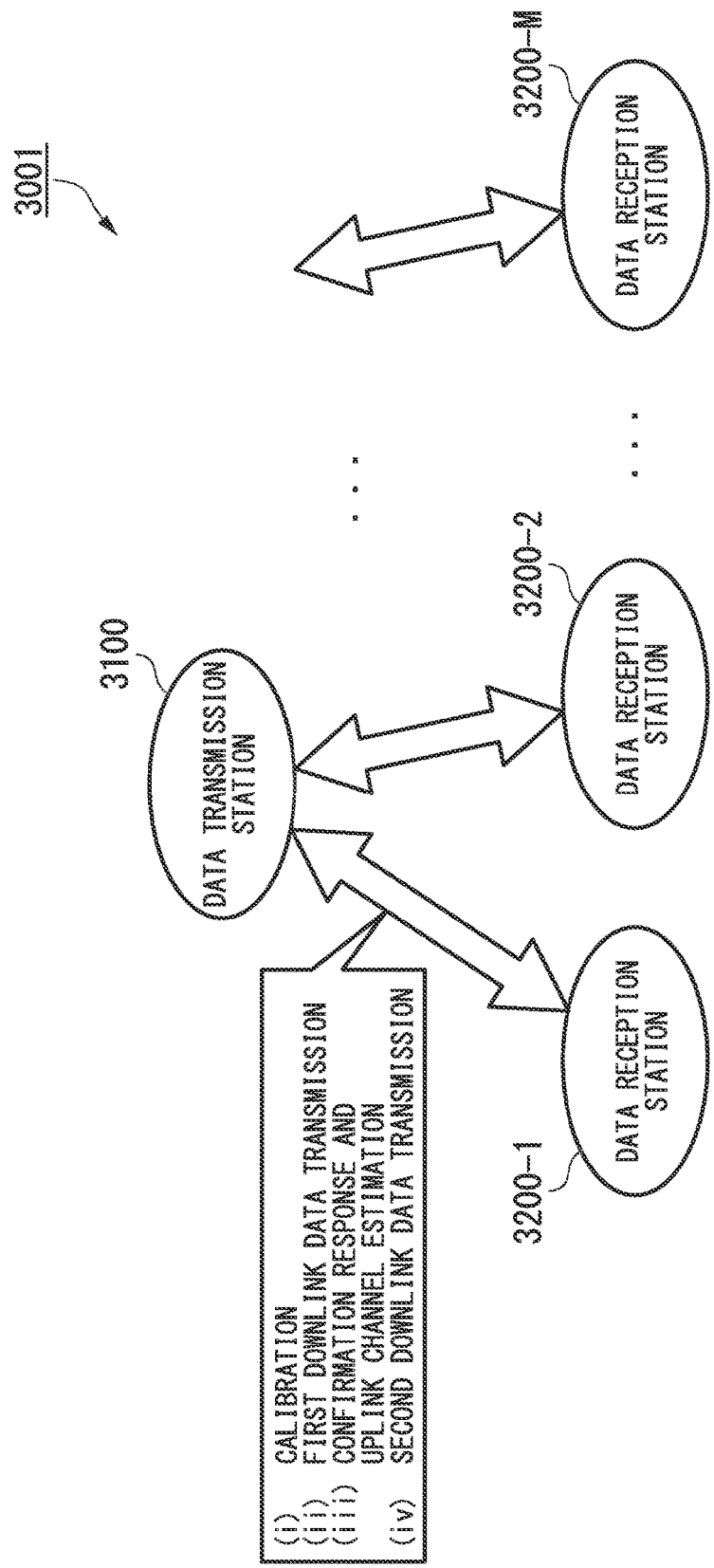
FIG. 22 is a diagram illustrating a configuration example of a wireless communication system based on MU-MIMO in an eleventh embodiment of the present invention.

The eleventh embodiment of the present invention will be described in detail with reference to the drawings. FIG. 22 is a diagram illustrating a configuration example of a wireless communication system 3001 based on MU-MIMO in the present embodiment. The wireless communication system 3001 includes a data transmission station 3100 (base station apparatus) and data reception stations 3200-1 to 3200-M (M is an integer greater than or equal to 2) (terminal station apparatuses).

Hereinafter, descriptions that apply to all the data reception stations 3200-1 to 3200-M will be denoted as "data reception station(s) 3200" with part of the reference signs omitted. Hereinafter, the direction from the data transmission station 3100 to the data reception stations 3200 is referred to as a "downlink". In addition, the direction from the data reception stations 3200 to the data transmission station 3100 is referred to as an "uplink".

The data transmission station 3100 is a wireless communication apparatus. The data transmission station 3100, for example, is an access point (AP) in a wireless local area network (LAN). The data transmission station 3100 generates a radio packet. The generated radio packet includes an identifier for identifying the data transmission station 3100 and identifiers for identifying the data reception stations 3200.

The data transmission station 3100 performs radio packet communication with the data reception stations 3200 through a communication process including (i) a calibration step, (ii) a first downlink data transmission step, (iii) a confirmation response and uplink channel estimation step, and (iv) a second downlink data transmission step. The data transmission station 3100 performs the radio packet communication with the data reception stations 3200 using the same frequency channels based on a carrier sense multiple access/collision avoidance (CSMA/CA) scheme.

The data reception stations 3200) (STA: Station) perform the radio packet communication with the data transmission station 3100. The data reception stations 3200 are apparatuses serving as destinations of the radio packet generated by the data transmission station 3100. The data reception stations 3200, for example, are computers or portable information electronic devices.

Next, a configuration example of the data transmission station 3100 will be described.

Figure 23:
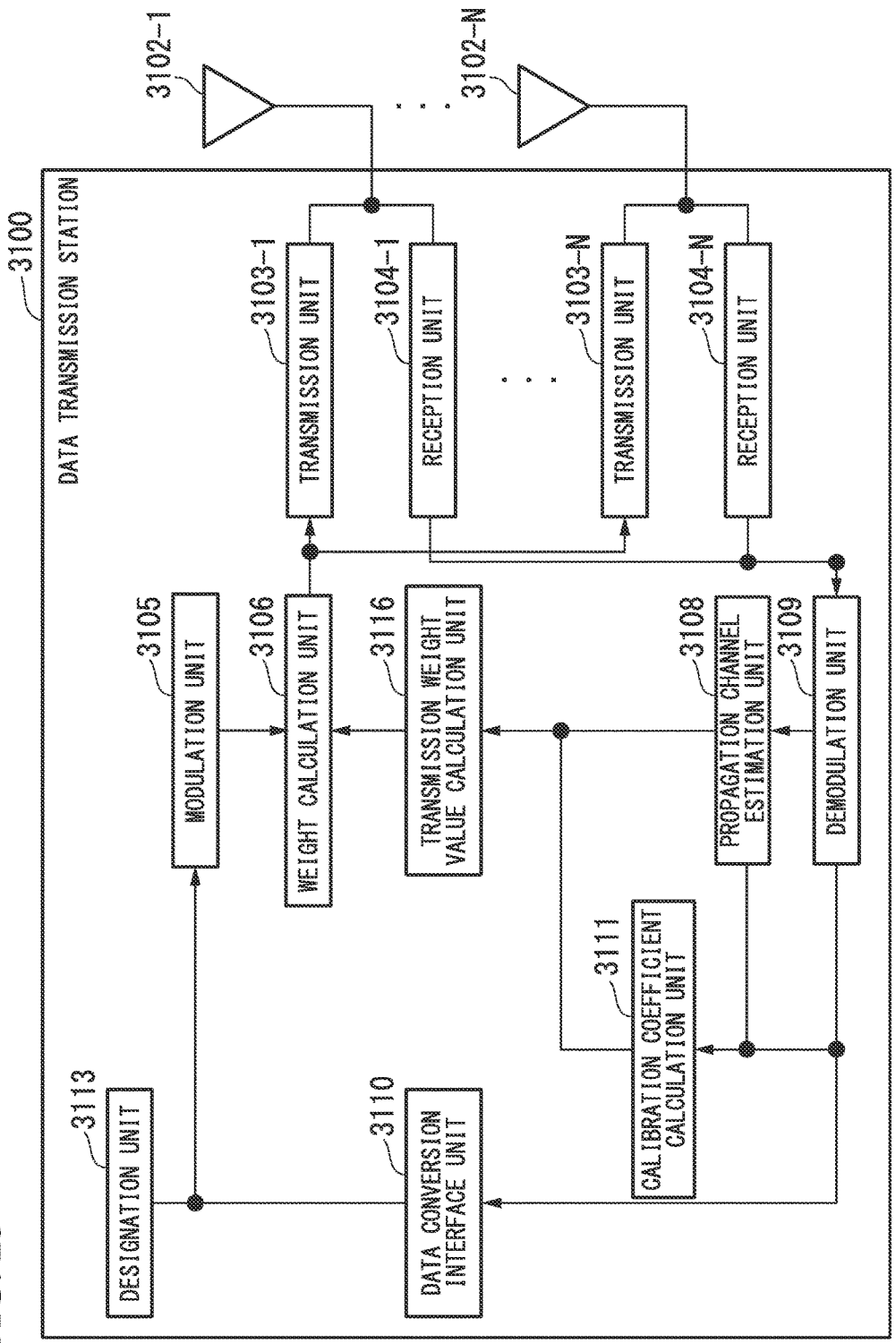
FIG. 23 is a diagram illustrating a configuration example of a data transmission station in the eleventh embodiment of the present invention.

FIG. 23 is a diagram illustrating the configuration example of the data transmission station 3100 in the present embodiment. The data transmission station 3100 includes antennas 3102, transmission units 3103, reception units 3104, a modulation unit 3105, a weight calculation unit 3106, a propagation channel estimation unit 3108, a demodulation unit 3109, a data conversion interface unit 3110, a calibration coefficient calculation unit 3111, a designation unit 3113, and a transmission weight value calculation unit 3116.

The data transmission station 3100 includes antennas 3102-1 to 3102-N(N is an integer greater than or equal to 2). Hereinafter, descriptions that apply to all the antennas 3102-1 to 3102-N will be denoted as "antenna(s) 3102" with part of the reference signs omitted.

The data transmission station 3100 includes the transmission unit 3103 for each antenna 3102. That is, the data transmission station 3100 includes transmission units 3103-1 to 3103-N. Hereinafter, descriptions that apply to all the transmission units 3103-1 to 3103-N will be denoted as "transmission unit(s) 3103" with part of the reference signs omitted.

The data transmission station 3100 includes the reception unit 3104 (acquisition unit) for each antenna 3102. That is, the data transmission station 3100 includes reception units 3104-1 to 3104-N. Hereinafter, descriptions that apply to all the reception units 3104-1 to 3104-N will be denoted as "reception unit(s) 3104" with part of the reference signs omitted.

The antennas 3102 transmit and receive signals indicating radio packets to and from the data reception stations 3200. Hereinafter, the transmission of the data transmission station 3100 via the antennas 3102 is referred to as "downlink transmission". Hereinafter, the reception of the data transmission station 3100 via the antennas 3102 is referred to as "uplink reception".

The reception unit 3104-$n$ ($n$ is any integer of 1 to N) receives a signal indicating a radio packet via the antenna 3102-$n$. The reception unit 3104-$n$ converts a frequency of the uplink-received signal indicating the radio packet into a predetermined frequency. In addition, the reception unit 3104-$n$ performs adjustment or the like of receive power on the uplink-received signal indicating the radio packet. The reception unit 3104-$n$ outputs the uplink-received signal indicating the radio packet to the demodulation unit 3109.

The uplink-received signal indicating the radio packet may include propagation channel information feedback (CSI-FB). In addition, the uplink-received signal indicating the radio packet may include a known signal for dealing with estimation of propagation channel information. The known signal, for example, may be included in a training preamble of a frame of a packet including downlink propagation channel information (for example, CSI-FB). In addition, the uplink-received signal indicating the radio packet may include a predetermined confirmation signal (BA). The known signal, for example, may be included in a training preamble of a frame of a packet including the predetermined confirmation signal (BA).

The demodulation unit 3109 (acquisition unit) acquires the uplink-received signals indicating the radio packet from the reception units 3104. The demodulation unit 3109 performs a demodulation process on the uplink-received signals indicating the radio packet. A data portion of the uplink-received signals indicating the radio packet may include downlink propagation channel information (for example, CSI-FB) from the data transmission station 3100 to one of the data reception stations 3200. The demodulation unit 3109 outputs a demodulated signal indicating the radio packet to the propagation channel estimation unit 3108, the calibration coefficient calculation unit 3111, and the data conversion interface unit 3110.

The data conversion interface unit 3110 acquires the demodulated signal indicating the radio packet from the demodulation unit 3109. The data conversion interface unit 3110 is an interface located in a boundary between a physical layer and a medium access control layer. The data conversion interface unit 3110 converts the demodulated radio packet into a data packet of a predetermined format and transmits a signal indicating the converted data packet to an external network (not illustrated).

In addition, the data conversion interface unit 3110 receives a signal indicating a data packet of a predetermined format from the external network. The data conversion interface unit 3110 converts the signal indicating the data packet received from the external network into a predetermined data signal and outputs the converted data signal to the modulation unit 3105.

The propagation channel estimation unit 3108 acquires the uplink-received signal indicating the radio packet from the demodulation unit 3109. A data portion of the uplink-received signal indicating the radio packet may include the downlink propagation channel information (for example, CSI-FB) from the data transmission station 3100 to one of the data reception stations 3200. When the signal indicating the radio packet including the downlink propagation channel information is acquired, the propagation channel estimation unit 3108 estimates uplink propagation channel information based on a training preamble portion of a packet in which the downlink propagation channel information is included in the data portion.

In addition, the data portion of the uplink-received signals indicating the radio packet may include a known signal (for example, NDP). The propagation channel estimation unit 3108 compares the uplink-received known signal with a predetermined signal for estimation. The propagation channel estimation unit 3108 estimates the uplink propagation channel information based on a compared result. The propagation channel estimation unit 3108 outputs the downlink propagation channel information and the uplink propagation channel information to the calibration coefficient calculation unit 3111 and the transmission weight value calculation unit 3116.

The designation unit 3113 generates information (hereinafter referred to as "format designation information") which designates a format of transmission and reception for the data reception stations 3200.

The format designation information, for example, includes information for designating the transmission of a known signal for dealing with estimation of propagation channel information corresponding to a predetermined necessary band. The format designation information, for example, includes information for designating an antenna 3202 (to be described below) so that the known signal is transmitted using the same antenna 3202 as that at the time of reception. This known signal is a training signal for dealing with estimation of propagation channel information corresponding to a plurality of antennas 3202.

The format designation information, for example, includes information for designating an antenna 3202 used in transmission and reception so that the antenna 3202 to be commonly used in transmission and reception is selected when calibration coefficients are calculated. The format designation information, for example, includes information for designating a format of a known signal so that a response of uplink propagation channel information corresponding to a plurality of antennas 3202 for use in transmission and reception can be estimated. This known signal, for example, is included in a preamble portion of a packet including propagation channel information feedback (CSI-FB: Channel State Information-Feedback).

The format designation information, for example, includes information for designating an operation of transmission so that the data reception stations 3200 transmit the estimated downlink propagation channel information without decomposing the information. The format designation information, for example, includes information for designating an operation of transmission so that a packet including the downlink propagation channel information is transmitted for each antenna 3202. The format designation information, for example, includes information for designating the operation of the transmission so that a plurality of known signals for improving estimation of the uplink propagation channel information are transmitted.

The designation unit 3113 outputs the format designation information to the modulation unit 3105. The modulation unit 3105 modulates the format designation information and generates a signal including the modulated format designation information. The signal including the format designation information modulated by the modulation unit 3105 is transmitted from the antennas 3102 to the data reception stations 3200.

The calibration coefficient calculation unit 3111 acquires the downlink propagation channel information from the propagation channel estimation unit 3108. In addition, the calibration coefficient calculation unit 3111 acquires the uplink propagation channel information from one of the data reception stations 3200 to the data transmission station 3100 from the propagation channel estimation unit 3108. The calibration coefficient calculation unit 3111 calculates calibration coefficients based on the downlink propagation channel information and the uplink propagation channel information. That is, the calibration coefficient calculation unit 3111 calculates the calibration coefficients based on a ratio of circuit characteristics of a transmission end and circuit characteristics of a reception end in the data transmission station 3100. The calibration coefficient calculation unit 3111 outputs information indicating the calibration coefficients to the transmission weight value calculation unit 3116.

The transmission weight value calculation unit 3116 acquires the uplink propagation channel information from the propagation channel estimation unit 3108. The transmission weight value calculation unit 3116 acquires the information indicating the calibration coefficients from the calibration coefficient calculation unit 3111. The transmission weight value calculation unit 3116 calculates transmission weight values (transmission weights) based on the uplink propagation channel information and the calibration coefficients. The transmission weight value calculation unit 3116 outputs information indicating the transmission weight values to the weight calculation unit 3106.

The transmission weight value calculation unit 3116 calculates the transmission weight values based on a method using a linear calculation such as a zero forcing (ZF) method or a minimum mean squared error (MMSE) method. In addition, the transmission weight value calculation unit 3116 may calculate the transmission weight values based on a method using a non-linear calculation such as a Tomlinson Harashima precoding (THP) method or a vector perturbation (VP) method. It is to be noted that a method for calculating the transmission weight values may be any method, and is not limited to a specific method.

The modulation unit 3105 acquires the converted data signal from the data conversion interface unit 3110. The modulation unit 3105 modulates the converted data signal into a signal indicating a radio packet. The modulation unit 3105 outputs the modulated signal indicating the radio packet to the weight calculation unit 3106.

The weight calculation unit 3106 acquires the modulated signal indicating the radio packet from the modulation unit 3105. The weight calculation unit 3106 acquires the information indicating the transmission weight values from the transmission weight value calculation unit 3116. The weight calculation unit 3106 generates a signal indicating a radio packet to be downlink-transmitted by multiplying (weight-combining) the modulated signal indicating the radio packet by the transmission weight values. The signal indicating the radio packet to be downlink-transmitted is a signal used for transmit beamforming. The weight calculation unit 3106 outputs the signal indicating the radio packet to be downlink-transmitted to the transmission units 3103.

The transmission units 3103 acquire the signal indicating the radio packet to be downlink-transmitted from the weight calculation unit 3106. The transmission units 3103 convert a frequency of the signal indicating the radio packet to be downlink-transmitted into a predetermined frequency defined in the wireless communication system 3001). The transmission unit 3103-*n* (n is any integer of 1 to N) performs adjustment or the like of transmit power on the signal indicating the radio packet to be downlink-transmitted. The transmission unit 3103-$n$ outputs the signal indicating the radio packet to be downlink-transmitted to the antenna 3102-$n$.

Next, a configuration example of the data reception stations will be described.

Figure 24:
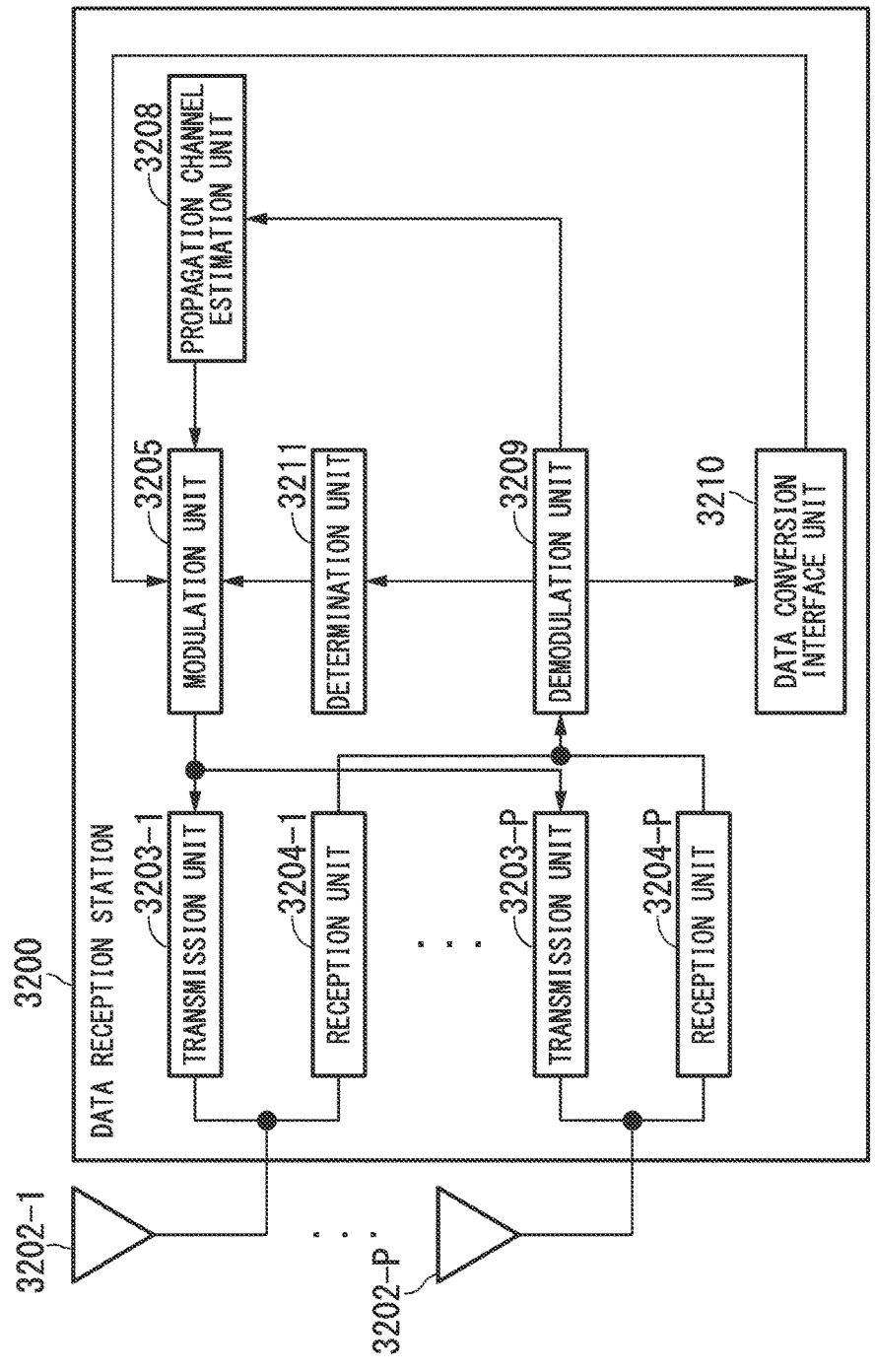
FIG. 24 is a diagram illustrating a configuration example of a data reception station in the eleventh embodiment of the present invention.

FIG. 24 is a diagram illustrating the configuration example of a data reception station 3200 in the present embodiment. The data reception station 3200 includes antennas 3202, transmission units 3203, reception units 3204, a modulation unit 3205, a propagation channel estimation unit 3208, a demodulation unit 3209, a data conversion interface unit 3210, and a determination unit 3211.

The data reception station 3200 includes antennas 3202-1 to 3202-P (P is an integer greater than or equal to 2). Hereinafter, descriptions that apply to all the antennas 3202-1 to 3202-P will be denoted as "antenna(s) 3202" with part of the reference signs omitted.

The data reception station 3200 includes the transmission unit 3203 for each antenna 3202. That is, the data reception station 3200 includes transmission units 3203-1 to 3203-P. Hereinafter, descriptions that apply to all the transmission units 3203-1 to 3203-P will be denoted as "transmission unit(s) 3203" with part of the reference signs omitted.

The data reception station 3200 includes the reception unit 3204 (acquisition unit) for each antenna 3202. That is, the data reception station 3200 includes reception units 3204-1 to 3204-P. Hereinafter, descriptions that apply to all the reception units 3204-1 to 3204-P will be denoted as "reception unit(s) 3204" with part of the reference signs omitted.

The antennas 3202 transmit and receive signals indicating a radio packet to and from the data transmission station 3100. Hereinafter, the transmission via the antennas 3202 of the data reception station 3200 is referred to as "uplink transmission". Hereinafter, the reception via the antennas 3202 of the data reception station 3200 is referred to as "downlink reception".

The reception units 3204 receive the signals indicating the radio packet via the antennas 3202. The reception units 3204 convert a frequency of the downlink-received signals indicating the radio packet into a predetermined frequency. In addition, the reception units 3204 perform adjustment or the like of receive power on the downlink-received signals indicating the radio packet. The reception units 3204 output the downlink-received signals indicating the radio packet to the demodulation unit 3209.

The demodulation unit 3209 acquires the downlink-received signals indicating the radio packet from the reception units 3204. The demodulation unit 3209 performs a demodulation process on the downlink-received signals indicating the radio packet. The demodulation unit 3209 outputs a demodulated signal indicating the radio packet to the propagation channel estimation unit 3208 and the data conversion interface unit 3210.

The data conversion interface unit 3210 acquires the demodulated signal indicating the radio packet from the demodulation unit 3209. The data conversion interface unit 3210 is an interface located in a boundary between a physical layer and a medium access control layer. The data conversion interface unit 3210 converts the demodulated radio packet into a data packet of a predetermined format and transmits a signal indicating the converted data packet to an external network (not illustrated).

In addition, the data conversion interface unit 3210 receives a signal indicating a data packet of a predetermined format from the external network. The data conversion interface unit 3210 may convert the signal indicating the data packet received from the external network into a predetermined data signal and output the converted data signal to the modulation unit 3205.

The propagation channel estimation unit 3208 acquires the demodulated signal indicating the radio packet from the demodulation unit 3209. The propagation channel estimation unit 3208 compares the downlink-received known signal with a predetermined signal for estimation. The propagation channel estimation unit 3208 estimates downlink propagation channel information based on a compared result. The propagation channel estimation unit 3208 outputs propagation channel information feedback (CSI-FB) indicating the downlink propagation channel information to the modulation unit 3205.

The determination unit 3211 acquires format designation information from the demodulation unit 3209. The determination unit 3211 determines a format of transmission and reception by the data reception station 3200 based on the format designation information. The determination unit 3211 causes a known signal for dealing with estimation of propagation channel information corresponding to a predetermined necessary band to be transmitted from the antennas 3202 based on the format designation information. The determination unit 3211 selects an antenna 3202 for use in transmission so that the known signal is transmitted using the same antenna 3202 as that at the time of reception based on the format designation information.

The determination unit 3211 selects the antenna 3202 to be commonly used in transmission and reception when the calibration coefficients are calculated based on the format designation information. The determination unit 3211 determines a format of the known signal based on the format designation information so that a response of uplink propagation channel information corresponding to a plurality of antennas 2302 for use in transmission and reception can be estimated.

The determination unit 3211 causes a packet including the downlink propagation channel information to be transmitted from the antennas 3202 without decomposing the estimated downlink propagation channel information based on the format designation information. The determination unit 3211 causes the packet including the downlink propagation channel information to be transmitted via each antenna 3202 based on the format designation information. The determination unit 3211 causes a plurality of known signals for improving estimation of the uplink propagation channel information to be transmitted from the antennas 3202 based on the format designation information.

The modulation unit 3205 acquires the propagation channel information feedback (CSI-FB) from the propagation channel estimation unit 3208. The modulation unit 3205 modulates the propagation channel information feedback. The modulation unit 3205 outputs the propagation channel information feedback to the transmission units 3203. The modulation unit 3205 acquires a predetermined confirmation signal (BA) from the data conversion interface unit 3210. The modulation unit 3205 modulates the predetermined confirmation signal. The modulation unit 3205 outputs a signal indicating a radio packet to be uplink-transmitted to the transmission units 3203.

The modulation unit 3205 acquires a data signal from the data conversion interface unit 3210. The modulation unit 3205 modulates the data signal into a signal indicating a radio packet. The modulation unit 3205 outputs the modulated signal indicating the radio packet to the transmission units 3203.

The transmission units 3203 acquire the signal indicating the radio packet to be uplink-transmitted from the modulation unit 3205. The transmission units 3203 convert a frequency of the signal indicating the radio packet to be uplink-transmitted into a predetermined frequency defined in the wireless communication system. The transmission units 3203 perform adjustment or the like of transmit power on the signal indicating the radio packet to be uplink-transmitted. The transmission units 3203 output signals indicating the radio packet to be uplink-transmitted to the antennas 3202.

These signals indicating the radio packet to be uplink-transmitted may include propagation channel information feedback (CSI-FB). In addition, these signals indicating the radio packet to be uplink-transmitted may include a predetermined confirmation signal (BA).

Next, an operation example of the wireless communication system 3001 will be described.

Figure 25:
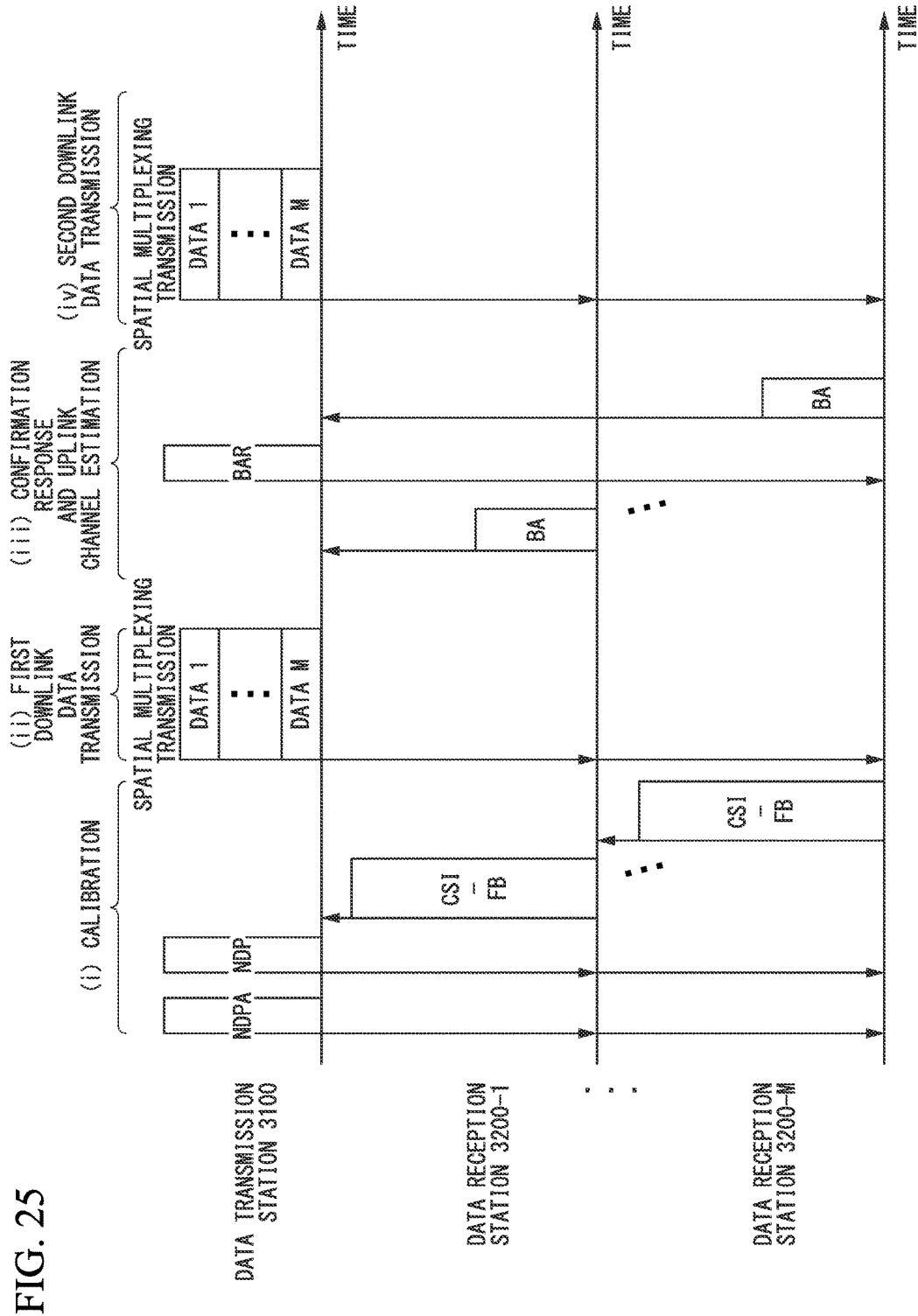
FIG. 25 is a timing chart illustrating an example of an operation procedure of the wireless communication system in the eleventh embodiment of the present invention.

FIG. 25 is a timing chart illustrating the operation example of the wireless communication system in the present embodiment. The data transmission station 3100 generates transmission data to be transmitted to the data reception stations 3200. The data transmission station 3100 performs radio packet communication with the data reception stations 3200 through a communication process including (i) a calibration step, (ii) a first downlink data transmission step, (iii) a confirmation response and uplink channel estimation step, and (iv) a second downlink data transmission step.

(i) Calibration Step

When a data reception station 3200 receives signals via the plurality of antennas 3202, the designation unit 3113 designates a format with which the plurality of antennas 3202 and propagation channel information corresponding to the plurality of antennas 3102 can be estimated as a format of a training preamble of a frame of propagation channel information feedback (CSI-FB).

When the amplitude of circuit characteristics (a circuit response) of the data reception station 3200 cannot be approximated to a constant value, the calibration coefficient calculation unit 3111 cannot calculate calibration coefficients based on only a singular value of singular value decomposition and a right singular vector (V matrix) defined in the IEEE 802.11.ac standard. Thus, the designation unit 3113 generates format designation information so that the data reception station 3200 transmits a response (communication path response) of estimated downlink propagation channel information without decomposition.

The data transmission station 3100 stores the format designation information in a predetermined signal. The predetermined signal, for example, is a null data packet announcement (NDPA). The designation unit 3113, for example, determines the format designation information using a bit within a MAC frame of the NDPA frame. When the IEEE 802.11.ac standard is expanded, the designation unit 3113, for example, generates a designated bit field in a "reserved" portion of a "sounding dialog token field". The data transmission station 3100 transmits the predetermined signal in which the format designation information is stored to the data reception stations 3200.

The data reception station 3200 receives the predetermined signal in which the format designation information is stored. The determination units 3211 select an antenna 3202 based on the format designation information so as to use the common antenna 3202 for transmission and reception.

The data transmission station 3100 transmits a known signal to the data reception stations 3200. The known signal, for example, is a null data packet (NDP).

The data reception station 3200 estimates downlink propagation channel information based on the received known signal. The data reception station 3200 transmits propagation channel information feedback (CSI-FB) in which the downlink propagation channel information is included in a data portion from the selected antenna 3202 to the data transmission station 3100.

The demodulation unit 3109 acquires the downlink propagation channel information (CSI-FB) from the data reception station 3200 via the reception units 3104.

The propagation channel estimation unit 3108 estimates uplink propagation channel information based on a training preamble portion of the propagation channel information feedback.

The calibration coefficient calculation unit 3111 calculates calibration coefficients based the downlink propagation channel information and the estimated uplink propagation channel information.

(ii) First Downlink Data Transmission Step Using Explicit Feedback (EFB)

The transmission weight value calculation unit 3116 acquires the uplink propagation channel information from the propagation channel estimation unit 3108. The transmission weight value calculation unit 3116 acquires information indicating the calibration coefficients from the calibration coefficient calculation unit 3111. The transmission weight value calculation unit 3116 calculates transmission weight values (transmission weights) based on the uplink propagation channel information and the calibration coefficients. The transmission weight value calculation unit 3116 outputs information indicating the transmission weight values to the weight calculation unit 3106.

The weight calculation unit 3106 acquires the modulated signal indicating the radio packet from the modulation unit 3105. The weight calculation unit 3106 acquires the information indicating the transmission weight values from the transmission weight value calculation unit 3116. The weight calculation unit 3106 generates a signal indicating a radio packet to be downlink-transmitted by multiplying (weight-combining) the modulated signal indicating the radio packet by the transmission weight values.

The transmission units 3103 output signals indicating the radio packet to be downlink-transmitted to the antennas 3102. The antennas 3102 perform spatial multiplexing transmission (MIMO transmission) on the signals indicating the radio packet to be downlink-transmitted for the data reception stations 3200.

(iii) Confirmation Response and Uplink Channel Estimation Step

The data reception station 3200 receives the signals indicating the radio packet. The data reception station 3200 determines whether the signals indicating the radio packet have been decoded without error. If the signals indicating the radio packet have been decoded without error, the data reception station 3200 transmits a predetermined confirmation signal (BA) to the data transmission station 3100.

The demodulation unit 3109 acquires the confirmation signal (BA) via the reception units 3104. The propagation channel estimation unit 3108 estimates uplink propagation channel information based on the confirmation signal transmitted by the data reception station 3200.

The data transmission station 3100 transmits a confirmation response request signal (BAR: BA Request) to the data reception station 3200. The confirmation response request signal is a signal for requesting the transmission of a predetermined confirmation signal (BA).

Figure 26:
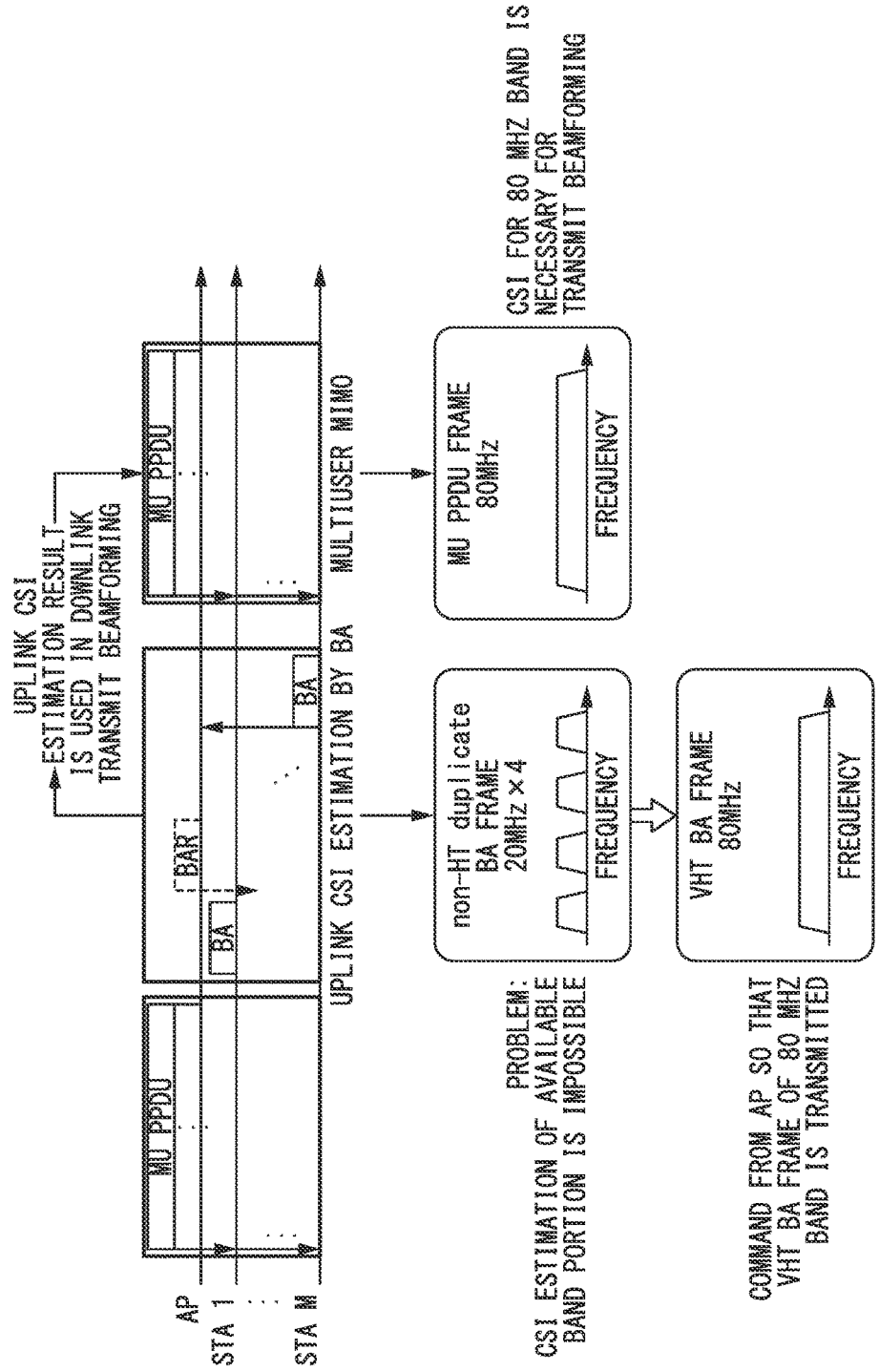
FIG. 26 is a diagram describing the case in which MU-MIMO transmission is performed in an 80 [MHz] band in the eleventh embodiment of the present invention.

FIG. 26 is a diagram describing the case in which MU-MIMO transmission is performed in an 80 [MHz] band in the present embodiment. When the downlink data transmission is performed in a plurality of frequency bands, the data reception stations 3200 transmit confirmation signals in the same plurality of frequency bands. Hereinafter, HT indicates high throughput. VHT indicates very high throughput. MU-PPDU indicates a multiuser physical layer protocol data unit. LTF indicates a long training field. CBF indicates compressed beamforming.

Figure 27:
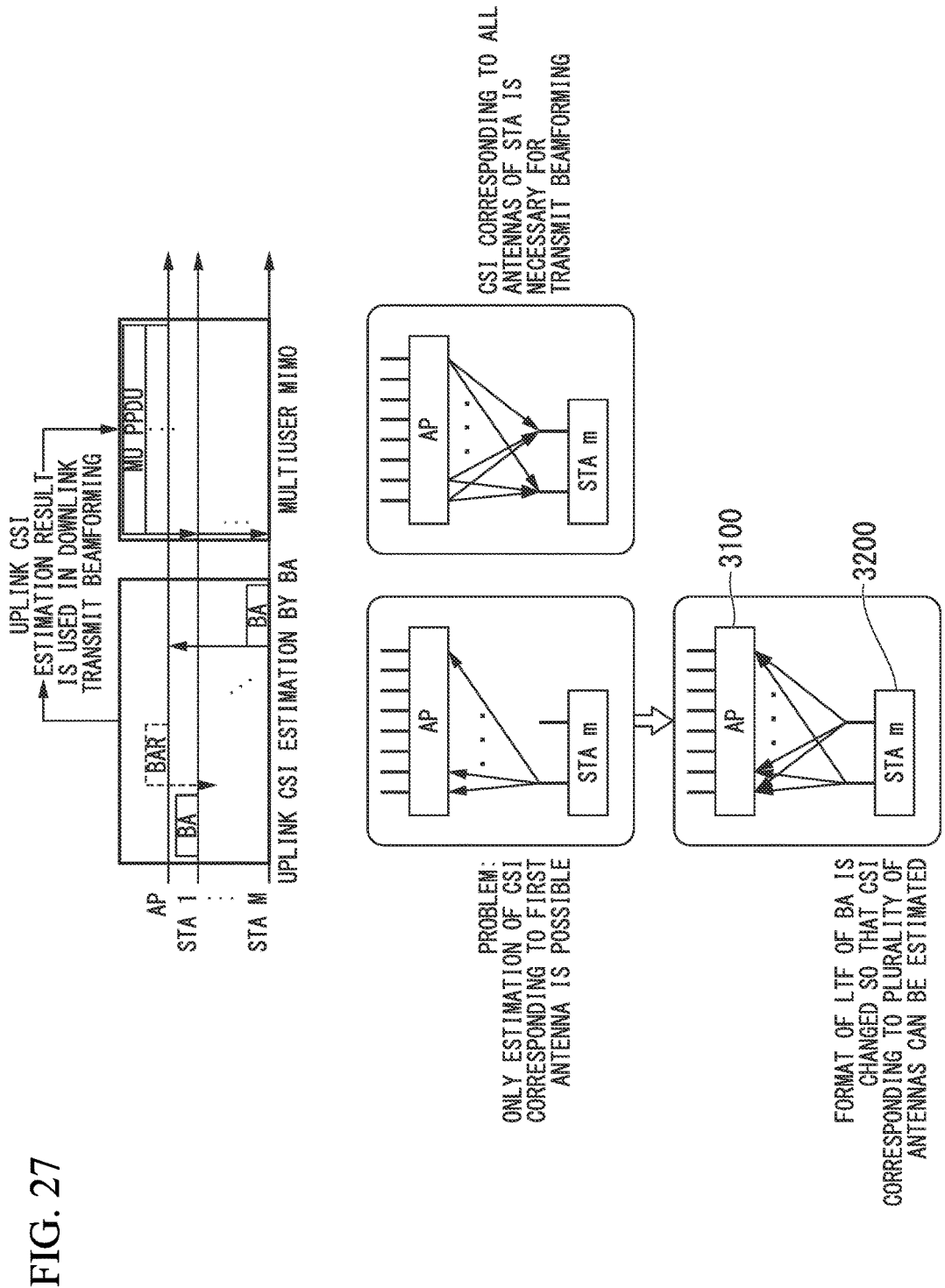
FIG. 27 is a diagram describing reception by the data reception station using a plurality of antennas in the eleventh embodiment of the present invention.

FIG. 27 is a diagram describing the case in which a data reception station 3200 receives using the plurality of antennas 3202 in the present embodiment. When the data reception station 3200 receives via the plurality of antennas 3202, a training preamble of a confirmation signal has a format for dealing with estimation of propagation channel information corresponding to the plurality of antennas 3202. In addition, if transmit power of the data reception station 3200 is less than that of the data transmission station 3100, the data transmission station 3100 designates the format in the data reception station 3200 so that the data reception station 3200 sets the number of training symbols of a confirmation signal (BA) $2^n$ times (n is an integer greater than or equal to 1) and transmits the confirmation signal.

The data transmission station 3100 obtains the improvement of 3n [dB](n is the exponent n shown in the above-described $2^n$ times) by combining results estimated using training symbols. The data transmission station 3100 designates the format using a bit within a control field within a MAC frame of a data frame transmitted in the above step (ii). When the IEEE 802.11.ac standard is expanded, the designation unit 3113, for example, performs switching of VHT=0 and high efficiency wireless LAN (HEW)=1 in a "B1 Reserved" portion of an "HT Control Middle subfield" and creates a new designation bit rate in HEW=1 (see FIG. 8-8a in Non-Patent Document 4).

When the confirmation response request signal is received, the data reception station 3200 transmits a confirmation signal to the data transmission station 3100. The data transmission station 3100 receives the confirmation signal transmitted by the data reception station 3200. The data transmission station 3100 determines whether the data reception station 3200 has decoded the signals indicating the radio packet without error based on the confirmation signal transmitted by the data reception station 3200.

(iv) Second Downlink Data Transmission Step Using Implicit Feedback (IFB) (See FIG. 25)

The transmission weight value calculation unit 3116 acquires the uplink propagation channel information obtained in the above-described (i) from the propagation channel estimation unit 3108. The transmission weight value calculation unit 3116 acquires the information indicating the calibration coefficients obtained in the above-described (i) from the calibration coefficient calculation unit 3111. The transmission weight value calculation unit 3116 calculates transmission weight values (transmission weights) based on the uplink propagation channel information and the calibration coefficients. The transmission weight value calculation unit 3116 outputs information indicating the transmission weight values to the weight calculation unit 3106.

The weight calculation unit 3106 acquires the modulated signal indicating the radio packet from the modulation unit 3105. The weight calculation unit 3106 acquires the information indicating the transmission weight values from the transmission weight value calculation unit 3116. The weight calculation unit 3106 generates a signal indicating a radio packet to be downlink-transmitted by multiplying (weight-combining) the modulated signal indicating the radio packet by the transmission weight values.

The transmission units 3103 output signals indicating the radio packet to be downlink-transmitted to the antennas 3102. The antennas 3102 perform spatial multiplexing transmission (MIMO transmission) on the signals indicating the radio packet to be downlink-transmitted for the data reception stations 3200.

As described above, the data transmission station 3100 (wireless communication apparatus) of the present embodiment includes the designation unit 313 which generates format designation information for designating a format of transmission and reception for the data reception stations 3200; the transmission units 3103 (first transmission unit) which wirelessly transmits the format designation information to the data reception stations 3200; the reception units 3104 and the demodulation unit 3109 (acquisition unit) which acquires a packet; the propagation channel estimation unit 3108 which estimates uplink propagation channel information indicating a propagation channel from a data reception station 3200 to the data transmission station 3100 based on the packet; the calibration coefficient calculation unit 3111 which calculates calibration coefficients based on downlink propagation channel information indicating a propagation channel from the data transmission station 3100 to the data reception stations 3200 and the uplink propagation channel information; the transmission weight value calculation unit 3116 which calculates transmission weight values based on the calibration coefficients and the uplink propagation channel information; and the transmission units 3103 (second transmission unit) which wirelessly transmits a predetermined signal to the data reception station 3200 based on the transmission weight values.

It is to be noted that the transmission units 3103 of the present embodiment include functions of both the first transmission unit and the second transmission unit. The first transmission unit and the second transmission unit may be provided in the data transmission station 3100 separate from the transmission units 3103.

In addition, a wireless communication method in the data transmission station 3100 (wireless communication apparatus) of the present embodiment includes: a step of generating format designation information for designating a format of transmission and reception for the data reception stations 3200; a step of wirelessly transmitting the format designation information to the data reception stations 3200; a step of acquiring a packet; a step of estimating uplink propagation channel information indicating a propagation channel from the data reception station 3200 to the data transmission station 3100 based on the packet; a step of calculating calibration coefficients based on downlink propagation channel information indicating a propagation channel from the data transmission station 3100 to the data reception station 3200 and the uplink propagation channel information; a step of calculating transmission weight values based on the calibration coefficients and the uplink propagation channel information; and a step of wirelessly transmitting a predetermined signal to the data reception station 3200 based on the transmission weight values.

Through this configuration, the designation unit 3113 generates format designation information for designating a format of transmission and reception for the data reception stations 3200. The transmission unit 3103 wirelessly transmits the format designation information to the data reception stations 3200. Thereby, with the data transmission station 3100 and the wireless communication method, implicit feedback beamforming is applicable to an MIMO transmission system.

That is, the data transmission station 3100 designates a format of transmission and reception (antennas, frequency bands, and a format of a training signal to be used) for the data reception stations 3200 and performs communication in the designated format of transmission and reception. Thereby, the data transmission station 3100 (wireless communication apparatus) of the present embodiment can estimate uplink propagation channel information even when the implicit feedback beamforming technology is applied to MIMO transmission.

The designation unit 3113 of the present embodiment performs the designation so that a known signal for dealing with estimation of uplink propagation channel information corresponding to a necessary band is transmitted.

The designation unit 3113 of the present embodiment performs the designation so that a known signal for dealing with estimation of uplink propagation channel information corresponding to the plurality of antennas 3202 is transmitted using the same antennas 3202 as those at the time of reception.

The designation unit 3113 of the present embodiment designates an antenna 3202 to be used in transmission and reception so that the antenna 3202 to be commonly used in the transmission and reception is selected when the calibration coefficients are calculated.

When the data reception station 3200 receives signals via the plurality of antennas 3202, the designation unit 3113 of the present embodiment designates a format with which uplink propagation channel information corresponding to the plurality of antennas 3202 can be estimated as a format of a training preamble of a frame of a packet for providing a notification of downlink propagation channel information.

The designation unit 3113 of the present embodiment designates a transmission operation so that the data reception station 3200 transmits downlink propagation channel information estimated by the data reception station 3200 without decomposing the information.

When the data reception station 3200 receives signals via the plurality of antennas 3202, the designation unit 3113 of the present embodiment designates a transmission operation so that a packet including downlink propagation channel information is transmitted for each antenna 3202.

The designation unit 3113 of the present embodiment designates a transmission operation so that a plurality of known signals (for example, BA) for dealing with estimation of uplink propagation channel information are transmitted.

The reception units 3104 and the demodulation unit 3109 (acquisition unit) of the present embodiment acquire a packet transmitted from the data reception station 3200 in a format of transmission and reception based on the format designation information.

Twelfth Embodiment

Figure 28:
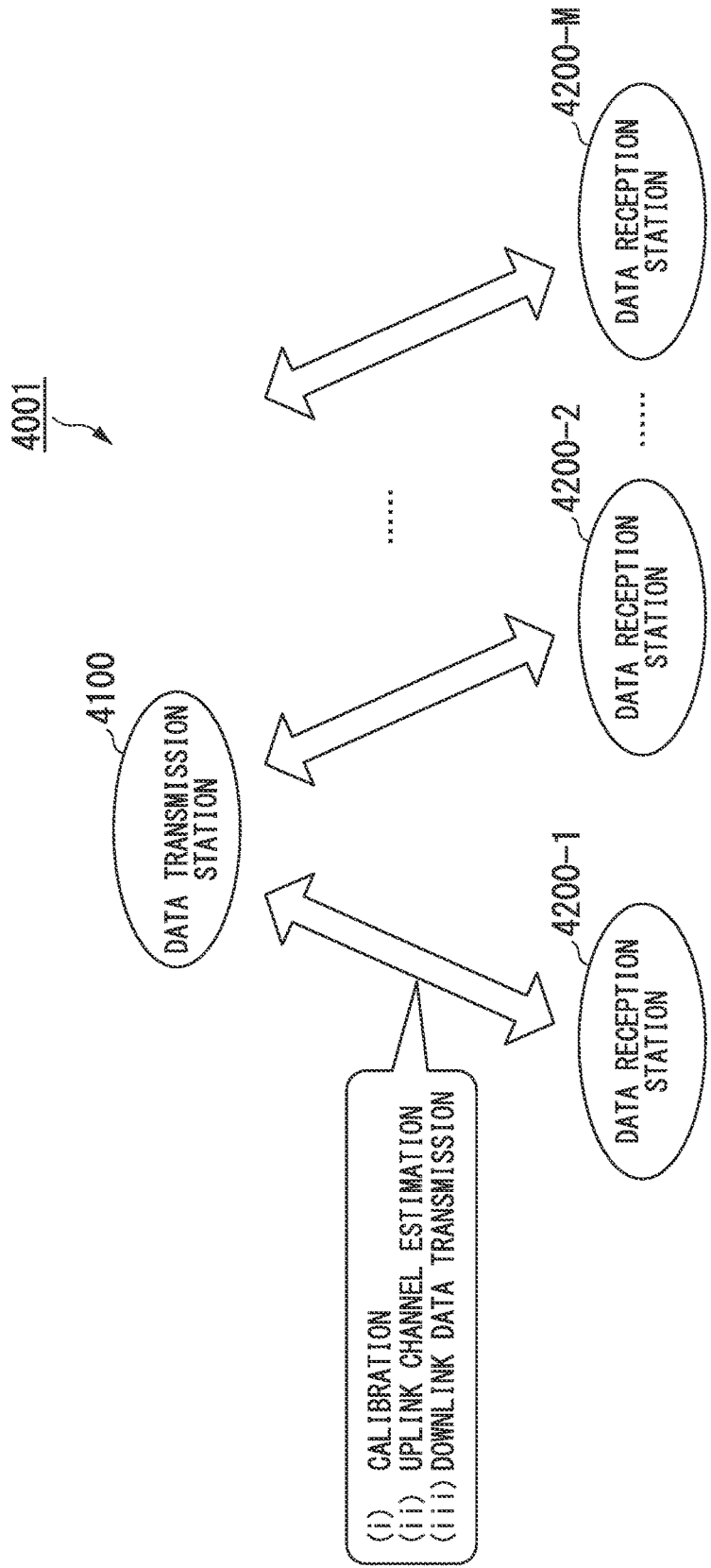
FIG. 28 is a diagram illustrating a configuration example of a wireless communication system based on MU-MIMO in a twelfth embodiment of the present invention.

The twelfth embodiment of the present invention will be described in detail with reference to the drawings. FIG. 28 is a diagram illustrating a configuration example of a wireless communication system 4001 based on MU-MIMO in the present embodiment. The wireless communication system 4001 includes a data transmission station 4100 (base station apparatus) and data reception stations 4200-1 to 4200-M (M is an integer greater than or equal to 2) (terminal station apparatuses).

Hereinafter, descriptions that apply to all the data reception stations 4200-1 to 4200-M will be denoted as "data reception station(s) 4200" with part of the reference signs omitted.

The data transmission station 4100, for example, is an access point (AP) in a wireless local area network (LAN). The data transmission station 4100 generates a radio packet. The generated radio packet includes an identifier for identifying the data transmission station 4100 and identifiers for identifying the data reception stations 4200.

The data transmission station 4100 performs radio packet communication with the data reception stations 4200 through a communication process including (i) a calibration step, (ii) an uplink channel estimation step, and (iii) a downlink data transmission step. The data transmission station 4100a performs the radio packet communication with the data reception stations 4200 using the same frequency channels based on a carrier sense multiple access/collision avoidance (CSMA/CA) scheme.

The data reception stations 4200 (STA) perform the radio packet communication with the data transmission station 4100. The data reception stations 4200 are apparatuses serving as destinations of the radio packet generated by the data transmission station 4100. The data reception stations 4200, for example, are computers or portable information electronic devices.

Next, a configuration example of the data transmission station 4100 (hereinafter referred to as the "data transmission station 4100a") in the twelfth embodiment will be described.

Figure 29:
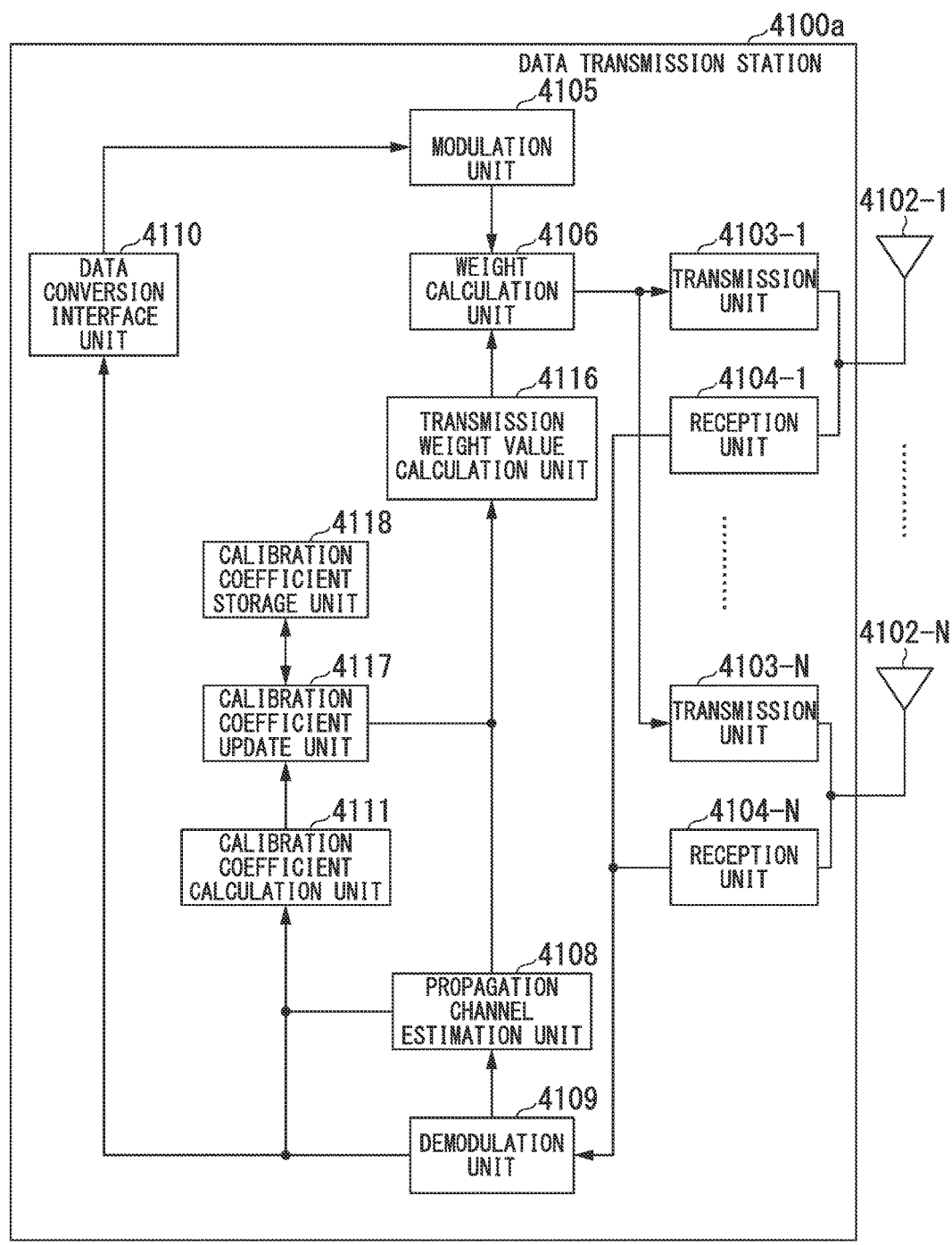
FIG. 29 is a diagram illustrating a configuration example of a data transmission station in the twelfth embodiment of the present invention.

FIG. 29 is a diagram illustrating a configuration example of the data transmission station 4100a in the twelfth embodiment of the present invention. The data transmission station 4100a includes antennas 4102, transmission units 4103, reception units 4104, a modulation unit 4105, a weight calculation unit 4106, a propagation channel estimation unit 4108, a demodulation unit 4109, a data conversion interface unit 4110, a calibration coefficient calculation unit 4111, a calibration coefficient update unit 4117, a calibration coefficient storage unit 4118, and a transmission weight value calculation unit 4116.

The data transmission station 4100a includes antennas 4102-1 to 4102-N (N is the total number of the antennas provided in the data transmission station 4100a). Hereinafter, any antenna among the antennas 4102-1 to 4102-N is denoted as an "antenna 4102-n" (n is any integer of 1 to N). In addition, hereinafter, descriptions that apply to all the antennas 4102-1 to 4102-N will be denoted as "antenna(s) 4102" with part of the reference signs omitted.

The data transmission station 4100a includes the transmission unit 4103 for each antenna 4102. That is, the data transmission station 4100a includes transmission units 4103-1 to 4103-N. Hereinafter, descriptions that apply to all the transmission units 4103-1 to 4103-N will be denoted as "transmission unit(s) 4103" with part of the reference signs omitted.

The data transmission station 4100a includes the reception unit 4104 for each antenna 4102. That is, the data transmission station 4100a includes reception units 4104-1 to 4104-N. Hereinafter, descriptions that apply to all the reception units 4104-1 to 4104-N will be denoted as "reception unit(s) 4104" with part of the reference signs omitted.

The antennas 4102 transmit and receive signals indicating a radio packet to and from data reception stations 4200a (to be described below). Hereinafter, the transmission via the antennas 4102 of the data transmission station 4100a is referred to as "downlink transmission". Hereinafter, the reception via the antennas 4102 of the data transmission station 4100*a* is referred to as "uplink reception".

The reception unit 4104-*n* (n is any integer of 1 to N) receives a signal indicating a radio packet (radio signal) via the antenna 4102-*n*. The reception unit 4104-*n* converts a frequency of the uplink-received signal indicating the radio packet into a predetermined frequency. In addition, the reception unit 4104-*n* performs adjustment or the like of receive power on the uplink-received signal indicating the radio packet. The reception unit 4104-*n* outputs the uplink-received signal indicating the radio packet to the demodulation unit 4109.

The uplink-received signal indicating the radio packet may include propagation channel information feedback (CSI-FB: Channel State Information-Feedback). In addition, the uplink-received signal indicating the radio packet may include a known signal. The known signal, for example, is a null data packet (NDP). In addition, the uplink-received signal indicating the radio packet may include a predetermined confirmation signal (confirmation response signal) (BA: Block Acknowledgement).

The demodulation unit 4109 acquires the uplink-received signals indicating the radio packet from the reception units 4104. The demodulation unit 4109 performs a demodulation process on the uplink-received signals indicating the radio packet. A data portion of the uplink-received signals indicating the radio packet may include downlink propagation channel information (for example, CSI-FB) from the data transmission station 4100*a* to one of the data reception stations 4200)*a*. The demodulation unit 4109 outputs a demodulated signal indicating the radio packet to the propagation channel estimation unit 4108, the calibration coefficient calculation unit 4111, and the data conversion interface unit 4110.

The data conversion interface unit 4110 acquires the demodulated signal indicating the radio packet from the demodulation unit 4109. The data conversion interface unit 4110 is an interface located in a boundary between a physical layer and a medium access control layer. The data conversion interface unit 4110 converts the demodulated radio packet into a data packet of a predetermined format and transmits a signal indicating the converted data packet to an external network (not illustrated).

In addition, the data conversion interface unit 4110 receives a signal indicating a data packet of a predetermined format from the external network. The data conversion interface unit 4110 converts the signal indicating the data packet received from the external network into a predetermined data signal and outputs the converted data signal to the modulation unit 4105.

The propagation channel estimation unit 4108 acquires the uplink-received signals indicating the radio packet from the demodulation unit 4109. A data portion of the uplink-received signals indicating the radio packet may include the downlink propagation channel information (for example, CSI-FB) from the data transmission station 4100*a* to one of the data reception stations 4200*a*. When the signals indicating the radio packet including the downlink propagation channel information are acquired, the propagation channel estimation unit 4108 estimates uplink propagation channel information based on a training preamble portion of a packet in which the downlink propagation channel information is included in the data portion.

In addition, the data portion of the uplink-received signals indicating the radio packet may include a known signal (for example, NDP). The propagation channel estimation unit 4108 compares the uplink-received known signal with a predetermined signal for estimation. The propagation channel estimation unit 4108 estimates the uplink propagation channel information based on a compared result. The propagation channel estimation unit 4108 outputs the downlink propagation channel information and the uplink propagation channel information to the calibration coefficient calculation unit 4111 and the transmission weight value calculation unit 4116.

The calibration coefficient calculation unit 4111 acquires the downlink propagation channel information from the propagation channel estimation unit 4108. In addition, the calibration coefficient calculation unit 4111 acquires the uplink propagation channel information from one of the data reception stations 4200*a* to the data transmission station 4100*a* from the propagation channel estimation unit 4108. The calibration coefficient calculation unit 4111 calculates the last calibration coefficients (hereinafter referred to as "new calibration coefficients") based on the downlink propagation channel information and the uplink propagation channel information. That is, the calibration coefficient calculation unit 4111 calculates the new calibration coefficients based on a ratio of circuit characteristics of a transmission end and circuit characteristics of a reception end in the data transmission station 4100*a*. The calibration coefficient calculation unit 4111 outputs information indicating the new calibration coefficients to the calibration coefficient update unit 4117.

The calibration coefficient update unit 4117 acquires the information indicating the new calibration coefficients from the calibration coefficient calculation unit 4111. The calibration coefficient update unit 4117 acquires information indicating a history (hereinafter referred to as "old calibration coefficients") of the new calibration coefficients from the calibration coefficient storage unit 4118.

The calibration coefficient update unit 4117 calculates calibration coefficients for value calculation based on the information indicating the new calibration coefficients and the information indicating the old calibration coefficient. The calibration coefficient update unit 4117 may calculate the calibration coefficients for value calculation based on the information indicating the new calibration coefficients and the information indicating the old calibration coefficients using any method and is not limited to a specific calculation method. For example, the calibration coefficient update unit 4117 calculates an average value of the new calibration coefficients and the old calibration coefficients as the calibration coefficients for value calculation. In addition, for example, the calibration coefficient update unit 4117 may calculate an average value in accordance with weights as the calibration coefficients for value calculation by multiplying the new calibration coefficients by the old calibration coefficients in accordance with the weights.

The calibration coefficient update unit 4117 outputs information indicating the calibration coefficients for value calculation to the transmission weight value calculation unit 4116. In addition, the calibration coefficient update unit 4117 causes the information indicating the old calibration coefficients to be stored in the calibration coefficient storage unit 4118 in association with the time at which the old calibration coefficients were calculated.

The calibration coefficient storage unit 4118 stores the information indicating the old calibration coefficients in association with the time at which the old calibration coefficients were calculated.

The transmission weight value calculation unit 4116 acquires the uplink propagation channel information from the propagation channel estimation unit 4108. The transmission weight value calculation unit 4116 acquires the information indicating the calibration coefficients for value calculation from the calibration coefficient update unit 4117. The transmission weight value calculation unit 4116 calculates transmission weight values (transmission weights) based on the uplink propagation channel information and the calibration coefficients for value calculation. The transmission weight value calculation unit 4116 outputs information indicating the transmission weight values to the weight calculation unit 4106.

The transmission weight value calculation unit 4116 calculates the transmission weight values based on a method in accordance with a linear calculation such as a zero forcing (ZF) method or a minimum mean squared error (MMSE) method. In addition, the transmission weight value calculation unit 4116 may calculate the transmission weight values based on a method in accordance with a non-linear calculation such as a Tomlinson Harashima precoding (THP) method or a vector perturbation (VP) method. It is to be noted that a method for calculating the transmission weight values may be any method, and is not limited to a specific method.

The modulation unit 4105 acquires the converted data signal from the data conversion interface unit 4110. The modulation unit 4105 modulates the converted data signal into a signal indicating a radio packet. The modulation unit 4105 outputs the modulated signal indicating the radio packet to the weight calculation unit 4106.

The weight calculation unit 4106 acquires the modulated signal indicating the radio packet from the modulation unit 4105. The weight calculation unit 4106 acquires the information indicating the transmission weight values from the transmission weight value calculation unit 4116. The weight calculation unit 4106 generates a signal indicating a radio packet to be downlink-transmitted by multiplying (weight-combining) the modulated signal indicating the radio packet by the transmission weight values. The signal indicating the radio packet to be downlink-transmitted is a signal used for transmit beamforming. The weight calculation unit 4106 outputs the signal indicating the radio packet to be downlink-transmitted to the transmission units 4103.

The transmission units 4103 acquire the signal indicating the radio packet to be downlink-transmitted from the weight calculation unit 4106. The transmission units 4103 convert a frequency of the signal indicating the radio packet to be downlink-transmitted into a predetermined frequency defined in the wireless communication system 4001. In addition, the transmission unit 4103-*n* (n is any integer of 1 to N) performs adjustment or the like of transmit power on the signal indicating the radio packet to be downlink-transmitted. The transmission unit 4103-*n* outputs the signal indicating the radio packet to be downlink-transmitted to the antenna 4102-*n*.

Next, a configuration example of a data reception station 4200 (hereinafter referred to as a "data reception station 4200*a*") in the twelfth embodiment will be described.

Figure 30:
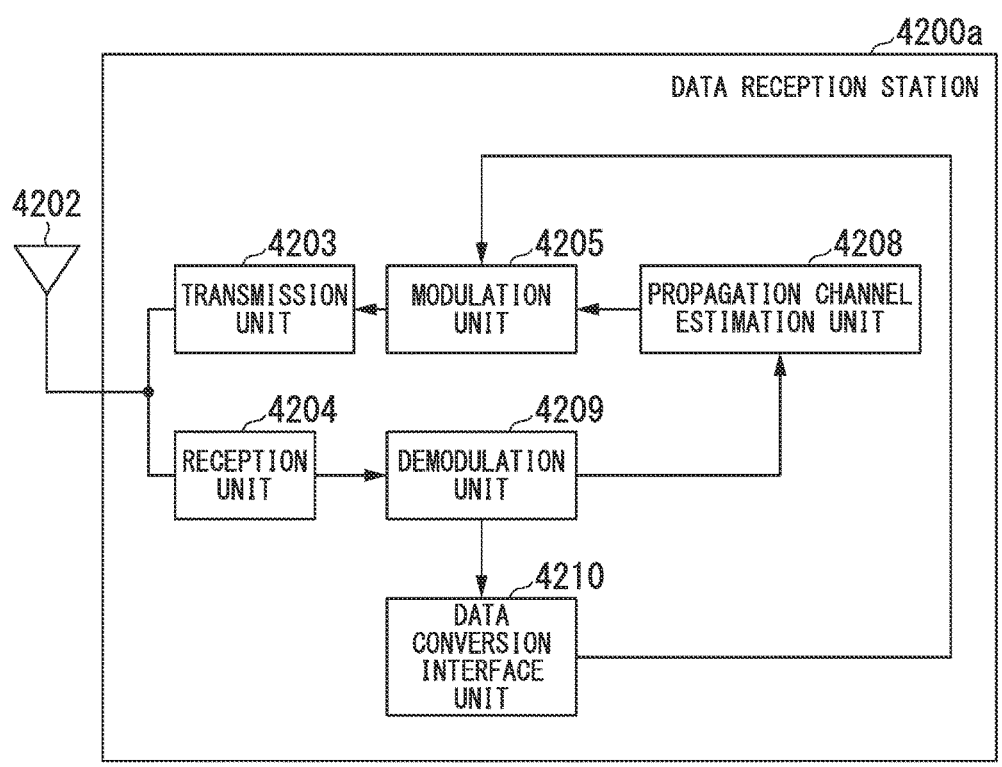
FIG. 30 is a diagram illustrating a configuration example of a data reception station in the twelfth embodiment of the present invention.

FIG. 30 is a diagram illustrating a configuration example of the data reception station 4200*a* in the twelfth embodiment of the present invention. The data reception station 4200*a* includes an antenna 4202, a transmission unit 4203, a reception unit 4204, a modulation unit 4205, a propagation channel estimation unit 4208, a demodulation unit 4209, and a data conversion interface unit 4210.

The antenna 4202 transmits and receives a signal indicating a radio packet to and from the data transmission station 4100*a*. Hereinafter, the transmission via the antenna 4202 of the data reception station 4200*a* is referred to as "uplink transmission". Hereinafter, the reception via the antenna 4202 of the data reception station 4200*a* is referred to as "downlink reception".

The reception unit 4204 receives the signal (radio signal) indicating the radio packet via the antenna 4202. The reception unit 4204 converts a frequency of the downlink-received signal indicating the radio packet into a predetermined frequency. In addition, the reception unit 4204 performs adjustment or the like of receive power on the downlink-received signal indicating the radio packet. The reception unit 4204 outputs the downlink-received signal indicating the radio packet to the demodulation unit 4209.

The demodulation unit 4209 acquires the downlink-received signal indicating the radio packet from the reception unit 4204. The demodulation unit 4209 performs a demodulation process on the downlink-received signal indicating the radio packet. The demodulation unit 4209 outputs the demodulated signal indicating the radio packet to the propagation channel estimation unit 4208 and the data conversion interface unit 4210.

The data conversion interface unit 4210 acquires the demodulated signal indicating the radio packet from the demodulation unit 4209. The data conversion interface unit 4210 is an interface located in a boundary between a physical layer and a medium access control layer. The data conversion interface unit 4210 converts the demodulated radio packet into a data packet of a predetermined format and transmits a signal indicating the converted data packet to an external network (not illustrated).

In addition, the data conversion interface unit 4210 receives a signal indicating a data packet of a predetermined format from the external network. The data conversion interface unit 4210 may convert the signal indicating the data packet received from the external network into a predetermined data signal and output the converted data signal to the modulation unit 4205.

The propagation channel estimation unit 4208 acquires the demodulated signal indicating the radio packet from the demodulation unit 4209. The propagation channel estimation unit 4208 compares a downlink-received known signal with a predetermined signal for estimation. The propagation channel estimation unit 4208 estimates downlink propagation channel information based on a compared result. The propagation channel estimation unit 4208 outputs propagation channel information feedback (CSI-FB) indicating the downlink propagation channel information to the modulation unit 4205.

The modulation unit 4205 acquires the propagation channel information feedback (CSI-FB) from the propagation channel estimation unit 4208. The modulation unit 4205 modulates the propagation channel information feedback. The modulation unit 4205 outputs the propagation channel information feedback to the transmission unit 4203. The modulation unit 4205 acquires a known signal (NDP) from the data conversion interface unit 4210. The modulation unit 4205 modulates the known signal. The modulation unit 4205 acquires a predetermined confirmation signal (BA) from the data conversion interface unit 4210. The modulation unit 4205 modulates the predetermined confirmation signal. The modulation unit 4205 outputs a signal indicating a radio packet to be uplink-transmitted to the transmission unit 4203.

The modulation unit 4205 acquires a data signal from the data conversion interface unit 4210. The modulation unit 4105 modulates the data signal into a signal indicating a radio packet. The modulation unit 4205 outputs the modulated signal indicating the radio packet to the transmission unit 4203.

The transmission unit 4203 acquires the signal indicating the radio packet to be uplink-transmitted from the modulation unit 4205. The transmission unit 4203 converts a frequency of the signal indicating the radio packet to be uplink-transmitted into a predetermined frequency defined in the wireless communication system. The transmission unit 4203 performs adjustment or the like of transmit power on the signal indicating the radio packet to be uplink-transmitted. The transmission unit 4203 outputs the signal indicating the radio packet to be uplink-transmitted to the antenna 4202.

This signal indicating the radio packet to be uplink-transmitted may include propagation channel information feedback (CSI-FB). In addition, this signal indicating the radio packet to be uplink-transmitted may include a known signal. In addition, this signal indicating the radio packet to be uplink-transmitted may include a predetermined confirmation signal (BA).

Next, an operation example of the wireless communication system 4001 will be described.

Figure 31:
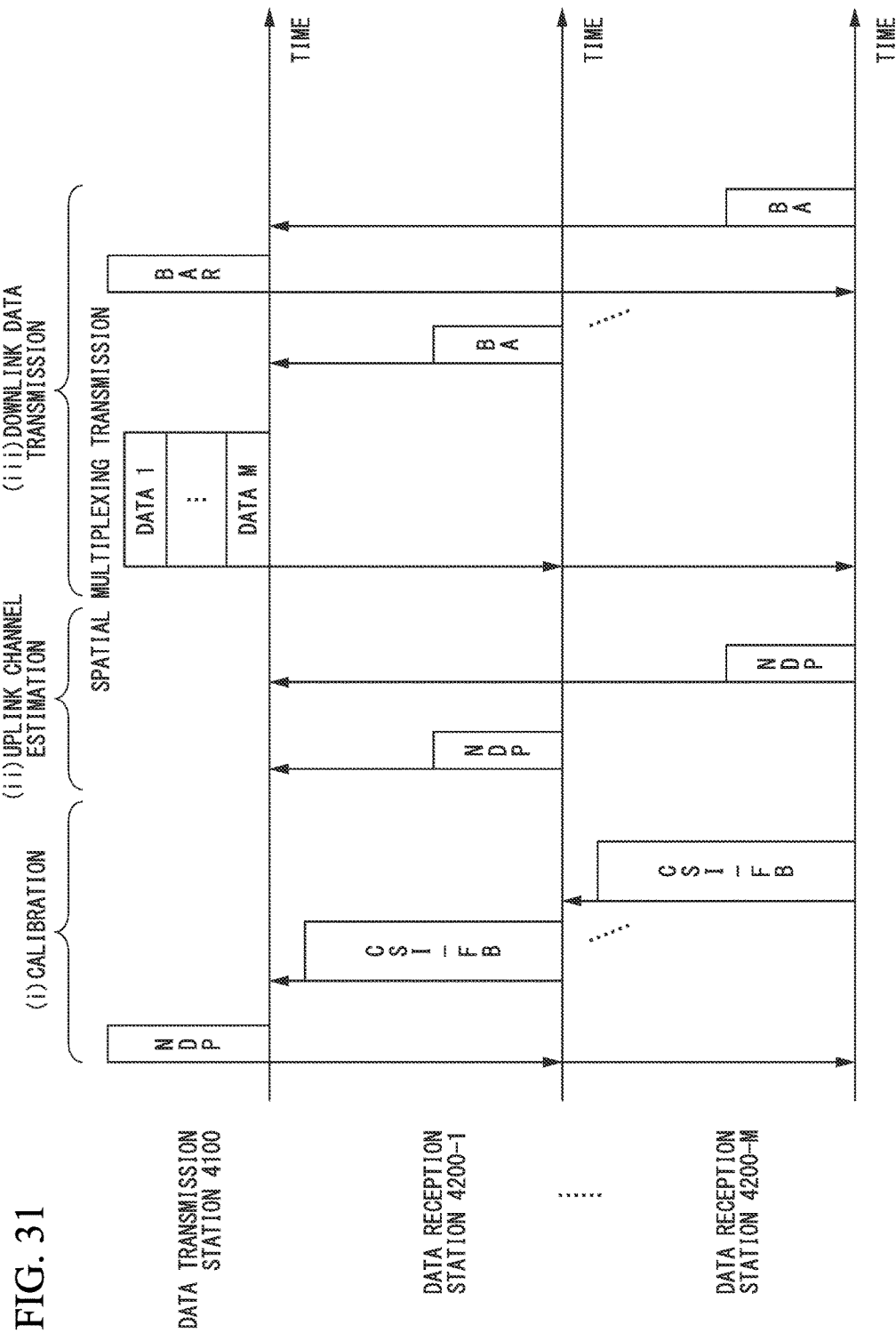
FIG. 31 is a timing chart illustrating an example of an operation procedure of the wireless communication system in the twelfth embodiment of the present invention.

FIG. 31 is a timing chart illustrating the operation example of the wireless communication system in the present embodiment. The data transmission station 4100a generates transmission data to be transmitted to the data reception stations 4200a. The data transmission station 4100a performs radio packet communication with the data reception stations 4200a through a communication process including (i) a calibration step, (ii) an uplink channel estimation step, and (iii) a downlink data transmission step.

(i) Calibration Step

The data transmission station 4100a transmits a known signal (NDP) to the data reception stations 4200a. The data reception stations 4200a receive the known signal. The data reception stations 4200a estimate downlink propagation channel information based on the received known signal. The data reception stations 4200a transmit propagation channel information feedback (CSI-FB) in which the downlink propagation channel information is included in a data portion to the data transmission station 4100a.

The demodulation unit 4109 acquires the downlink propagation channel information (for example, CSI-FB) front the data reception stations 4200a via the reception units 4104.

The propagation channel estimation unit. 4108 estimates uplink propagation channel information based on a training preamble portion of the propagation channel information feed back.

The calibration coefficient calculation unit 4111 calculates new calibration coefficients C[k] based on the downlink propagation channel information and the estimated uplink propagation channel information. The downlink propagation channel information $H_D[k]$ is expressed by Formula (36).

[Formula 36]

$$H_D[k] = G_{RS}[k]H[k]G_{TA}[k] = \begin{bmatrix} h_{D,1,1}[k] & h_{D,1,2}[k] & h_{D,1,N}[k] \\ h_{D,2,1}[k] & & \\ & & \ddots \\ h_{D,M,1}[k] & & h_{D,M,N}[k] \end{bmatrix} \quad (36)$$

Here, k denotes a subcarrier number. N denotes the number of the antennas 4102 of the data transmission station. 4100a. M denotes the number of the data reception stations 4200a. H[k] denotes a response (communication path response) of propagation channel information in the air. $G_{RS}[k]$ denotes circuit characteristics of the reception units 4204 of the data reception stations 4200a. $G_{TA}[k]$ denotes circuit characteristics of the transmission units 4103 of the data transmission station 4100a.

The response H[k] of the propagation channel information in the air, the circuit characteristics $G_{RS}[k]$ of the reception units 4204 of the data reception stations 4200a, and the circuit characteristics $G_{TA}[k]$ of the transmission units 4103 of the data transmission station 4100a are expressed by Formulas (37).

[Formula 37]

$$\begin{aligned} H[k] &= \begin{bmatrix} h_{1,1}[k] & h_{1,2}[k] & h_{1,N}[k] \\ h_{2,1}[k] & & \\ & & \ddots \\ h_{M,1}[k] & & h_{M,N}[k] \end{bmatrix} \\ G_{RS}[k] &= \begin{bmatrix} g_{RS,1}[k] & 0 & 0 \\ 0 & \ddots & 0 \\ 0 & 0 & g_{RS,M}[k] \end{bmatrix} \\ G_{TA}[k] &= \begin{bmatrix} g_{TA,1}[k] & 0 & 0 \\ 0 & \ddots & 0 \\ 0 & 0 & g_{TA,N}[k] \end{bmatrix} \end{aligned} \quad (37)$$

In addition, uplink propagation channel information $H_U[k]$ is expressed by Formula (38).

[Formula 38]

$$H_U[k] = G_{TS}[k]H[k]G_{RA}[k] = \begin{bmatrix} h_{U,1,1}[k] & h_{U,1,2}[k] & h_{U,1,N}[k] \\ h_{U,2,1}[k] & & \\ & & \ddots \\ h_{U,M,1}[k] & & h_{U,M,N}[k] \end{bmatrix} \quad (38)$$

Here, $G_{RS}[k]$ denotes circuit characteristics of the transmission units 4203 of the data reception stations 4200a. $G_{RA}[k]$ denotes circuit characteristics of the reception units 4104 of the data transmission station 4100a.

The circuit characteristics $G_{RS}[k]$ of the transmission units 4203 of the data reception stations 4200a and the circuit characteristics $G_{RA}[k]$ of the reception units 4104 of the data transmission station 4100a are expressed by Formulas (39).

[Formula 39]

$$\begin{aligned} G_{TS}[k] &= \begin{bmatrix} g_{TS,1}[k] & 0 & 0 \\ 0 & \ddots & 0 \\ 0 & 0 & g_{TS,M}[k] \end{bmatrix} \\ G_{RA}[k] &= \begin{bmatrix} g_{RA,1}[k] & 0 & 0 \\ 0 & \ddots & 0 \\ 0 & 0 & g_{RA,N}[k] \end{bmatrix} \end{aligned} \quad (39)$$

The downlink propagation channel information and the uplink propagation channel information are used in the calculation of the new calibration coefficients C[k] shown in Formula (40),

[Formula 40]

$$C[k] = \begin{bmatrix} c_1[k] & 0 & 0 & 0 \\ 0 & c_2[k] & 0 & 0 \\ 0 & 0 & \ddots & 0 \\ 0 & 0 & 0 & c_N[k] \end{bmatrix} \quad (40)$$

The calibration coefficient update unit 4117 calculates the calibration coefficients for value calculation based on the new calibration coefficients and the old calibration coefficients. For example, the calibration coefficient update unit 4117 calculates the calibration coefficient $c_n[k]$ for value calculation using Formula (41).

[Formula 41]

$$c_n[k] = \alpha c_{new}[k] + (1-\alpha) c_{old}[k] \quad (41)$$

Here, $\alpha$ denotes a value in a range of "$0<\alpha<1$". $c_{new}[k]$ denotes a new calibration coefficient. $c_{old}[k]$ denotes an old calibration coefficient. In addition, when the calibration coefficient storage unit 4118 does not store information indicating the old calibration coefficient, the calibration coefficient update unit 4117 may calculate the calibration coefficient for value calculation based on the new calibration coefficient without using the old calibration coefficient. The calibration coefficient update unit 4117 outputs the calibration coefficients C[k] for value calculation to the transmission weight value calculation unit 4116.

The transmission weight value calculation unit 4116 multiplies the uplink propagation channel information $H_U[k]$ by the calibration coefficients C[k] for value calculation as shown in Formula (42). The transmission weight value calculation unit 4116 calculates transmission weight values (transmission weights) based on calibrated uplink propagation channel information $H_C[k]$.

[Formula 42]

$$H_C[k] = H_U[k] C[k] \quad (42)$$

The calibration coefficients C[k] shown in Formula (42) satisfy Formula (43). $\beta[k]$ shown in Formula (43) is any complex number.

[Formula 43]

$$c_n[k] = \beta[k] \frac{g_{TA,n}[k]}{g_{RA,n}[k]} \quad (43)$$

For example, a calibration coefficient $c_n^{(m)}[k]$ for value calculation obtained using an estimation value of propagation channel information between the data reception station 4200a-m and the antenna 4102-n is expressed by Formula (44),

[Formula 44]

$$c_n^{(m)}[k] = \frac{h_{U,m,1}[k]}{h_{D,m,1}[k]} \frac{h_{D,m,n}[k]}{h_{U,m,n}[k]} = \frac{g_{RA,1}[k]}{g_{TA,1}[k]} \frac{g_{TA,n}[k]}{g_{RA,n}[k]} \quad (44)$$

(ii) Uplink Channel Estimation Step

The data reception stations 4200a transmit known signals (for example, NDP) to the data transmission station 4100a. The known signals transmitted by the data reception stations 4200a are used to estimate the uplink propagation channel information $H_U[k]$.

The demodulation unit 4109 acquires the known signals (for example, NDP) from the data reception stations 4200a via the reception units 4104.

The propagation channel estimation unit 4108 estimates the uplink propagation channel information $H_U[k]$ based on the known signals transmitted by the data reception stations 4200a.

(iii) Downlink Data Transmission Step

The transmission weight value calculation unit 4116 multiplies the calibration coefficients C[k] for value calculation by the uplink propagation channel information $H_U[k]$ obtained in the above-described (ii) uplink channel estimation step. The transmission weight value calculation unit 4116 calculates transmission weight values based on the calibrated uplink propagation channel information $H_C[k]$. The transmission weight values are used for transmit beamforming. The weight calculation unit 4106 generates a signal indicating a radio packet to be downlink-transmitted by multiplying (weight-combining) the modulated signal indicating the radio packet by the transmission weight values.

The transmission units 4103 output signals indicating the radio packet to be downlink-transmitted to the antennas 4102. The antennas 4102 perform spatial multiplexing transmission (MU-MIMO transmission) on the signals indicating the radio packet to be downlink-transmitted for the data reception stations 4200a.

A data reception station 4200a receives the signals indicating the radio packet. The data reception station 4200a determines whether the signals indicating the radio packet have been decoded without error. If the signals indicating the radio packet have been decoded without error, the data reception station 4200a transmits a predetermined confirmation signal (BA) to the data transmission station 4100a.

The data transmission station 4100a transmits a confirmation response request signal (BAR: BA request) to the data reception station 4200a. The confirmation response request signal is a signal for requesting the transmission of a predetermined confirmation signal (BA). When the confirmation response request signal is received, the data reception station 4200a transmits a confirmation signal to the data transmission station 4100a. The data transmission station 4100a receives the confirmation signal transmitted by the data reception station 4200a. The data transmission station 4100a determines whether the data reception station 4200a has decoded the signals indicating the radio packet without error based on the confirmation signal transmitted by the data reception station 4200a.

As described above, the data transmission station 4100a (a wireless communication apparatus serving as a base station apparatus) of the present embodiment includes the reception units 4104, the demodulation unit 4109, the propagation channel estimation unit 4108, the calibration coefficient calculation unit 4111, the calibration coefficient storage unit 4118, the calibration coefficient update unit 4117, the transmission weight value calculation unit 4116, the modulation unit 4105, and the transmission units 4103.

In addition, a wireless communication method in the data transmission station 4100a of the present embodiment is a wireless communication method in a wireless communication apparatus serving as a base station apparatus which includes: a step of receiving a radio signal; a step of generating a demodulated signal; a step of estimating uplink propagation channel information; a step of calculating new calibration coefficients; a step of storing old calibration coefficients; a step of calculating calibration coefficients for value calculation; a step of calculating transmission weight values; a step of generating a modulated signal; and a step of wirelessly transmitting a predetermined signal based on the modulated signal to the data reception stations 4200a.

The reception units 4104 receive the radio signal. The demodulation unit 4109 demodulates the radio signal to generate a demodulated signal in accordance with a demodulated result.

The propagation channel estimation unit 4108 estimates uplink propagation channel information indicating a propagation channel from a data reception station 4200a to the data transmission station 4100a based on the demodulated signal.

The calibration coefficient calculation unit 4111 calculates the new calibration coefficients as last calibration coefficients based on downlink propagation channel information indicating a propagation channel from the data transmission station 4100a to the data reception station 4200a and the uplink propagation channel information.

The calibration coefficient storage unit 4118 stores a history of the new calibration coefficients as the old calibration coefficients.

The calibration coefficient update unit 4117 calculates the calibration coefficients for value calculation based on the new calibration coefficients and the old calibration coefficients.

The transmission weight value calculation unit 4116 calculates the transmission weight values based on the calibration coefficients for value calculation and the uplink propagation channel information.

The modulation unit 4105 generates the modulated signal in accordance with a result of modulating data.

The transmission units 4103 wirelessly transmit the predetermined signal based on the modulated signal to the data reception stations 4200a based on the transmission weight values.

Through this configuration, the calibration coefficient update unit 4117 calculates the calibration coefficients for value calculation based on the new calibration coefficients and the old calibration coefficients. The transmission weight value calculation unit 4116 calculates the transmission weight values based on the calibration coefficients for value calculation and the uplink propagation channel information. With the data transmission station 4100a and the wireless communication method, the new calibration coefficients are calculated using an explicit feedback (EFB) sequence and the calibration coefficients for value calculation are updated.

Thereby, with the data transmission station 4100a and the wireless communication method of the twelfth embodiment, it is possible to improve the quality of communication based on MU-MIMO transmission. That is, with the data transmission station 4100a and the wireless communication method of the twelfth embodiment, it is possible to maintain high precision of the calibration coefficients for value calculation and realize high throughput.

Thirteenth Embodiment

The thirteenth embodiment is different from the twelfth embodiment in terms of a method for updating calibration coefficients for value calculation. In the thirteenth embodiment, only differences from the twelfth embodiment will be described.

The calibration coefficient update unit 4117 selects whether to use new calibration coefficients based on a correlation threshold value. If the use of the new calibration coefficients is selected, the calibration coefficient update unit 4117 calculates average values of the new calibration coefficients and old calibration coefficients. The calibration coefficient update unit 4117 updates the calibration coefficients for value calculation based on the calculated average values.

Specifically, the calibration coefficient update unit 4117 calculates a correlation value between a new calibration coefficient $C_{new}[k]$ and an old calibration coefficient $C_{old}[k]$ using Formula (45).

[Formula 45]

$$S = \frac{E[c_{old}[k]c_{old}[k]^*]}{\sqrt{E[|c_{old}[k]|^2]}\sqrt{E[|c_{new}[k]|^2]}} \quad (45)$$

Here, $E[\bullet]$ denotes an average and * denotes a complex conjugate.

If the correlation value exceeds the correlation threshold value, the calibration coefficient update unit 4117 updates the calibration coefficients for value calculation based on the average value of the new calibration coefficients and the old calibration coefficients. In contrast, if the correlation value does not exceed the correlation threshold value, the calibration coefficient update unit 4117 updates the calibration coefficients for value calculation based on the old calibration coefficients without using the new calibration coefficients.

As described above, the calibration coefficient update unit 4117 determines the timing at which the calibration coefficient calculation unit 4111 calculates the new calibration coefficients based on a change in the old calibration coefficients. Thereby, the calibration coefficient update unit 4117 of the thirteenth embodiment can update the calibration coefficients for value calculation using a simple configuration.

Fourteenth Embodiment

The fourteenth embodiment is different from the twelfth and thirteenth embodiments in that a determination unit 4119 determines the timing at which the calibration coefficient update unit 4117 calculates the calibration coefficients for value calculation. In the fourteenth embodiment, only differences from the twelfth and thirteenth embodiments will be described.

Figure 32:
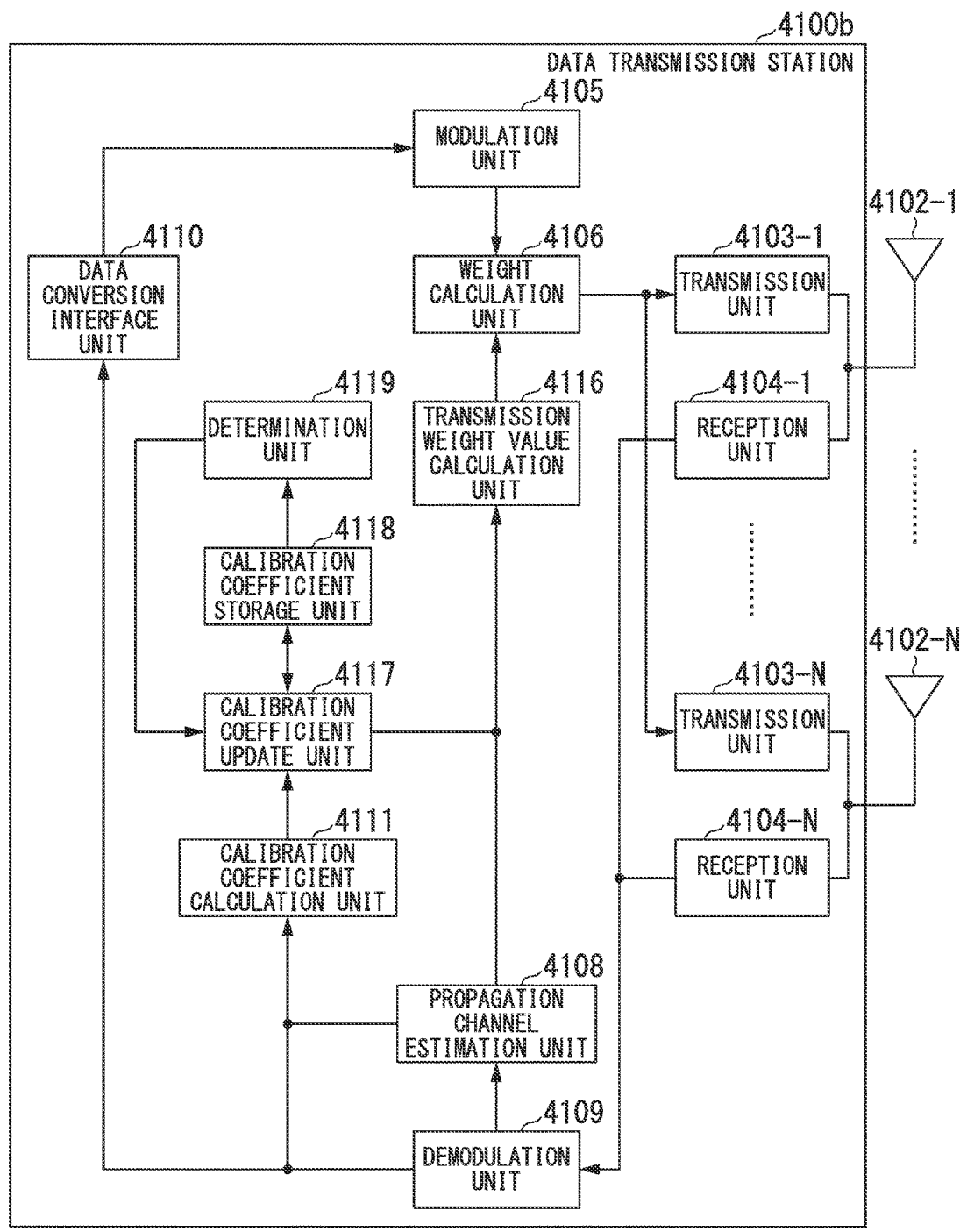
FIG. 32 is a diagram illustrating a configuration example of a data transmission station in a fourteenth embodiment of the present invention.

FIG. 32 is a diagram illustrating a configuration example of a data transmission station 4100 (hereinafter referred to as a "data transmission station 4100b") in the fourteenth embodiment of the present invention. The data transmission station 4100b includes antennas 4102, transmission units 4103, reception units 4104, a modulation unit 4105, a weight calculation unit 4106, a propagation channel estimation unit 4108, a demodulation unit 4109, a data conversion interface unit 4110, a calibration coefficient calculation unit 4111, the calibration coefficient update unit 4117, a calibration coefficient storage unit 4118, the determination unit 4119, and a transmission weight value calculation unit 4116.

The determination unit 4119 determines the timing at which the calibration coefficient update unit 4117 calculates (updates) the calibration coefficients for value calculation. That is, the determination unit 4119 determines the timing at which the calibration coefficient update unit 4117 acquires the old calibration coefficients from the calibration coefficient storage unit 4118.

The determination unit 4119 determines old calibration coefficients to be used to calculate the calibration coefficients for value calculation based on a plurality of old calibration coefficients calculated at different times. Specifically, the determination unit 4119 determines a threshold value (hereinafter referred to as a "coefficient threshold value") of coefficients based on new calibration coefficients calculated at a predetermined time. The determination unit 4119 calculates the time until the new calibration coefficients calculated by the calibration coefficient calculation unit 4111 are less than the coefficient threshold value based on a modeled temporal change in the new calibration coefficients. This modeling, for example, is performed in advance based on temperature characteristics of a processor (chip) and the like. The determination unit 4119 determines the time until the new calibration coefficients are less than the coefficient threshold value as the time at which the calibration coefficients for value calculation are updated.

The determination unit 4119 instructs the calibration coefficient update unit 4117 to acquire old calibration coefficients serving as a history of the new calibration coefficients calculated until an update time has elapsed from the calibration coefficient storage unit 4118. That is, the calibration coefficient update unit 4117 acquires old calibration coefficients having values greater than or equal to the coefficient threshold value from the calibration coefficient storage unit 4118. When the update time has elapsed, the determination unit 4119 causes the calibration coefficient update unit 4117 to update the calibration coefficients for value calculation based on the old calibration coefficients having the values greater than or equal to the coefficient threshold value.

Figure 33:
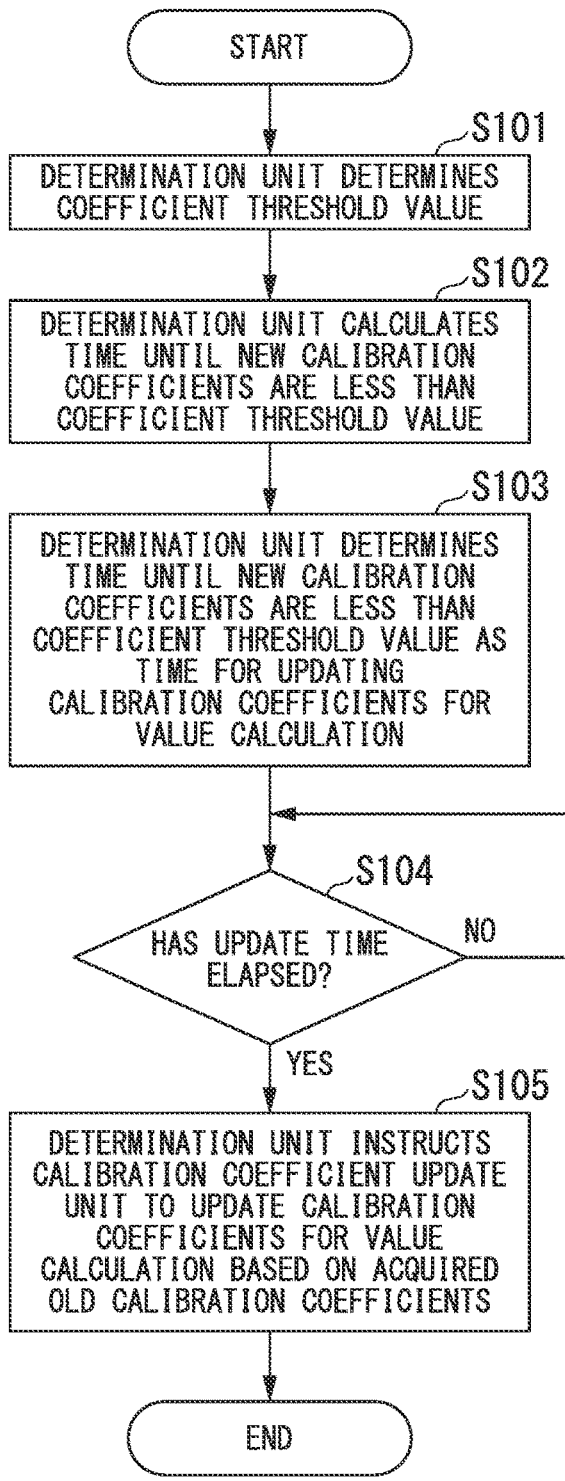
FIG. 33 is a flowchart illustrating an operation of a determination unit in the fourteenth embodiment of the present invention.

FIG. 33 is a flowchart illustrating an operation of the determination unit 4119 in the fourteenth embodiment of the present invention. The operation shown in the flowchart may be iteratively executed.

The determination unit 4119 determines a coefficient threshold value based on new calibration coefficients calculated at a predetermined time (step S101).

The determination unit 4119 calculates the time until new calibration coefficients calculated by the calibration coefficient calculation unit 4111 are less than the coefficient threshold value based on a modeled temporal change in the new calibration coefficients (step S102).

The determination unit 4119 determines the time until the new calibration coefficients are less than the coefficient threshold value as the time at which the calibration coefficients for value calculation are updated (step S103).

The determination unit 4119 determines whether the update time has elapsed (step S104). If the update time has not elapsed (step S104: NO), the determination unit 4119 instructs the calibration coefficient update unit 4117 to acquire old calibration coefficients from the calibration coefficient storage unit 4118. The determination unit 4119 returns the process to step S104. In contrast, if the update time has elapsed (step S104: YES), the determination unit 4119 causes the calibration coefficient update unit 4117 to update the calibration coefficients for value calculation based on the old calibration coefficients acquired by the calibration coefficient update unit 4117 (step S105).

As described above, the determination unit 4119 determines the timing at which the calibration coefficient calculation unit 4111 calculates the new calibration coefficients based on a change in the old calibration coefficients. Thereby, the calibration coefficient update unit 4117 of the fourteenth embodiment can update the calibration coefficients for value calculation using a simple configuration.

Fifteenth Embodiment

The fifteenth embodiment is different from the fourteenth embodiment in terms of a method in which a determination unit 4119 determines the timing at which a calibration coefficient update unit 4117 calculates the calibration coefficients for value calculation. In the fifteenth embodiment, only differences from the fourteenth embodiment will be described.

Figure 34:
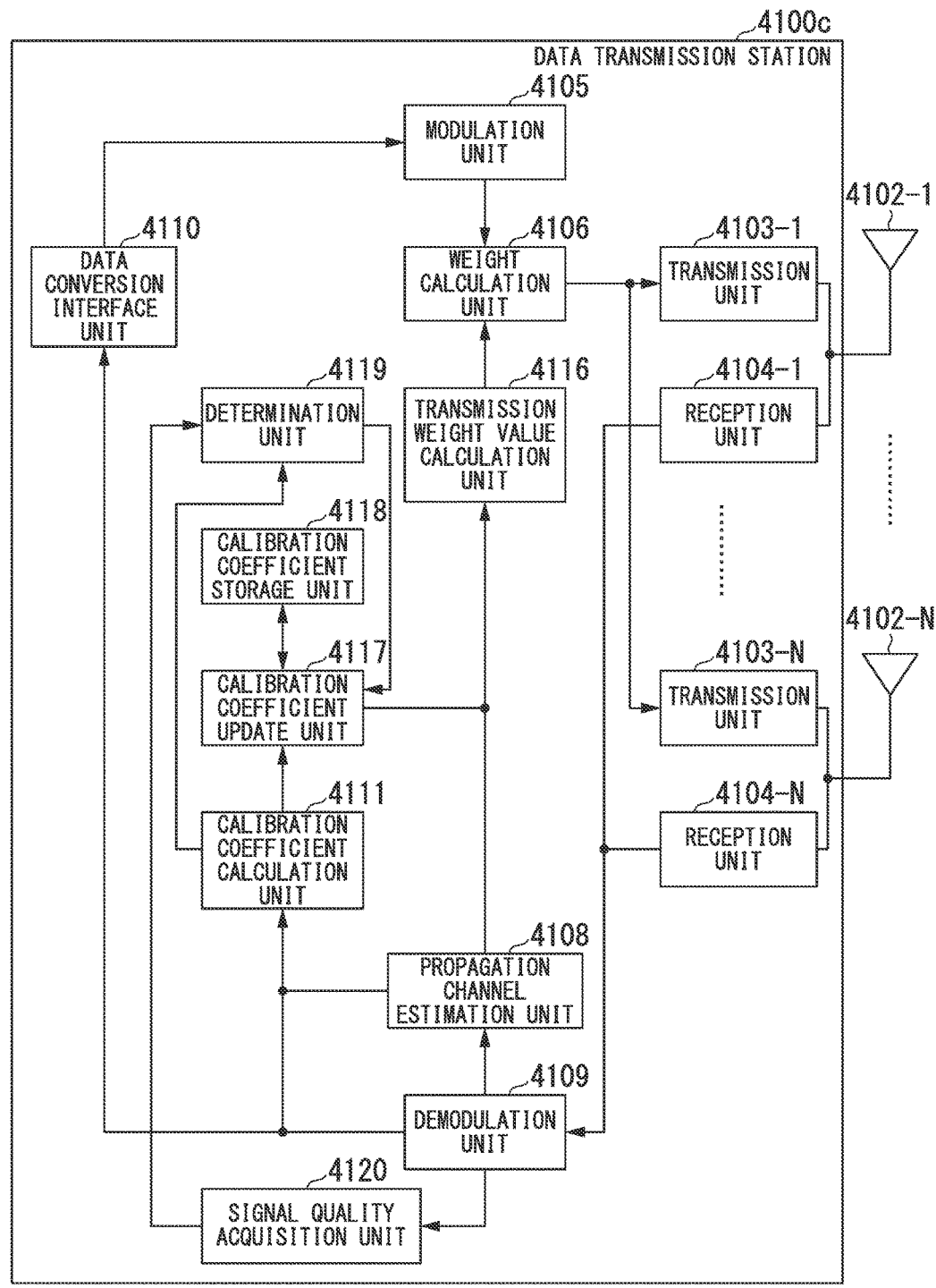
FIG. 34 is a diagram illustrating a configuration example of a data transmission station in a fifteenth embodiment of the present invention.

FIG. 34 is a diagram illustrating a configuration example of a data transmission station 4100 (hereinafter referred to as a "data transmission station 4100c") in the fifteenth embodiment of the present invention. The data transmission station 4100c includes antennas 4102, transmission units 4103, reception units 4104, a modulation unit 4105, a weight calculation unit 4106, a propagation channel estimation unit 4108, a demodulation unit 4109, a data conversion interface unit 4110, a calibration coefficient calculation unit 4111, the calibration coefficient update unit 4117, a calibration coefficient storage unit 4118, the determination unit 4119, a signal quality acquisition unit 4120, and a transmission weight value calculation unit 4116.

The demodulation unit 4109 outputs a demodulated signal indicating a radio packet to the propagation channel estimation unit 4108, the calibration coefficient calculation unit 4111, the data conversion interface unit 4110, and the signal quality acquisition unit 4120.

The signal quality acquisition unit 4120 outputs information indicating signal quality sent from a data reception station 4200 (hereinafter referred to as a "data reception station 4200c") in the fifteenth embodiment to the determination unit 4119 based on the demodulated signal indicating the radio packet. The signal quality, for example, is a bit error rate (BER), a packet error rate (PER), or a frame error rate (FER).

The determination unit 4119 compares the signal quality with a predetermined threshold value (hereinafter referred to as "quality threshold value") of quality. For example, the quality threshold value is a threshold value (hereinafter referred to as a "bit error rate threshold value") expressed by the bit error rate. If the signal quality exceeds the bit error rate threshold value, the determination unit 4119 causes the calibration coefficient update unit 4117 to acquire old calibration coefficients and calculate calibration coefficients for value calculation. That is, if the signal quality exceeds the bit error rate threshold value, the determination unit 4119 instructs the calibration coefficient update unit 4117 to acquire the old calibration coefficients from the calibration coefficient storage unit 4118.

When the instruction is received from the determination unit 4119, the calibration coefficient update unit 4117 calculates (updates) the calibration coefficients for value calculation based on the acquired old calibration coefficients.

The data transmission station 4100c performs communication with the data reception station 4200c. It is to be noted that the data reception station 4200c may be a terminal station apparatus which performs communication under control of the data transmission station 4100c or a terminal station apparatus which performs communication under control of a base station apparatus other than the data transmission station 4100c.

Figure 35:
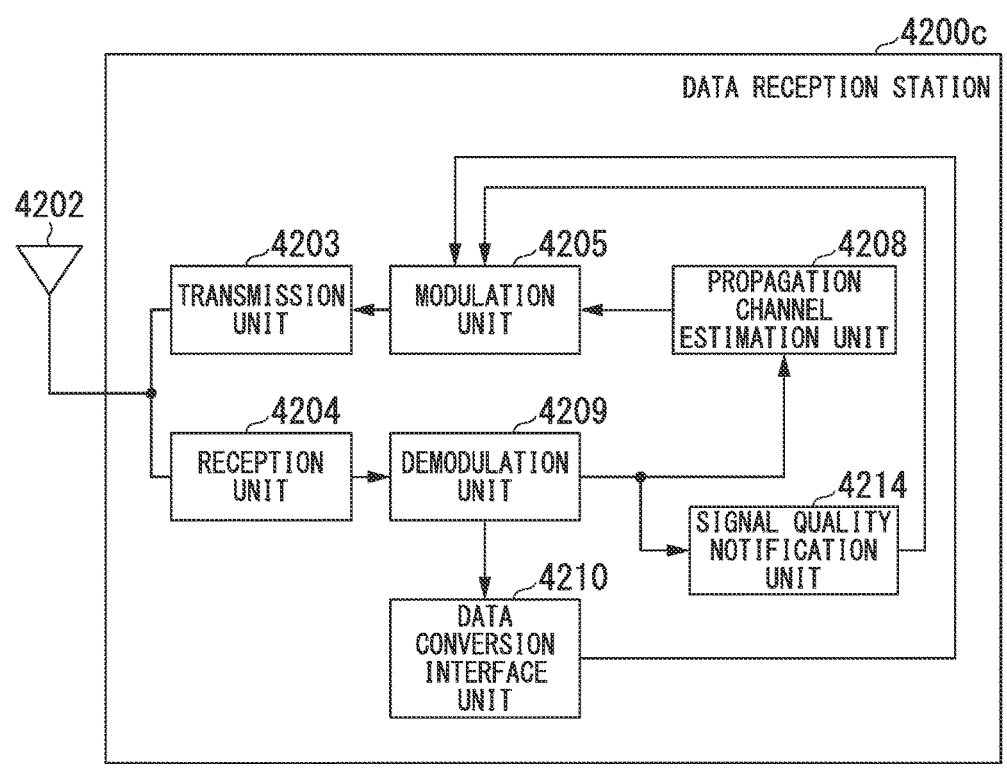
FIG. 35 is a diagram illustrating a configuration example of a data reception station in the fifteenth embodiment of the present invention.

FIG. 35 is a diagram illustrating a configuration example of the data reception station 4200c in the fifteenth embodiment of the present invention. The data reception station 4200c includes an antenna 4202, a transmission unit 4203, a reception unit 4204, a modulation unit 4205, a propagation channel estimation unit 4208, a demodulation unit 4209, a data conversion interface unit 4210, and a signal quality notification unit 4214.

The demodulation unit 4209 outputs a demodulated signal indicating a radio packet to the propagation channel estimation unit 4208, the data conversion interface unit 4210, and the signal quality notification unit 4214.

The signal quality notification unit 4214 calculates a bit error rate (BER) based on the demodulated signal indicating the radio packet. The signal quality notification unit 4214 outputs information indicating the bit error rate to the modulation unit 4205.

The modulation unit 4205 acquires the information indicating the bit error rate from the signal quality notification unit 4214. The modulation unit 4205 outputs a signal indicating the bit error rate to the transmission unit 4203.

The transmission unit 4203 outputs the signal indicating the bit error rate to the antenna 4202.

Figure 36:
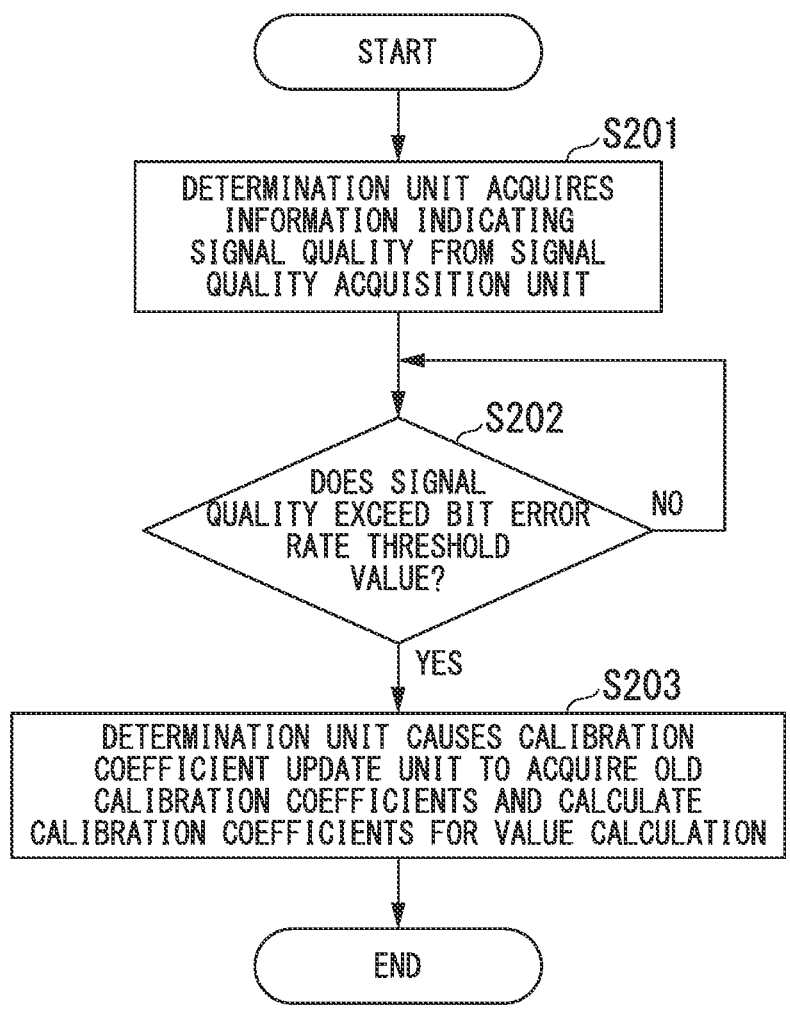
FIG. 36 is a flowchart illustrating an operation of a determination unit in the fifteenth embodiment of the present invention.

FIG. 36 is a flowchart illustrating an operation of the determination unit 4119 in the fifteenth embodiment of the present invention. The operation shown in the flowchart may be iteratively executed.

The determination unit 4119 acquires information indicating signal quality from the signal quality acquisition unit 4120 (step S201).

The determination unit 4119 determines whether the signal quality exceeds the bit error rate threshold value (step S202).

If the signal quality exceeds the bit error rate threshold value (step S202: YES), the determination unit 4119 causes the calibration coefficient update unit 4117 to acquire old calibration coefficients and calculate calibration coefficients for value calculation (step S203). In contrast, if the signal quality does not exceed the bit error rate threshold value (step S202: NO), the determination unit 4119 returns the process to step S202.

As described above, the determination unit 4119 determines the timing at which the calibration coefficient calculation unit 4111 calculates the new calibration coefficients based on reception characteristics of a predetermined signal received by the data reception station 4200c under control of the data transmission station 4100c or another wireless communication apparatus which is not under control of the data transmission station 4100c.

With the data transmission station 4100c and the wireless communication method of the fifteenth embodiment, the timing at which the calibration coefficients for value calculation are calculated is determined based on the old calibration coefficients and/or signal quality (BER). With the data transmission station 4100c and the wireless communication method, the new calibration coefficients are calculated using an explicit feedback (EFB) sequence and the calibration coefficients for value calculation are updated.

Sixteenth Embodiment

The sixteenth embodiment is different from the fourteenth and fifteenth embodiments in terms of a method in which a determination unit 4119 determines the timing at which a calibration coefficient update unit 4117 calculates calibration coefficients for value calculation. In the sixteenth embodiment, only differences from the fourteenth and fifteenth embodiments will be described. It is to be noted that the data reception station 4200 in the sixteenth embodiment has the same configuration as the data reception station 4200c described in the fifteenth embodiment. Hereinafter, the data reception station 4200 in the sixteenth embodiment is denoted as a "data reception station 4200c" as in the fifteenth embodiment.

Figure 37:
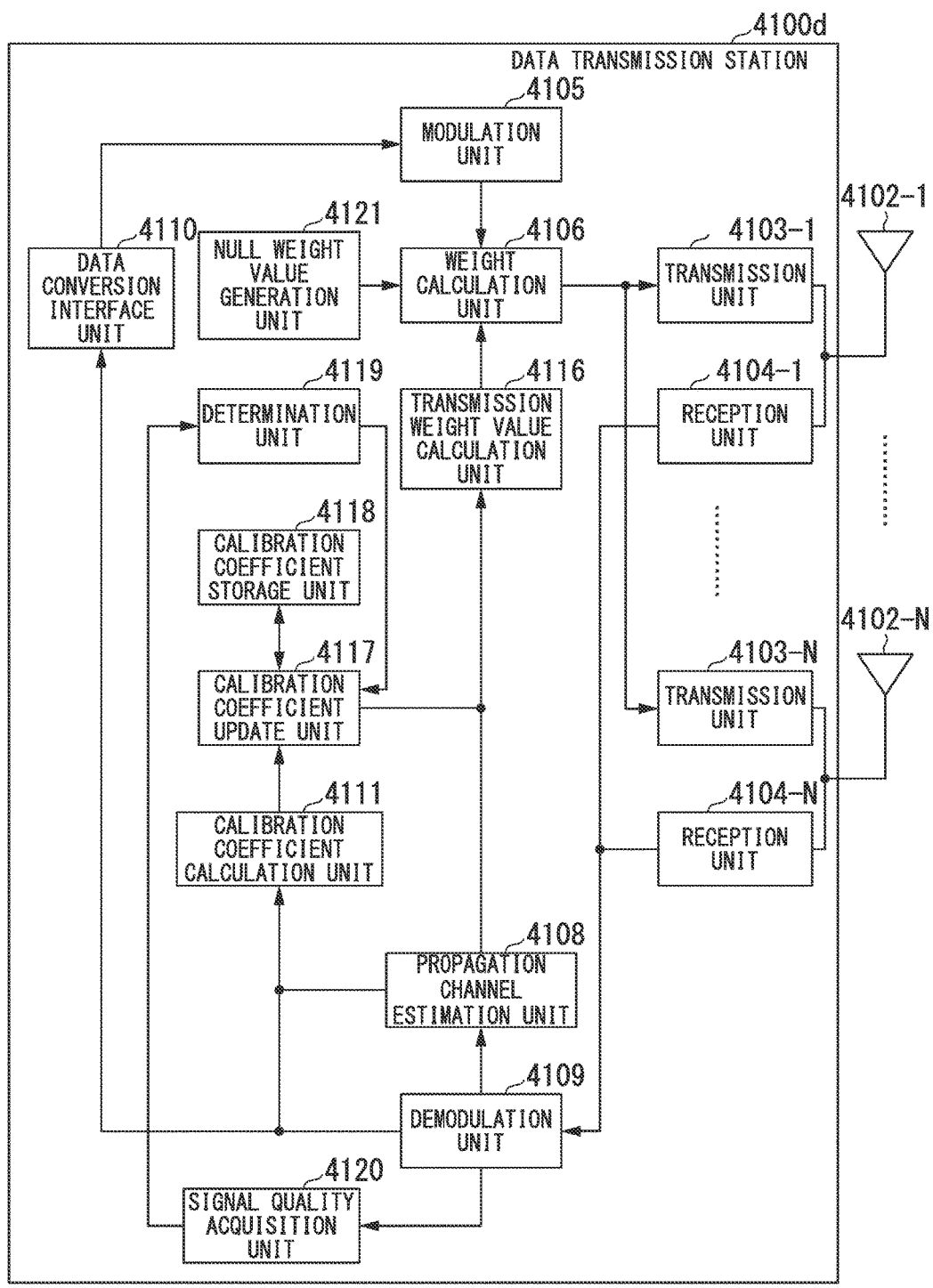
FIG. 37 is a diagram illustrating a configuration example of a data transmission station in a sixteenth embodiment of the present invention.

FIG. 37 is a diagram illustrating a configuration example of a data transmission station 4100 (hereinafter referred to as a "data transmission station 4100d") in the sixteenth embodiment of the present invention. The data transmission station 4100d includes antennas 4102, transmission units 4103, reception units 4104, a modulation unit 4105, a weight calculation unit 4106, a propagation channel estimation unit 4108, a demodulation unit 4109, a data conversion interface unit 4110, a calibration coefficient calculation unit 4111, the calibration coefficient update unit 4117, a calibration coefficient storage unit 4118, the determination unit 4119, a signal quality acquisition unit 4120, a null weight value generation unit 4121, and a transmission weight value calculation unit 4116.

The determination unit 4119 compares information indicating signal quality with a quality threshold value. The quality threshold value, for example, is a threshold value (hereinafter referred to as a "receive power threshold value") expressed by receive power. If the information indicating the signal quality exceeds the receive power threshold value, the determination unit 4119 causes the calibration coefficient update unit 4117 to acquire old calibration coefficients and calculate calibration coefficients for value calculation. That is, if the information indicating the signal quality exceeds the receive power threshold value, the determination unit 4119 instructs the calibration coefficient update unit 4117 to acquire the old calibration coefficients from the calibration coefficient storage unit 4118.

When the instruction is received from the determination unit 4119, the calibration coefficient update unit 4117 calculates (updates) the calibration coefficients for value calculation based on the acquired old calibration coefficients.

The null weight value generation unit 4121 calculates transmission weight values (hereinafter referred to as "null weight values") for suppressing transmit power for the data reception station 4200c. The null weight value generation unit 4121 outputs information indicating the null weight values to the weight calculation unit 4106. The weight calculation unit 4106 calculates weight values for strengthening signals and outputs information indicating the calculated weight values and the information indicating the null weight values from the null weight value generation unit 4121 to the transmission units 4103.

The data transmission station 4100d communicates with the data reception station 4200c. It is to be noted that the data reception station 4200c may be a terminal station apparatus which performs communication under control of the data transmission station 4100d or a terminal station apparatus which performs communication under control of a base station apparatus other than the data transmission station 4100d.

The signal quality notification unit 4214 of the data reception station 4200c calculates receive power based on a demodulated signal indicating a radio packet. The signal quality notification unit 4214 outputs information indicating the receive power to the modulation unit 4205.

The modulation unit 4205 acquires the information indicating the receive power from the signal quality notification unit 4214. The modulation unit 4205 outputs a signal indicating the receive power to the transmission unit 4203.

The transmission unit 4203 outputs the signal indicating the receive power to the antenna 4202.

Figure 38:
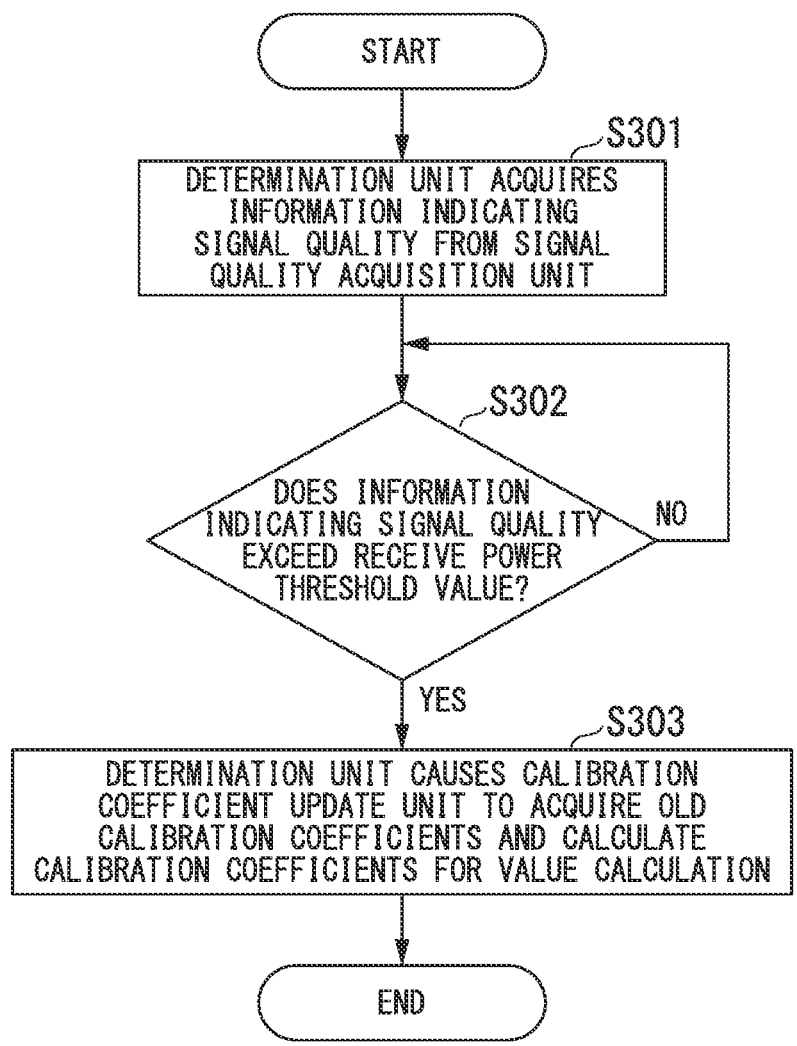
FIG. 38 is a flowchart illustrating an operation of a determination unit in the sixteenth embodiment of the present invention.

FIG. 38 is a flowchart illustrating an operation of the determination unit 4119 in the sixteenth embodiment of the present invention. The operation shown in this flowchart may be iteratively executed.

The determination unit 4119 acquires information indicating signal quality from the signal quality acquisition unit 4120 (step S301).

The determination unit 4119 determines whether the information indicating the signal quality exceeds the receive power threshold value (step S302).

If the information indicating the signal quality exceeds the receive power threshold value (step S302: YES), the determination unit 4119 causes the calibration coefficient update unit 4117 to acquire old calibration coefficients and calculate calibration coefficients for value calculation (step S303). In contrast, if the information indicating the signal quality does not exceed the bit error rate threshold value (step S302: NO), the determination unit 4119 returns the process to step S302.

As described above, the determination unit 4119 determines the timing at which the calibration coefficient calculation unit 4111 calculates the new calibration coefficients based on reception characteristics of a predetermined signal received by the data reception station 4200c under control of the data transmission station 4100d or another wireless communication apparatus which is not under control of the data transmission station 4100d.

With the data transmission station 4100d and the wireless communication method of the sixteenth embodiment, the timing at which the calibration coefficients for value calculation are calculated is determined based on the old calibration coefficients and/or the signal quality (receive power). With the data transmission station 4100d and the wireless communication method, the new calibration coefficients are calculated using an explicit feedback (EFB) sequence and the calibration coefficients for value calculation are updated.

Although embodiments of the present invention have been described in detail with reference to the drawings, the specific configurations are not limited to the embodiments and designs and the like may also be included without departing from the gist of the present invention. For example, structural components of the above-described embodiments may be appropriately combined.

It is to be noted that the wireless communication apparatuses (the data transmission stations and the data reception stations) and the network control server described above may be realized by a computer. In this case, a program for realizing the functions may be recorded on a computer-readable recording medium and a computer system may read and execute the program. It is to be noted that the "computer system" used here is assumed to include an operating system (OS) and hardware such as peripheral devices.

In addition, the "computer-readable recording medium" refers to a portable medium such as a flexible disk, a magneto-optical disc, a read only memory (ROM), a compact disc (CD)-ROM, and a storage apparatus including a hard disk embedded in the computer system. Further, the "computer-readable recording medium" is assumed to include a computer-readable recording medium for dynamically holding a program for a short time as in a communication line when the program is transmitted via a network such as the Internet or a communication circuit such as a telephone circuit and a computer-readable recording medium which holds the program for a predetermined time as in a volatile memory (random access memory (RAM)) inside the computer system serving as a server or a client.

In addition, the above program may be transmitted from a computer system storing the program in a storage apparatus or the like to another computer system via a transmission medium or transmission waves in the transmission medium. Here, the "transmission medium" for transmitting the program refers to a medium having a function of transmitting information, such as a network (communication network) like the Internet or a communication circuit (communication line) like a telephone circuit.

In addition, the above program may be a program for realizing part of the above-described functions. Further, the above program may be a program. i.e., a so-called differential file (differential program), capable of realizing the above-described functions in combination with a program already recorded on the computer system. Alternatively, the above-described wireless communication apparatuses (the data transmission stations and the data reception stations) and the network control server may be realized using hardware such as a programmable logic device (PLD)) or a field programmable gate array (FPGA).

INDUSTRIAL APPLICABILITY

The present invention, for example, can be applied to wireless communication. In accordance with the present invention, it is possible to apply implicit feedback beamforming to an MIMO transmission system. In addition, in accordance with the present invention, it is possible to improve the quality of communication based on MIMO transmission. Further, in accordance with the present invention, it is possible to acquire transmission weight values necessary in spatial multiplexing transmission using the same frequency band at the same time for a plurality of data reception stations even when no propagation channel information is obtained from signals received from the data reception stations.

DESCRIPTION OF REFERENCE SIGNS

100 Data transmission station
102 Antenna
103 Transmission unit
104 Reception unit
105 Modulation unit
106 Weight calculation unit
108 Propagation channel estimation unit
109 Demodulation unit
110 Data conversion interface unit
114 Channel estimation signal generation unit
115 Correction value calculation unit
116 Transmission weight value calculation unit
200 Data reception station
202 Antenna
203 Transmission unit
204 Reception unit
205 Modulation unit
208 Propagation channel estimation unit
209 Demodulation unit
210 Data conversion interface unit
214 Channel estimation signal generation unit
300 Network control server
1100, 1300, 1400, 1500, 1600, 1700 Data transmission station
1101-1, 1101-N, 1201 Antenna
1102-1, 1102-N, 1202 Reception unit
1103, 1203 Demodulation unit
1104 Propagation channel estimation unit
1105 Propagation channel calibration unit
1106, 1414, 1615 Propagation channel interpolation unit 1107 Transmission weight value calculation unit
1108, 1204 Data conversion interface unit
1109, 1206 Modulation unit
1110 Weight calculation unit
1111-1, 111-N, 1207 Transmission unit
1200, 1200-1, 1200-2 Data reception station
1205 Propagation channel information estimation signal generation unit
1312, 1514, 1715 Transmission weight value interpolation unit
1413 Propagation channel storage unit
1513 Transmission weight storage unit
1614 Propagation channel correlation calculation unit
1714 Transmission weight correlation calculation unit
2001 Wireless communication system
2100 Data transmission station
2102 Antenna
2103 Transmission unit
2104 Reception unit
2105 Modulation unit
2106 Weight calculation unit
2107 Received signal strength calculation unit
2108 Propagation channel estimation unit
2109 Demodulation unit
2110 Data conversion interface unit
2111 Calibration coefficient calculation unit
2112 Correlation processing unit
2116 Transmission weight value calculation unit
2200 Data reception station
2202 Antenna
2203 Transmission unit
2204 Reception unit
2205 Modulation unit
2208 Propagation channel estimation unit
2209 Demodulation unit
2210 Data conversion interface unit
3001 Wireless communication system
3100 Data transmission station
3102 Antenna
3103 Transmission unit
3104 Reception unit
3105 Modulation unit
3106 Weight calculation unit
3108 Propagation channel estimation unit
3109 Demodulation unit
3110 Data conversion interface unit
3111 Calibration coefficient calculation unit
3113 Designation unit
3116 Transmission weight value calculation unit
3200 Data reception station
3202 Antenna
3203 Transmission unit
3204 Reception unit
3205 Modulation unit
3208 Propagation channel estimation unit
3209 Demodulation unit
3210 Data conversion interface unit
3211 Determination unit
4001 Wireless communication system
4100a Data transmission station
4100b Data transmission station
4100c Data transmission station
4100d Data transmission station
4102 Antenna
4103 Transmission unit
4104 Reception unit
4105 Modulation unit
4106 Weight calculation unit
4108 Propagation channel estimation unit
4109 Demodulation unit
4110 Data conversion interface unit
4111 Calibration coefficient calculation unit
4116 Transmission weight value calculation unit
4117 Calibration coefficient update unit
4118 Calibration coefficient storage unit
4119 Determination unit
4120 Signal quality acquisition unit
4121 Null weight value generation unit
4200a Data reception station
4200c Data reception station
4202 Antenna
4203 Transmission unit
4204 Reception unit
4205 Modulation unit
4208 Propagation channel estimation unit
4209 Demodulation unit
4210 Data conversion interface unit
4214 Signal quality notification unit

The invention claimed is:

1. A wireless communication apparatus comprising:
a designation unit which generates format designation information for designating a format of transmission and reception for another wireless communication apparatus;
a transmission unit which wirelessly transmits the format designation information to the other wireless communication apparatus;
an acquisition unit which acquires a packet;
a propagation channel estimation unit which estimates uplink propagation channel information indicating a propagation channel from the other wireless communication apparatus to the wireless communication apparatus based on the packet;
a calibration coefficient calculation unit which calculates a calibration coefficient based on downlink propagation channel information indicating a propagation channel from the wireless communication apparatus to the other wireless communication apparatus and the uplink propagation channel information; and
a transmission weight value calculation unit which calculates a transmission weight value based on the calibration coefficient and the uplink propagation channel information,
wherein the transmission unit wirelessly transmits a predetermined signal to the other wireless communication apparatus based on the transmission weight value, and the designation unit performs designation so that a known signal for dealing with estimation of the uplink propagation channel information corresponding to a necessary band is transmitted.

2. A wireless communication apparatus comprising:
a designation unit which generates format designation information for designating a format of transmission and reception for another wireless communication apparatus;
a transmission unit which wirelessly transmits the format designation information to the other wireless communication apparatus;
an acquisition unit which acquires a packet;
a propagation channel estimation unit which estimates uplink propagation channel information indicating a propagation channel from the other wireless communication apparatus to the wireless communication apparatus based on the packet;

a calibration coefficient calculation unit which calculates a calibration coefficient based on downlink propagation channel information indicating a propagation channel from the wireless communication apparatus to the other wireless communication apparatus and the uplink propagation channel information; and a transmission weight value calculation unit which calculates a transmission weight value based on the calibration coefficient and the uplink propagation channel information, wherein the transmission unit wirelessly transmits a predetermined signal to the other wireless communication apparatus based on the transmission weight value, and the designation unit performs designation so that a known signal for dealing with estimation of the uplink propagation channel information corresponding to a plurality of antennas is transmitted using the same antenna as that at a time of reception.

3. A wireless communication apparatus comprising:

a designation unit which generates format designation information for designating a format of transmission and reception for another wireless communication apparatus;

a transmission unit which wirelessly transmits the format designation information to the other wireless communication apparatus;

an acquisition unit which acquires a packet;

a propagation channel estimation unit which estimates uplink propagation channel information indicating a propagation channel from the other wireless communication apparatus to the wireless communication apparatus based on the packet;

a calibration coefficient calculation unit which calculates a calibration coefficient based on downlink propagation channel information indicating a propagation channel from the wireless communication apparatus to the other wireless communication apparatus and the uplink propagation channel information; and a transmission weight value calculation unit which calculates a transmission weight value based on the calibration coefficient and the uplink propagation channel information, wherein the transmission unit wirelessly transmits a predetermined signal to the other wireless communication apparatus based on the transmission weight value, and when the other wireless communication apparatus receives a signal via a plurality of antennas, the designation unit designates a format with which the uplink propagation channel information corresponding to the plurality of antennas is capable of being estimated as a format of a training preamble of a frame of the packet for providing a notification of the downlink propagation channel information.

4. The wireless communication apparatus according to claim 3, wherein the designation unit designates a transmission operation so that the other wireless communication apparatus transmits the downlink channel information estimated by the other wireless communication apparatus without decomposing the downlink channel information.

5. A wireless communication apparatus comprising:

a designation unit which generates format designation information for designating a format of transmission and reception for another wireless communication apparatus;

a transmission unit which wirelessly transmits the format designation information to the other wireless communication apparatus;

an acquisition unit which acquires a packet;

a propagation channel estimation unit which estimates uplink propagation channel information indicating a propagation channel from the other wireless communication apparatus to the wireless communication apparatus based on the packet;

a calibration coefficient calculation unit which calculates a calibration coefficient based on downlink propagation channel information indicating a propagation channel from the wireless communication apparatus to the other wireless communication apparatus and the uplink propagation channel information; and a transmission weight value calculation unit which calculates a transmission weight value based on the calibration coefficient and the uplink propagation channel information, wherein the transmission unit wirelessly transmits a predetermined signal to the other wireless communication apparatus based on the transmission weight value, and the designation unit designates an antenna to be used in transmission and reception so that the antenna to be commonly used in the transmission and the reception is selected when the calibration coefficient is calculated.

6. The wireless communication apparatus according to claim 5, wherein, when the other wireless communication apparatus receives a signal via a plurality of antennas, the designation unit designates a transmission operation so that a packet including the downlink propagation channel information is transmitted for each antenna.

7. A wireless communication method in a wireless communication apparatus, the method comprising:

a step of generating format designation information for designating a format of transmission and reception for another wireless communication apparatus;

a step of wirelessly transmitting the format designation information to the other wireless communication apparatus;

a step of acquiring a packet;

a step of estimating uplink propagation channel information indicating a propagation channel from the other wireless communication apparatus to the wireless communication apparatus based on the packet;

a step of calculating a calibration coefficient based on downlink propagation channel information indicating a propagation channel from the wireless communication apparatus to the other wireless communication apparatus and the uplink propagation channel information;

a step of calculating a transmission weight value based on the calibration coefficient and the uplink propagation channel information; and a step of wirelessly transmitting a predetermined signal to the other wireless communication apparatus based on the transmission weight value, the step of generating the format designation information performs designation so that a known signal for dealing with estimation of the uplink propagation channel information corresponding to a necessary band is transmitted.

8. A wireless communication apparatus comprising:

a propagation channel estimation unit which estimates first uplink propagation channel information indicating a propagation channel from another wireless communication apparatus to the wireless communication apparatus based on downlink propagation channel information indicating a propagation channel from the wireless communication apparatus to the other wireless communication apparatus and a predetermined signal received from the other wireless communication apparatus;

a correction value calculation unit which calculates a correction value by calculating temporary correction values based on the downlink propagation channel information and the first uplink propagation channel information and multiplying the temporary correction values by weights based on channel gains to combine the temporary correction values;

a transmission weight value calculation unit which calculates a transmission weight value based on the correction value and the first uplink propagation channel information or second uplink propagation channel information; and a transmission unit which wirelessly transmits a predetermined signal to the other wireless communication apparatus through a beam formed based on the transmission weight value and the second uplink propagation channel information.

9. The wireless communication apparatus according to claim 8, wherein the correction value calculation unit calculates a plurality of temporary correction values for each antenna of a plurality of other wireless communication apparatuses.

10. The wireless communication apparatus according to claim 8, wherein the propagation channel estimation unit estimates a plurality of pieces of first uplink propagation channel information based on a plurality of predetermined signals, and
the correction value calculation unit calculates a plurality of temporary correction values based on a plurality of pieces of downlink propagation channel information and the plurality of pieces of first uplink propagation channel information.

11. The wireless communication apparatus according to claim 8, wherein the transmission unit transmits at least one of the first uplink propagation channel information, the second uplink propagation channel information, and the downlink propagation channel information to an outside of the wireless communication apparatus.

12. A wireless communication method in a wireless communication apparatus, the method comprising:
a step of estimating first uplink propagation channel information indicating a propagation channel from another wireless communication apparatus to the wireless communication apparatus based on downlink propagation channel information indicating a propagation channel from the wireless communication apparatus to the other wireless communication apparatus and a predetermined signal received from the other wireless communication apparatus;
a step of calculating a correction value by calculating temporary correction values based on the downlink propagation channel information and the first uplink propagation channel information and multiplying the temporary correction values by weights based on channel gains to combine the temporary correction values;
a step of calculating a transmission weight value based on the correction value and the first uplink propagation channel information or second uplink propagation channel information; and
a step of wirelessly transmitting a predetermined signal to the other wireless communication apparatus through a beam formed based on the transmission weight value and the second uplink propagation channel information.

13. A wireless communication apparatus comprising:

an acquisition unit which acquires a packet;

a propagation channel estimation unit which estimates uplink propagation channel information indicating a propagation channel from another wireless communication apparatus to the wireless communication apparatus based on the packet;

a calibration coefficient calculation unit which calculates first calibration coefficients based on downlink propagation channel information indicating a propagation channel from the wireless communication apparatus to the other wireless communication apparatus and the uplink propagation channel information;

a correlation processing unit which determines a second calibration coefficient based on a correlation between the first calibration coefficients in a frequency domain;

a transmission weight value calculation unit which calculates a transmission weight value based on the second calibration coefficient and the uplink propagation channel information; and a transmission unit which wirelessly transmits a predetermined signal to the other wireless communication apparatus based on the transmission weight value.

14. The wireless communication apparatus according to claim 13, wherein the correlation processing unit combines the first calibration coefficients corresponding to adjacent subcarriers predetermined in the frequency domain based on weights in accordance with the correlation between the first calibration coefficients corresponding to the adjacent subcarriers and determines the second calibration coefficient based on a combined result.

15. The wireless communication apparatus according to claim 13, wherein the correlation processing unit selects a first calibration coefficient in which a signal to noise ratio is highest from among first calibration coefficients corresponding to adjacent subcarriers predetermined in the frequency domain as the second calibration coefficient.

16. The wireless communication apparatus according to claim 13, wherein, when a received signal strength is less than a predetermined value, the correlation processing unit relatively increases the number of subcarriers to be used in calibration.

17. A wireless communication method in a wireless communication apparatus, the method comprising:
a step of acquiring a packet;
a step of estimating uplink propagation channel information indicating a propagation channel from another wireless communication apparatus to the wireless communication apparatus based on the packet;
a step of calculating first calibration coefficients based on downlink propagation channel information indicating a propagation channel from the wireless communication apparatus to the other wireless communication apparatus and the uplink propagation channel information;
a step of determining a second calibration coefficient based on a correlation between the first calibration coefficients in a frequency domain;
a step of calculating a transmission weight value based on the second calibration coefficient and the uplink propagation channel information; and
a step of wirelessly transmitting a predetermined signal to the other wireless communication apparatus based on the transmission weight value.

18. A wireless communication apparatus comprising:
a reception unit which receives a radio signal;
a demodulation unit which demodulates the radio signal and generates a demodulated signal in accordance with a demodulated result;
a propagation channel estimation unit which estimates uplink propagation channel information indicating a propagation channel from another wireless communication apparatus to the wireless communication apparatus based on the demodulated signal;
a calibration coefficient calculation unit which calculates a new calibration coefficient as a last calibration coefficient based on downlink propagation channel information indicating a propagation channel from the wireless communication apparatus to the other wireless communication apparatus and the uplink propagation channel information;
a calibration coefficient storage unit which stores a history of the new calibration coefficient as an old calibration coefficient;
a calibration coefficient update unit which calculates a calibration coefficient for value calculation based on the new calibration coefficient and the old calibration coefficient;
a transmission weight value calculation unit which calculates a transmission weight value based on the calibration coefficient for value calculation and the uplink propagation channel information;
a modulation unit which generates a modulated signal in accordance with a result of modulating data; and
a transmission unit which wirelessly transmits a predetermined signal based on the modulated signal to the other wireless communication apparatus based on the transmission weight value.

19. The wireless communication apparatus according to claim 18 comprising a first determination unit which determines a timing at which the calibration coefficient calculation unit calculates the new calibration coefficient based on a change in the old calibration coefficient.

20. The wireless communication apparatus according to claim 18 comprising a second determination unit which determines a timing at which the calibration coefficient calculation unit calculates the new calibration coefficient based on reception characteristics of a predetermined signal received by the other wireless communication apparatus under control of the wireless communication apparatus or by another wireless communication apparatus which is not under control of the wireless communication apparatus.

21. A wireless communication method in a wireless communication apparatus, the method comprising:
a step of receiving a radio signal;
a step of demodulating the radio signal and generating a demodulated signal in accordance with a demodulated result;
a step of estimating uplink propagation channel information indicating a propagation channel from another wireless communication apparatus to the wireless communication apparatus based on the demodulated signal;
a step of calculating a new calibration coefficient as a last calibration coefficient based on downlink propagation channel information indicating a propagation channel from the wireless communication apparatus to the other wireless communication apparatus and the uplink propagation channel information;
a step of storing a history of the new calibration coefficient as an old calibration coefficient;
a step of calculating a calibration coefficient for value calculation based on the new calibration coefficient and the old calibration coefficient;
a step of calculating a transmission weight value based on the calibration coefficient for value calculation and the uplink propagation channel information;
a step of generating a modulated signal in accordance with a result of modulating data; and
a step of wirelessly transmitting a predetermined signal based on the modulated signal to the other wireless communication apparatus based on the transmission weight value.

22. A wireless communication apparatus for performing spatial multiplexing transmission using the same frequency band at the same time when data is transmitted to a plurality of other wireless communication apparatuses, the wireless communication apparatus comprising:
a propagation channel estimation unit which estimates propagation channel information between the other wireless communication apparatuses and the wireless communication apparatus for each of subcarriers included in the same frequency band based on known signals included in signals received from the other wireless communication apparatuses;
a propagation channel interpolation unit which interpolates propagation channel information of a subcarrier for which no propagation channel information has been obtained based on the propagation channel information estimated by the propagation channel estimation unit and outputs the propagation channel information estimated by the propagation channel estimation unit and the interpolated propagation channel information;
a transmission weight value calculation unit which calculates a transmission weight value based on the propagation channel information output by the propagation channel interpolation unit; and
a transmission unit which transmits data multiplexed based on the transmission weight value calculated by the transmission weight value calculation unit to the plurality of other wireless communication apparatuses.

23. The wireless communication apparatus according to claim 22, further comprising:
a propagation channel storage unit which stores the propagation channel information estimated by the propagation channel estimation unit; and
a propagation channel correlation calculation unit which calculates a correlation value between the propagation channel information estimated by the propagation channel estimation unit and the propagation channel information stored in the propagation channel storage unit,
wherein, when the propagation channel information of the subcarrier for which no propagation channel information has been obtained is interpolated based on the signal received from the other wireless communication apparatus, the propagation channel interpolation unit selects, based on the correlation value calculated by the propagation channel correlation calculation unit, whether to perform interpolation using the propagation channel information estimated by the propagation channel estimation unit or to perform interpolation using the propagation channel information stored in the propagation channel storage unit for the subcarrier and the propagation channel information estimated by the propagation channel estimation unit.

24. A wireless communication apparatus for performing spatial multiplexing transmission using the same frequency band at the same time when data is transmitted to a plurality of other wireless communication apparatuses, the wireless communication apparatus comprising:
- a propagation channel estimation unit which estimates propagation channel information between the other wireless communication apparatuses and the wireless communication apparatus for each of subcarriers included in the same frequency band based on known signals included in signals received from the other wireless communication apparatuses;
- a transmission weight value calculation unit which calculates a transmission weight value based on the propagation channel information estimated by the propagation channel estimation unit;
- a transmission weight value interpolation unit which interpolates a transmission weight value of a subcarrier for which no transmission weight value has been obtained based on the transmission weight value calculated by the transmission weight value calculation unit and outputs the transmission weight value calculated by the transmission weight value calculation unit and the interpolated transmission weight value; and
- a transmission unit which transmits data multiplexed based on the transmission weight value output by the transmission weight value interpolation unit to the plurality of other wireless communication apparatuses.

25. The wireless communication apparatus according to claim 24, further comprising:
- a transmission weight storage unit which stores the transmission weight value calculated by the transmission weight value calculation unit; and
- a transmission weight correlation calculation unit which calculates a correlation value between the transmission weight value calculated by the transmission weight value calculation unit and the transmission weight value stored in the transmission weight storage unit,
- wherein, when the transmission weight value of the subcarrier for which no transmission weight value has been obtained based on the signals received from the other wireless communication apparatuses is interpolated, the transmission weight value interpolation unit selects, based on the correlation value calculated by the transmission weight correlation calculation unit, whether to perform interpolation using the transmission weight value calculated by the transmission weight value calculation unit or to perform interpolation using the transmission weight value stored in the transmission weight storage unit for the subcarrier and the transmission weight value calculated by the transmission weight value calculation unit.

26. A wireless communication method performed by a wireless communication apparatus which performs spatial multiplexing transmission using the same frequency band at the same time when data is transmitted to a plurality of other wireless communication apparatuses, the method comprising:
- a propagation channel estimation step of estimating propagation channel information between the other wireless communication apparatuses and the wireless communication apparatus for each of subcarriers included in the same frequency band based on known signals included in signals received from the other wireless communication apparatuses;
- a propagation channel interpolation step of interpolating propagation channel information of a subcarrier for which no propagation channel information has been obtained based on the propagation channel information estimated in the propagation channel estimation step and outputting the propagation channel information estimated in the propagation channel estimation step and the interpolated propagation channel information;
- a transmission weight value calculation step of calculating a transmission weight value based on the propagation channel information output in the propagation channel interpolation step; and
- a transmission step of transmitting data multiplexed based on the transmission weight value calculated in the transmission weight value calculation step to the plurality of other wireless communication apparatuses.

27. A wireless communication method performed by a wireless communication apparatus which performs spatial multiplexing transmission using the same frequency band at the same time when data is transmitted to a plurality of other wireless communication apparatuses, the method comprising:
- a propagation channel estimation step of estimating propagation channel information between the other wireless communication apparatuses and the wireless communication apparatus for each of subcarriers included in the same frequency band based on known signals included in signals received from the other wireless communication apparatuses;
- a transmission weight value calculation step of calculating a transmission weight value based on the propagation channel information estimated in the propagation channel estimation step;
- a transmission weight value interpolation step of interpolating a transmission weight value of a subcarrier for which no transmission weight value has been obtained based on the transmission weight value calculated in the transmission weight value calculation step and outputting the transmission weight value calculated in the transmission weight value calculation step and the interpolated transmission weight value; and
- a transmission step of transmitting data multiplexed based on the transmission weight value output in the transmission weight value interpolation step to the plurality of other wireless communication apparatuses.

28. A wireless communication method in a wireless communication apparatus, the method comprising:
- a step of generating format designation information for designating a format of transmission and reception for another wireless communication apparatus;
- a step of wirelessly transmitting the format designation information to the other wireless communication apparatus;
- a step of acquiring a packet;
- a step of estimating uplink propagation channel information indicating a propagation channel from the other wireless communication apparatus to the wireless communication apparatus based on the packet;
- a step of calculating a calibration coefficient based on downlink propagation channel information indicating a propagation channel from the wireless communication apparatus to the other wireless communication apparatus and the uplink propagation channel information;
- a step of calculating a transmission weight value based on the calibration coefficient and the uplink propagation channel information; and
- a step of wirelessly transmitting a predetermined signal to the other wireless communication apparatus based on the transmission weight value,
- wherein the step of generating the format designation information performs designation so that a known signal for dealing with estimation of the uplink propagation channel information corresponding to a plurality of antennas is transmitted using the same antenna as that at a time of reception.

29. A wireless communication method in a wireless communication apparatus, the method comprising:
- a step of generating format designation information for designating a format of transmission and reception for another wireless communication apparatus;
- a step of wirelessly transmitting the format designation information to the other wireless communication apparatus;
- a step of acquiring a packet;
- a step of estimating uplink propagation channel information indicating a propagation channel from the other wireless communication apparatus to the wireless communication apparatus based on the packet;
- a step of calculating a calibration coefficient based on downlink propagation channel information indicating a propagation channel from the wireless communication apparatus to the other wireless communication apparatus and the uplink propagation channel information;
- a step of calculating a transmission weight value based on the calibration coefficient and the uplink propagation channel information; and
- a step of wirelessly transmitting a predetermined signal to the other wireless communication apparatus based on the transmission weight value,
- wherein, when the other wireless communication apparatus receives a signal via a plurality of antennas, the step of generating the format designation information designates a format with which the uplink propagation channel information corresponding to the plurality of antennas is capable of being estimated as a format of a training preamble of a frame of the packet for providing a notification of the downlink propagation channel information.

30. A wireless communication method in a wireless communication apparatus, the method comprising:
- a step of generating format designation information for designating a format of transmission and reception for another wireless communication apparatus;
- a step of wirelessly transmitting the format designation information to the other wireless communication apparatus;
- a step of acquiring a packet;
- a step of estimating uplink propagation channel information indicating a propagation channel from the other wireless communication apparatus to the wireless communication apparatus based on the packet;
- a step of calculating a calibration coefficient based on downlink propagation channel information indicating a propagation channel from the wireless communication apparatus to the other wireless communication apparatus and the uplink propagation channel information;
- a step of calculating a transmission weight value based on the calibration coefficient and the uplink propagation channel information; and
- a step of wirelessly transmitting a predetermined signal to the other wireless communication apparatus based on the transmission weight value,
- wherein the step of generating the format designation information designates an antenna to be used in transmission and reception so that the antenna to be commonly used in the transmission and the reception is selected when the calibration coefficient is calculated.

* * * * *